(12) United States Patent
Yoon

(10) Patent No.: US 12,389,470 B2
(45) Date of Patent: Aug. 12, 2025

(54) METHOD AND DEVICE FOR DETERMINING RESOURCES TO BE SENSED FOR DEVICE-TO-DEVICE COMMUNICATION IN WIRELESS COMMUNICATION SYSTEM

(71) Applicant: Innovative Technology Lab Co., Ltd., Seoul (KR)

(72) Inventor: Sung Jun Yoon, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 285 days.

(21) Appl. No.: 17/886,531

(22) Filed: Aug. 12, 2022

(65) Prior Publication Data

US 2022/0400527 A1   Dec. 15, 2022

Related U.S. Application Data

(63) Continuation of application No. PCT/KR2021/001690, filed on Feb. 9, 2021.

(30) Foreign Application Priority Data

Feb. 12, 2020 (KR) .................. 10-2020-0017169
Mar. 17, 2020 (KR) .................. 10-2020-0032673

(51) Int. Cl.
*H04W 76/14* (2018.01)
*H04W 4/40* (2018.01)
(Continued)

(52) U.S. Cl.
CPC ............. *H04W 76/14* (2018.02); *H04W 4/40* (2018.02); *H04W 28/0236* (2013.01);
(Continued)

(58) Field of Classification Search
CPC . H04W 28/0236; H04W 48/16; H04W 72/02; H04W 72/0446; H04W 72/20;
(Continued)

(56) References Cited

U.S. PATENT DOCUMENTS

2020/0029245 A1  1/2020  Khoryaev et al.
2020/0037358 A1  1/2020  Chae et al.
(Continued)

FOREIGN PATENT DOCUMENTS

CN       109804682 A     5/2019
CN       110662202 A     1/2020
(Continued)

OTHER PUBLICATIONS

European Report for Application 21754485.7 from European Patent Office dated Feb. 12, 2024.
(Continued)

*Primary Examiner* — Thomas R Cairns

(57) ABSTRACT

A method of performing sensing for device-to-device (D2D) communication in a wireless communication system may include receiving, by a first user equipment (UE), sidelink control information (SCI) in slot m; determining a first exclusion candidate based on a reception power measurement value of a data channel corresponding to the SCI; determining slot m+Gap in which the same data as in the slot m is transmitted; determining a second exclusion candidate based on the slot m+Gap; excluding a resource in which the first and second exclusion candidates and a candidate to be sensed overlap from a resource to be sensed; and performing sensing on the resource to be sensed.

16 Claims, 24 Drawing Sheets

(51) Int. Cl.
| | | |
|---|---|---|
| *H04W 28/02* | (2009.01) | |
| *H04W 48/16* | (2009.01) | |
| *H04W 72/0446* | (2023.01) | |
| *H04W 72/25* | (2023.01) | |

(52) U.S. Cl.
CPC ....... *H04W 48/16* (2013.01); *H04W 72/0446* (2013.01); *H04W 72/25* (2023.01)

(58) Field of Classification Search
CPC . H04W 72/25; H04W 74/0808; H04W 76/14; H04W 76/23; H04W 92/18; H04W 72/53; H04W 72/535; H04W 4/40–48; H04W 84/18; H04B 1/7075
See application file for complete search history.

(56) References Cited

U.S. PATENT DOCUMENTS

| | | | | |
|---|---|---|---|---|
| 2021/0227602 | A1* | 7/2021 | Li | H04W 76/14 |
| 2023/0020105 | A1* | 1/2023 | Shin | H04W 72/542 |

FOREIGN PATENT DOCUMENTS

| | | |
|---|---|---|
| CN | 110784922 A | 2/2020 |
| KR | 10-2019-0050763 A | 5/2019 |
| WO | 2018175528 A1 | 9/2018 |

OTHER PUBLICATIONS

Intel Corporation: "Remaining details of partial sensing for P2V communication", 3GPP Draft; RI-1702141 Intel—Pue Sensing, 3GPP TSG RAN WG1 Meeting #88 Athens, Greece Feb. 13-17, 2017.

Ericsson: "Partial sensing for V2P", 3GPP Draft; RI-1609724—Partial Sensing for V2P, 3GPP TSG RAN WG1 Meeting #86bis Lisbon, Portugal, Oct. 10-14, 2016.

International Search Report for International Patent Application No. PCT/KR2021/001690, dated Apr. 23, 2021.

Written Opinion for International Patent Application No. PCT/KR2021/001690, dated Apr. 23, 2021.

"3rd Generation Partnership Project; Technical Specification Group Radio Access Network; NR; Physical layer procedures for data (Release 16)," Dec. 2019, pp. 1-147, 3GPP TS 38.214 V16.0.0, 3GPP Organizational Partners.

"3rd Generation Partnership Project; Technical Specification Group Radio Access Network; NR; Radio Resource Control (RRC) protocol specification (Release 15)," Dec. 2019, pp. 1-348, 3GPP TS 38.331 V15.8.0, 3GPP Organizational Partners.

Vivo, "Discussion on mode 2 resource allocation mechanism", 3GPP TSG RAN WG1 #98, R1-1908150, Prague, CZ, Aug. 26-30, 2019, pp. 1-15.

MediaTek Inc., "On sidelink mode-2 resource allocation", 3GPP TSG RAN WG1 Meeting #98, R1-1908398, Prague, CZ, Aug. 26-30, 2019, pp. 1-12.

Fraunhofer HHI et al., "Resource Allocation for Mode 2 NR V2X", 3GPP TSG-RAN WG2 Meeting #107, R2-1910536, Prague, Czech Republic, Aug. 26-30, 2019, pp. 1-7.

CATT, "Discussion on resource allocation mechanism for sidelink Mode 2 in NR V2X", 3GPP TSG RAN WG1 Meeting #98, R1-1908581, Prague, CZ, Aug. 26-30, 2019, pp. 1-13.

3GPP TSG RAN WG1 Meeting #87 R1-1612687 Reno, USA, Nov. 14-18, 2016. "Details of resource selection using partial sensing by pedestrian UE". NTT Docomo, Inc.

3GPP TSG RAN WG1 Meeting #88 R1-1702021 Athens, Greece, Feb. 13-17, 2017. "Discussion on shorter resource reservation period". Xinwei.

* cited by examiner

FIG. 1
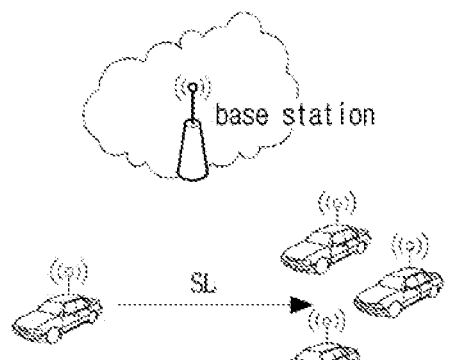
(a) V2V OPERATION
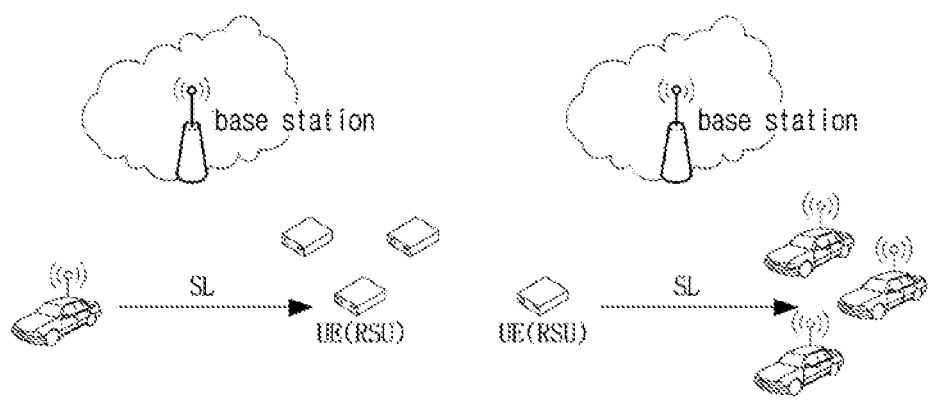
(b) V2I OPERATION
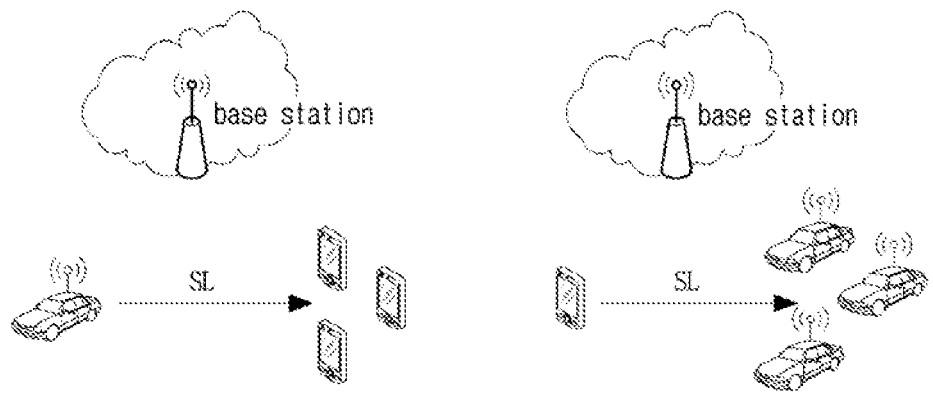
(c) V2P OPERATION FIG. 2
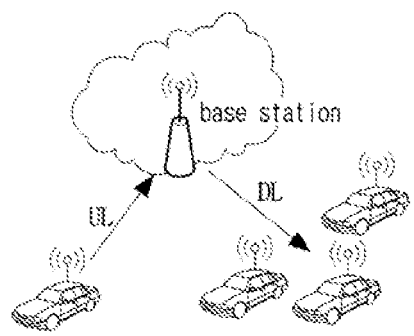
(a) V2V OPERATION
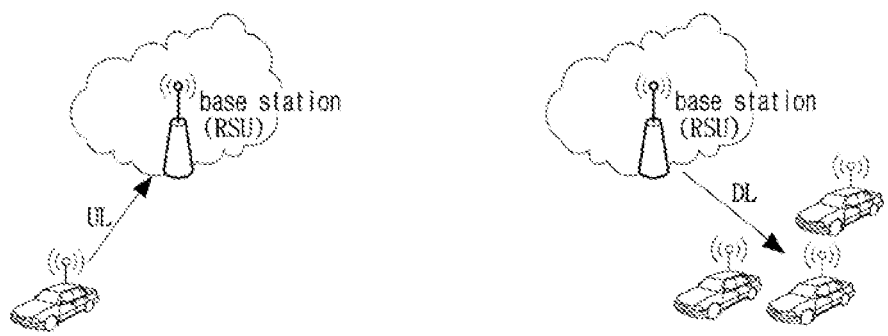
(b) V2I OPERATION
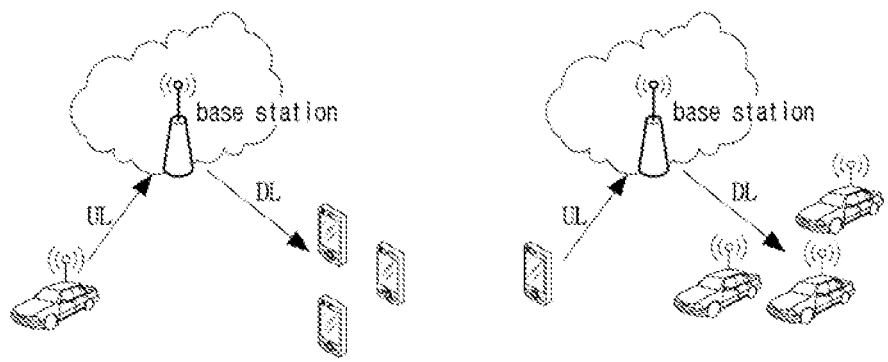
(c) V2P OPERATION FIG. 3
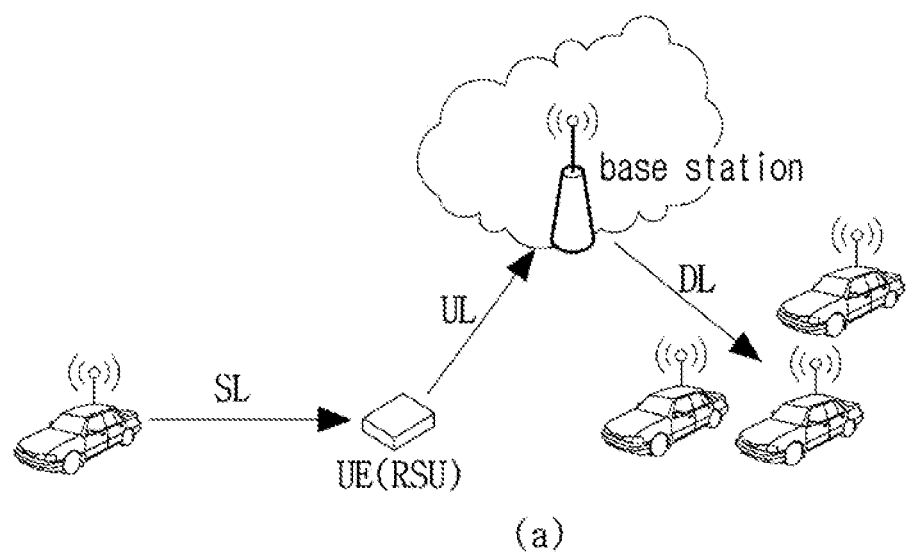
(a)
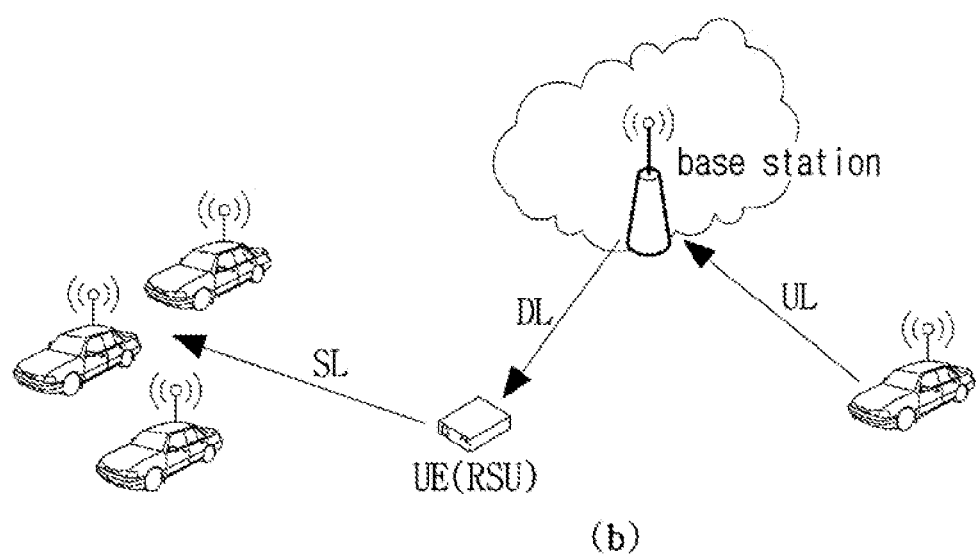
(b)

FIG. 10
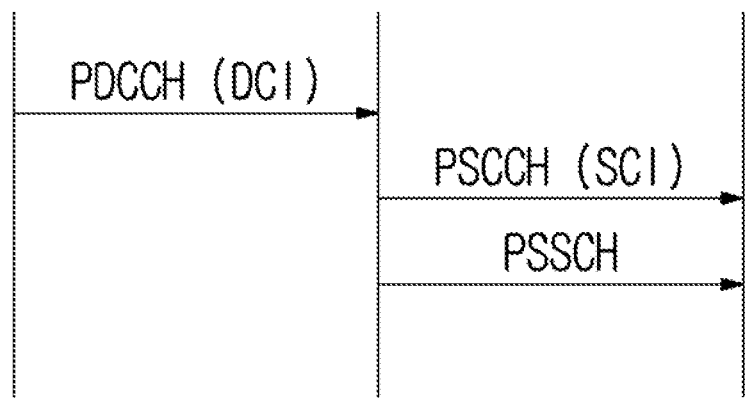
(a)
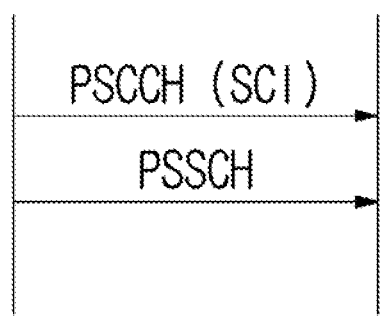
(b)

FIG. 19
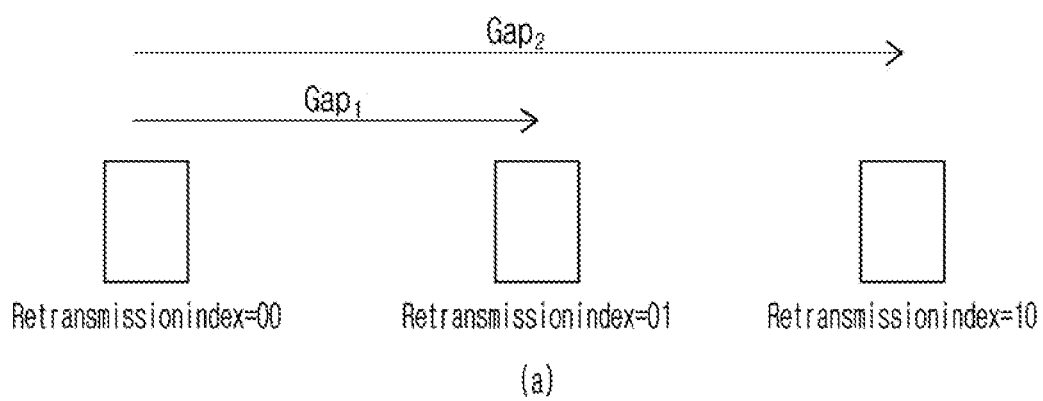
(a)
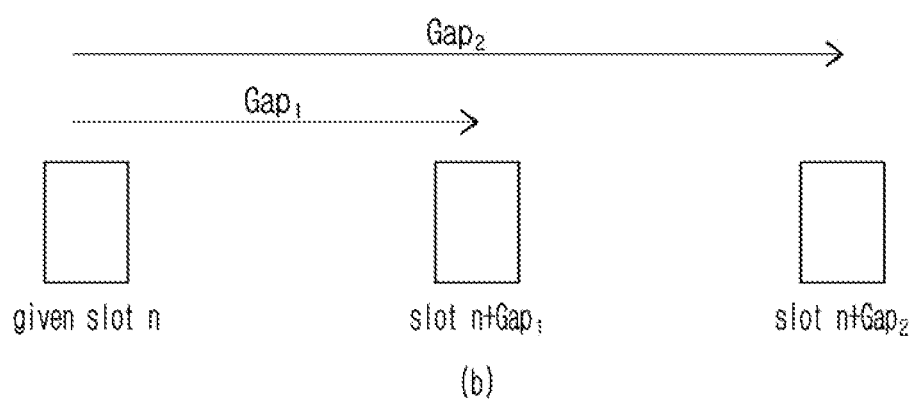
(b)

METHOD AND DEVICE FOR DETERMINING RESOURCES TO BE SENSED FOR DEVICE-TO-DEVICE COMMUNICATION IN WIRELESS COMMUNICATION SYSTEM

CROSS-REFERENCE TO RELATED APPLICATIONS

This application is a continuation of pending PCT International patent application No. PCT/KR2021/001690, filed on Feb. 9, 2021, which claims priority from and the benefit of Korean Patent Application Nos. 10-2020-0017169, filed on Feb. 12, 2020, and 10-2020-0032673, filed on Mar. 17, 2020, each of which is hereby incorporated by reference in its entirety.

BACKGROUND

1 Field

The present disclosure relates to device-to-device (D2D) communication in a wireless communication system and more particularly, to a method and device for determining a resource to be sensed for D2D communication.

2. Discussion of the Background

Device-to-device (D2D) communication represents that a single user equipment (UE) directly communicates with another UE. Direct communication represents that a single UE communicates with another UE under control of a network or without using another network device through determination of the UE itself.

The D2D communication may be used for vehicular communication, which is generally referred to as vehicle-to-everything (V2X) communication. The V2X communication may include a communication method of exchanging or sharing road infrastructures during driving and information, such as traffic conditions, through communication with other vehicles. A V2X-based service may include, for example, an autonomous driving service, a vehicular remote control service, an interactive service, such as a game, and large capacity short-range audio/video services, such as augmented reality (AR) and virtual reality (VR). Detailed techniques additionally required for Long Term Evolution (LTE) and new radio (NR) system that are radio access technology (RAT) in a 5G system is under discussion based on performance requirements for supporting various V2X-bsed services through the 5G system.

When D2D communication for V2X is applied in the NR system, a resource allocation mode based on a sensing of a UE may be applied in selecting a resource for the D2D communication. Sensing of the UE may include a full sensing method and a partial sensing method for a specific resource. To meet the requirements in the NR system, settings for sensing of the UE and an operation of the UE need to be determined. However, a detailed solution thereto is not provided so far.

SUMMARY

A technical object of the present disclosure is to provide a partial sensing method and device for device-to-device (D2D) communication in a wireless communication system.

An additional technical object of the present disclosure is to provide a partial sensing method and device in selecting a resource for sidelink data transmission and reception in a new radio (NR) system.

An additional technical object of the present disclosure is to provide a method and device for efficiently instructing or configuring a resource used in an NR sidelink based on partial sensing.

An additional technical object of the present disclosure is to provide a method and device for excluding a resource from a sensing procedure in an NR sidelink.

Technical objects achievable from the present disclosure are not limited to the aforementioned technical objects and still other technical objects not described herein may be clearly understood by one of ordinary sill in the art to which the disclosure pertains from the following description.

A method of performing sensing for device-to-device (D2D) communication in a wireless communication system according to an aspect of the present disclosure may include receiving, by a first user equipment (UE), sidelink control information (SCI) in slot m; determining a first exclusion candidate based on a reception power measurement value of a data channel corresponding to the SCI; determining slot m+Gap in which the same data as in the slot m is transmitted; determining a second exclusion candidate based on the slot m+Gap; excluding a resource in which the first and second exclusion candidates and a candidate to be sensed overlap from a resource to be sensed; and performing sensing on the resource to be sensed.

Features briefly described above in relation to the present disclosure are merely example aspects of the following detailed description and do not limit the scope of the present disclosure.

According to the present disclosure, there may be provided a partial sensing method and device for device-to-device (D2D) communication in a wireless communication system.

According to the present disclosure, there may be provided a partial sensing method and device in selecting a resource for sidelink data transmission and reception in a new radio (NR) system.

According to the present disclosure, there may be provided a method and device for efficiently instructing or configuring a resource used in a new radio (NR) sidelink based on partial sensing.

According to the present disclosure, there may be provided a method and device for excluding a resource from a sensing procedure in an NR sidelink.

Effects achievable from the present disclosure are not limited to the aforementioned effects and still other effects not described herein may be clearly understood by one of ordinary skill in the art to which the present disclosure pertains from the following description.

BRIEF DESCRIPTION OF THE DRAWINGS

FIGS. 1 to 3 illustrate examples of a vehicle-to-everything (V2X) scenario to which the present disclosure may apply.

FIG. 10 illustrates a V2X resource allocation method to which the present disclosure may apply.

FIG. 19 illustrates a retransmission method to which the present disclosure may apply.

DETAILED DESCRIPTION

Figure 4:
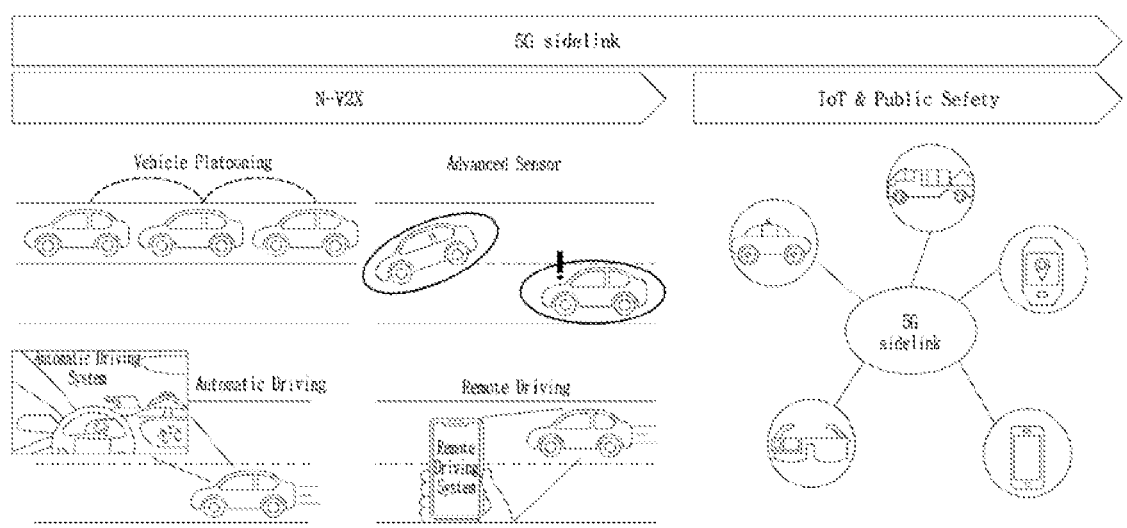
FIG. 4 illustrates an example of a service provided based on a sidelink to which the present disclosure may apply.

Various examples of the disclosure will be described more fully hereinafter with reference to the accompanying drawings such that one of ordinary skill in the art to which the present disclosure pertains may easily implement the examples. However, the present disclosure may be implemented in various forms and is not limited to the examples described herein.

When it is determined that detailed description related to a known configuration or function in describing the examples of the present disclosure, the detailed description is omitted. Also, a part irrelevant to the description of the disclosure is omitted and like reference numerals refer to like elements.

It will be understood that when an element is referred to as being "connected to," "coupled to," or "accessed to" another element, it can be directly connected, coupled, or accessed to the other element or intervening elements may be present. Also, it will be further understood that when an element is described to "comprise/include" or "have" another element, it specifies the presence of still another element, but do not preclude the presence of another element unless otherwise described.

Further, the terms, such as first, second, and the like, may be used herein to describe elements in the description herein. The terms are used to distinguish one element from another element. Thus, the terms do not limit the element, an arrangement order, a sequence or the like. Therefore, a first element in an example may be referred to as a second element in another example. Likewise, a second element in an example may be referred to as a first element in another example.

Herein, distinguishing elements are merely provided to clearly explain the respective features and do not represent that the elements are necessarily separate from each other. That is, a plurality of elements may be integrated into a single hardware or software unit. Also, a single element may be distributed to a plurality of hardware or software units. Therefore, unless particularly described, the integrated or distributed example is also included in the scope of the disclosure.

Herein, elements described in various examples may not be necessarily essential and may be partially selectable. Therefore, an example including a partial set of elements described in an example is also included in the scope of the disclosure. Also, an example that additionally includes another element to elements described in various examples is also included in the scope of the disclosure.

The terms used in this disclosure are intended to describe a particular example and are not intended to limit the scope of claims. As used in the description of the examples and in the accompanying claims, the singular form is intended to include a plurality of forms as well, unless expressly indicated differently in context. In addition, the term "and/or" as used herein may refer to one of the related enumeration items, or means to refer to and include at least two or more of any and all possible combinations thereof.

The description described herein is related to a wireless communication network, and an operation performed in the wireless communication network may be performed in a process of controlling a network and transmitting data in a system that controls the wireless communication network (e.g., a base station), or may be performed in a process of transmitting or receiving a signal in a user equipment connected to the wireless communication network.

It is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B, eNodeB (eNB), and an access point (AP). Also, the term 'terminal' may be interchangeably used with other terms, for example, user equipment (UE), a mobile station (MS), a mobile subscriber station (MSS), a subscriber station (SS), and a non-AP station (non-AP STA).

Herein, transmitting or receiving a channel includes a meaning of transmitting or receiving information or a signal through the corresponding channel. For example, transmitting a control channel indicates transmitting control information or a signal through the control channel. Likewise, transmitting a data channel indicates transmitting data information or a signal through the data channel.

The definitions of abbreviations used herein as below
D2D: Device to Device (communication)
DCI: Downlink Control Information
V2X: Vehicle to X(everything)
V2V: Vehicle to Vehicle
V2P: Vehicle to Pedestrian
V2I/N: Vehicle to Infrastructure/Network SL: Sidelink
SCI: Sidelink Control Information
SFCI: Sidelink Feedback Control Information
PSSCH: Physical Sidelink Shared Channel
PSBCH: Physical Sidelink Broadcast Channel
PSCCH: Physical Sidelink Control Channel
PSDCH: Physical Sidelink Discovery Channel
PSFICH: Physical Sidelink Feedback Indication Channel
ProSe: (Device to Device) Proximity Services
SLSS: Sidelink Synchronization Signal
PSSID: Physical Sidelink Synchronization Identity
$n^{SA}_{ID}$: Sidelink group destination identity
$N^{SL}_{ID}$: Physical sidelink synchronization identity
SA: Scheduling assignment
TB: Transport Block
TTI: Transmission Time Interval
RB: Resource Block In the following description, although the term "new radio (NR) system" is used to distinguish a system according to various examples of the present disclosure from the existing system, the scope of the present disclosure is not limited thereto.

For example, a new radio (NR) system supports various subcarrier spacings (SCSs) by considering various scenarios, service requirements, potential system compatibility, and the like. Also, to overcome a poor channel environment, such as high pathloss, phase-noise, and frequency offset, occurring on a high carrier frequency, the NR system may support transmission of a physical signal/channel through a plurality of beams. Through this, the NR system may support applications, for example, enhanced Mobile Broadband (eMBB), massive Machine Type Communications (mMTC)/ultra-Machine Type Communications (uMTC), and Ultra Reliable and Low Latency Communications (URLLC). Here, the term "NR system" used herein is used as an example of a wireless communication system, and the term "NR system" itself is not limited to the aforementioned features.

Also, for example, 5-th generation (5G) mobile communication technology may be defined. Here, 5G mobile communication technology may be defined by including the existing Long Term Evolution-Advanced (LTE-A) system as well as the aforementioned NR system. That is, 5G mobile communication technology may operate by considering backward compatibility with a previous system as well as a newly defined NR system.

For example, a sidelink field of 5G may include all of sidelink technology in an LTE system and sidelink technology in an NR system. Here, the sidelink field may be essential to enhance a performance and to integrate new and various services through an ultra-high reliability and an ultra-low latency.

In the following, for clarity of description, an operation for vehicle-to-everything (V2X) communication and related information will be described based on the NR system. Here, the following features may not be limited to a specific system and may apply alike to other systems that are similarly configured. However, it is provided as an example only and the present disclosure is not limited thereto.

Meanwhile, V2X communication may be communication based on a vehicle. Here, the concept of a vehicle is evolving from a simple transportation device to a new platform. For example, information technology (IT) applies to a vehicle and various V2X services are provided accordingly. Services, such as, for example, prevention of traffic accidents, improvement of traffic environments, automatic driving, and remote driving, are provided. To this end, there is a growing need for developing and applying sidelink related technology.

In detail, with respect to existing communication technology, a communication from an evolved node base (eNodeB) to a user equipment (UE) may be a downlink and a communication from the UE to the eNodeB may be an uplink. Here, communication between UEs may be required in addition to the communication between the eNodeB and the UE. Here, the communication from one UE to another UE may be the aforementioned sidelink. For example, with respect to the aforementioned V2X communication, a vehicle-to-vehicle (V2V) communication or communication between a vehicle and another object (e.g., an object, excluding the eNodeB, such as a pedestrian UE, a UE-type roadside unit (RSU), and the like) may be a sidelink. That is, in the case of performing vehicle-based communication, there are some constraints using only communication with the eNodeB alone. Therefore, the aforementioned sidelink technology may be developed and applied.

FIGS. 1 to 3 illustrate V2X scenarios to which the present disclosure may apply.

FIG. 1 may be a scenario of performing communication based on the aforementioned sidelink. FIG. 2 may be a scenario of performing a V2X operation using communication between a UE (or a vehicle) and an eNodeB. FIG. 3 may be a scenario of performing communication using all of the aforementioned sidelink and communication with the eNodeB.

For example, in the description related to V2X, the UE may be a vehicle. In the description related to V2X, the UE and the vehicle are collectively referred to as the UE. For example, the UE may refer to a device capable of performing communication with a sidelink and a base station, and may include a vehicle for V2X.

Also, in relation to V2X, D2D (Device to Device) may refer to communication between UEs.

Also, the term "proximity-based service (ProSe)" may indicate a proximity service to a UE that performs D2D communication. Also, SL (sidelink) may be the aforementioned sidelink and sidelink control information (SCI) may indicate control information related to the aforementioned sidelink. Also, a Physical Sidelink Shared Channel (PSSCH) may be a channel used to transmit data through a sidelink and a Physical Sidelink Control Channel (PSCCH) may be a channel used to transmit control information through a sidelink. Also, a Physical Sidelink Broadcast Channel (PSBCH) may be a channel used to broadcast a signal through a sidelink and to forward system information. Also, a Physical Sidelink Feedback Indication Channel (PSFICH) may be a channel used for directing feedback information as a sidelink feedback channel. Also, a sidelink synchronization signal (SLSS) may be a synchronization signal for sidelink and physical sidelink synchronization identity (PSSID) may be ID information for sidelink synchronization.

Also, $n^{SA}$ ID (sidelink group destination identity) may be ID information used to identify a sidelink group and $N^{SL}$ID (Physical sidelink synchronization identity) may be ID information for the aforementioned sidelink synchronization. V2V may represent vehicle-to-vehicle communication, V2P may represent vehicle-to-pedestrian communication, and V2I/N may represent vehicle-to-infrastructure/network communication. The terms SA, TB, TI, and RB may be the same terms used in the existing LTE. for example, in V2X communication, control information transmitted from a UE to another UE may be scheduling assignment (SA). If the aforementioned control information is used for sidelink communication, the control information may be SCI. Herein, the SCI may be transmitted through the PSCCH. Also, a portion of the SCI may be transmitted through the PSCCH and another portion may be transmitted through the P S SCH.

In V2X communication, data transmitted from a UE to another UE may be configured based on a unit of a transport port (TB). Here, the sidelink data may be transmitted through the P S SCH.

Next, herein, an operation mode may be defined based on a resource allocation method for transmitting data and control information for V2X communication or direct link (e.g., D2D, ProSe, or SL) communication.

For example, an eNodeB resource scheduling mode may be a mode in which an eNodeB or a relay node schedules resources used for a UE to transmit V2X (or direct link) control information and/or data. Through this, the UE may transmit the V2X (or direct link) control information and/or data. This mode may refer to the eNodeB resource scheduling mode.

For more detailed example, the eNodeB or the relay node may provide, to a sidelink (or direct link) transmitting UE, scheduling information about resources used to transmit sidelink (or direct ink) control information and/or data through downlink control information (DCI). Therefore, the sidelink (or direct link) transmitting UE may transmit the sidelink (or direct link) control information and data to a sidelink (or direct link) receiving UE, and the sidelink (or direct link) receiving UE may receive sidelink (or direct link) data based on the sidelink (or direct link) control information.

direct link) receiving UE may receive sidelink (or direct link) data based on sidelink (or direct link) control information.

The aforementioned eNodeB resource scheduling mode may be referred to as Mode 1 in sidelink (or direct link) communication for D2D and the like. Also, the eNodeB resource scheduling mode may be referred to as Mode 3 in sidelink communication for V2X and the like. Also, the UE autonomous resource selection mode may be referred to as Mode 2 in sidelink (or direct link) communication for D2D and the like. Also, the UE autonomous resource selection mode may be referred to as Mode 4 in sidelink communication for V2X and the like. However, they are provided as examples only and the present disclosure is not limited thereto. That is, they may be regarded as the same mode with respect to the same target and the same operation.

For example, in NR V2X, eNodeB resource scheduling mode may be referred to as mode 1 (Mode 1) and the UE autonomous resource selection mode may be referred to as mode 2 (Mode 2).

Although the following description is made based on V2X communication for clarity of description, it is not limited thereto. For example, the present disclosure may apply alike to communication based on a direct link such as D2D, ProSe, and the like. Also, for example, V2X may be a general term for V2V, V2P, and V2I/N. Here, each of V2V, V2P, and V2I/N may be defined as the following Table 1, however, it is not limited thereto. That is, the following Table 1 is provided as an example only and not limited thereto.

TABLE 1

| | |
|---|---|
| V2V | LTE or NR based communication between a vehicle and another vehicle |
| V2P | LTE or NR based communication between a vehicle and a device carried by an individual (e.g., a terminal carried by a pedestrian, a cyclist, a driver, or a passenger) |
| V2I/N | LTE or NR based communication between a vehicle and a roadside unit(RSU)/network. The RSU refers to a suspended social infrastructure entity that supports V2X applications and may exchange messages with other independent entities that support V2X applications. The RSU is a logical independent entity integrated with a V2X application logic having functions of an eNodeB (in this case, referable as an eNB-type RSU) or a UE (in this case, referable as a UE-type RSU). |

Also, a UE autonomous resource selection mode may be a resource allocation mode in which a UE autonomously selects resources used to transmit control information and data. The resource selection of the UE may be determined through sensing of the UE from a resource pool (i.e., a set of resource candidates). On the selected resource, the UE may transmit V2X (or direct link) control information and/or data.

For more detailed example, the sidelink (or direct link) transmitting UE may transmit sidelink (or direct link) control information and data to the sidelink (or direct link) receiving UE using its selected resource, and the sidelink (or Also, V2X communication may include PC5 based communication that is an interface for sidelink communication.

For example, the following Table 2 and FIG. 1 may refer to a scenario for supporting a V2X operation based on a PC5 interface (or SL). Here, (a) of FIG. 1 illustrates an example of a V2V operation, (b) of FIG. 1 illustrates an example of a V2I operation, and (c) of FIG. 1 illustrates an example of a V2P operation. That is, FIG. 1 illustrates a method of performing communication based on the sidelink (SL). Here, communication may be performed without an eNodeB.

TABLE 2

| |
|---|
| Scenario that supports a V2X operation operating based on only PC5—In this scenario, a UE transmits a V2X message to a plurality of UEs present in a local area through a sidelink. |
| With respect to V2I, a transmitter UE or receiver UE(s) may be a UE-type roadside unit (RSU). |
| With respect to V2P, a transmitter UE or receiver UE(s) may be a pedestrian UE. |

Meanwhile, the following Table 3 and FIG. 2 may refer to a scenario for supporting a V2X operation based on a Uu interface (i.e., an interface between a UE and an eNodeB). Here, (a) of FIG. 2 illustrates an example of a V2V operation, (b) of FIG. 2 illustrates an example of a V2I operation, and (c) of FIG. 2 illustrates an example of a V2P operation. That is, the V2X operation may be supported using communication between a UE and an eNodeB.

TABLE 3

Scenario that supports a V2X operation operating based on only Uu interface
In this scenario,
With respect to V2V and V2P, a UE transmits a V2X message to an Evolved-Universal Terrestrial Radio Access Network (E-UTRAN) through an uplink, and the E-UTRAN transmits the V2X message to a plurality of UEs present in a local area through a downlink.
With respect to V2I, if a receiver is an eNodeB-type RSU, a UE transmits a V2I message to an E-UTRAN (eNodeB-type RSU) through an uplink; and if a transmitter is an eNodeB-type RSU, the E-UTRAN (eNodeB-type RSU) transmits the V2I message to a plurality of UEs present in a local area.
With respect to V2P, a transmitter UE or receiver UE(s) may be a pedestrian UE. To support this scenario, the E-UTRAN performs uplink reception and downlink transmission of a V2X message and uses a broadcast mechanism with respect to a downlink.

The following Table 4 and FIG. 3 may refer to a scenario for supporting a V2X operation that uses all of a UE interface and PC5 interface (or SL). Here, (a) of FIG. 3 illustrates Scenario 3A of Table 4 and (b) of FIG. 3 illustrates Scenario 3B of Table 4.

In detail, referring to (a) of FIG. 3, a UE may transmit a V2X message to other UEs through a sidelink. One of the UEs receiving the V2X message may transmit the V2X message to an eNodeB through an uplink (UL). The eNodeB may receive the V2X message and may transmit a message based on the V2X message to other neighboring UEs through a downlink (DL). Here, for example, the downlink transmission may be performed using a broadcast method.

Referring to (b) of FIG. 3, a UE may transmit a V2X message to an eNodeB through an uplink (UL) and the eNodeB may transmit the V2X message to at least one UE or RSU. In response thereto, the UE or the RSU may transmit the received message to a plurality of neighboring UEs through a sidelink (SL).

In (a) and (b) of FIG. 3, the V2X operation may be supported using all of communication between the eNodeB and the UE and the sidelink.

eNodeB is used, transmission and reception may be performed through a Uu link that is a communication interface between an LTE eNodeB and UE in LTE-based V2X communication. Also, if the sidelink is used for the direct communication between UEs, transmission and reception may be performed through a PC5 link that is a communication interface between LTE UEs in the LTE-based V2X communication. For example, even in an NR system, the V2X communication may be performed using communication between a UE and an eNodeB and a sidelink between UEs. Here, there may be a difference between a communication (uplink/downlink) method between the eNodeB and the UE in the NR system. For example, the communication methods may be similar in terms of some features and there may be some changes based on the NR system that is a new system. Also, for example, there may be a difference between the sidelink in the NR system and the sidelink in the existing system. That is, there may be some changes in the sidelink based on the NR system that is a new system by considering the aforementioned communication difference between the eNodeB and the UE.

FIG. 4 illustrates an example of a service provided based on a sidelink to which the present disclosure may apply.

Referring to FIG. 4, a V2X related service or an Internet of Things (IoT) service may be provided based on a 5G sidelink. Here, for example, the 5G sidelink may be a concept that includes all of a sidelink based on an existing

TABLE 4

Scenario in which a UE transmits a V2X message to other UEs through a sidelink

Scenario 3A  In this scenario, a UE transmits a V2X message to other UEs through a sidelink. One of a plurality of receiver UEs is a UE-type RSU and receives the V2X message through the sidelink and transmits the V2X message to an E-UTRAN through an uplink. The E-UTRAN receives the V2X message from the UE-type RSU and transmits the V2X message to a plurality of UEs present in a local area through a downlink.
To support this scenario, the E-UTRAN performs uplink reception and downlink transmission of the V2X message, and uses a broadcast mechanism with respect to the downlink.
Scenario 3B  In this scenario, a UE transmits a V2X message to an E-UTRAN through an uplink. The E-UTRAN transmits the V2X message to at least one UE-type RSU. The UE-type RSU transmits the V2X message to other UEs through a sidelink.
To support this scenario, the E-UTRAN performs uplink reception and downlink transmission of the V2X message, and uses a broadcast mechanism with respect to the downlink.

As described above, the V2X communication may be performed through the eNodeB and may be performed through direct communication between UEs. Here, if the LTE system and a sidelink based on an NR system. That is, the 5G sidelink may be a service that is provided by considering the sidelink applied in each system.

For example, referring to FIG. 4, with respect to a V2X service, a vehicle platooning, an automatic driving, an advanced sensor, and a remote driving service may be provided. Here, the vehicle platooning may refer to technology that allows a plurality of vehicles to dynamically form a group and operate in a similar manner. Also, the automatic driving may refer to technology that drives a vehicle based on a complete automation and a semi-automation. Also, the advanced sensor may refer to technology that collects and exchanges data acquired from a sensor or a video image. Also, the remote driving may refer to technology for remotely controlling a vehicle and technology for an application. That is, the aforementioned services may be provided as a V2X-based service. Here, the services are provided as examples only and the present disclosure is not limited thereto. Here, requirements, such as ultra-latency, ultra-connectivity, low power, and high reliability, may be required to provide the V2X service. Therefore, the 5G sidelink may require an operation method for meeting the services and the requirements according thereto. A detailed method considering the requirements is described in the following.

Hereinafter, the physical resource structure of the NR system is described.

Figure 5:
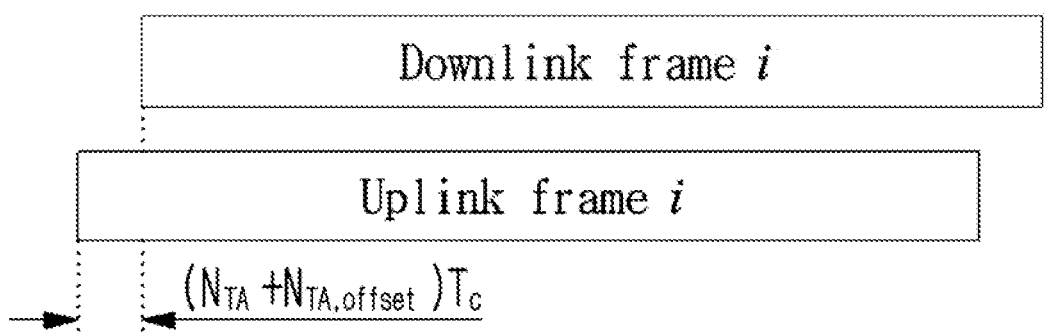
FIG. 5 illustrates an example of a new radio (NR) frame structure to which the present disclosure may apply.

FIG. 5 illustrate examples of a frame structure for the NR system to which the present disclosure may apply.

In NR, a basic unit of a time domain may be $T_c=1/(\Delta f_{max} \cdot N_f)$. Here, $\Delta f_{max}=480 \cdot 10^3$ and $N_f=4096$. In LTE, $T_s=1/(\Delta f_{ref} \cdot N_{f,ref})$, $\Delta f_{ref}=15 \cdot 10^3$ Hz, and $N_{f,ref}=2048$ may be defined as a reference time unit. The constant for the multiples relationship between the NR reference time unit and the LTE reference time unit may be defined as $\kappa=T_s/T_c=64$.

Referring to FIG. 5, a time structure of a frame for a downlink/uplink (DL/UL) transmission may include $T_f=(\Delta f_{max}N_f/100) \cdot T_s=10$ ms. Here, a single frame may include 10 subframes corresponding to $T_{sf}=(\Delta f_{max}N_f/1000) \cdot T_s=1$ ms. A number of consecutive OFDM symbols per subframe may be $N_{symb}^{subframe,\mu}=N_{symb}^{slot}N_{slot}^{subframe,\mu}$. Also, each frame may be divided in two half frames and the half frames may include 0-4 subframes and 5-9 subframes. Here, half frame 1 may include 0-4 subframes and half frame 2 may include 5-9 subframes.

Referring to FIG. 5, NTA shows a timing advance (TA) between the downlink (DL) and the uplink (UL). Here, a transmission timing of uplink transmission frame i is determined based on a downlink reception time at a UE according to the following Equation 1.

$$T_{TA}=(N_{TA}+N_{TA,offset})T_c \quad \text{[Equation 1]}$$

In Equation 1, $N_{TA,offset}$ denotes a TA offset occurring due to a duplex mode difference and the like. Basically, in a frequency division duplex (FDD), $N_{TA,offset}=0$. In a time division duplex (TDD), $N_{TA,offset}$ may be defined as a fixed value by considering a margin for a DL-UL switching time.

Figure 6:
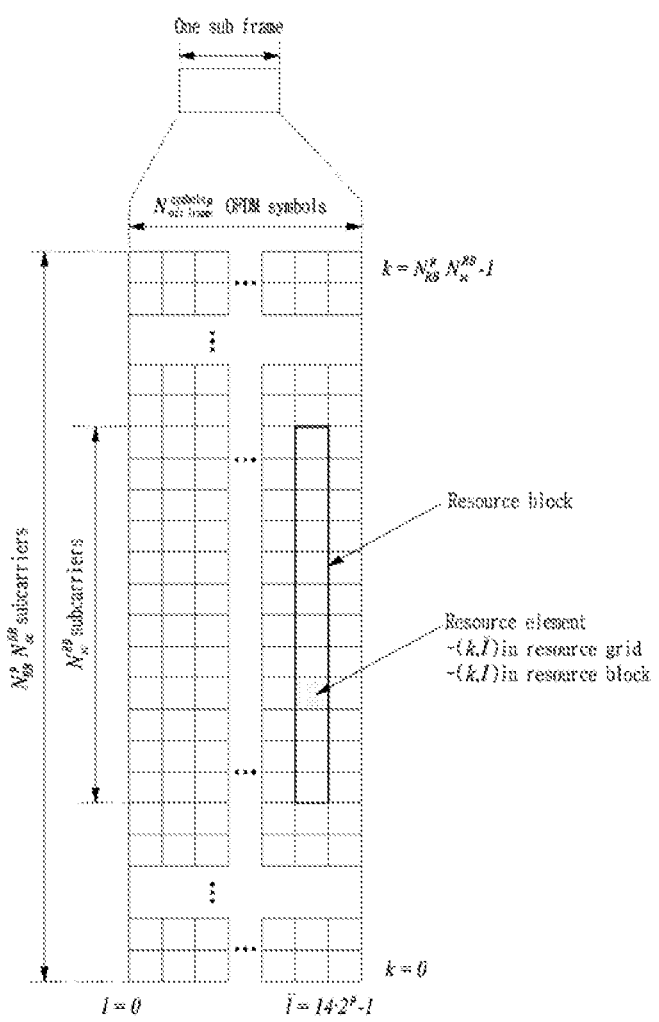
FIG. 6 illustrates an NR resource structure to which the present disclosure may apply.

FIG. 6 illustrates the NR resource structure to which the present disclosure may apply.

A resource element within a resource grid may be indexed based on each subcarrier spacing. Here, a single resource grid may be generated for each antenna port and for subcarrier spacing. Uplink/downlink transmission and reception may be performed based on a corresponding resource grid.

A single resource block is configured on a frequency domain using 12 resource elements and configures an index $n_{PRB}$ for a single resource block every 12 resource elements. An index of the resource block may be used in a specific frequency band or system bandwidth. The index for the resource block may be defined as shown in Equation 2. Herein, $N_{sc}^{RB}$ means the number of subcarriers per resource block and k means the subcarrier index.

$$n_{PRB} = \left\lfloor \frac{k}{N_{sc}^{RB}} \right\rfloor \quad \text{[Equation 2]}$$

Numerologies may be variously configured to meet various services and requirements of the NR system. For example, a plurality of subcarrier spacings (SCSs) may be supported, which differs from the existing LTE/LTE-A system that supports a single SCS.

A new numerology for the NR system that includes supporting the plurality of SCSs may operate in the frequency range or carrier, such as 3 GHz or less, 3 GHz-6 GHz, or 6 GHz-52.6 GHz, to solve an issue that a wide bandwidth is unavailable in the existing frequency range or carrier, such as 700 MHz or 2 GHz. However, the scope of the present disclosure is not limited thereto.

Table 5 below shows an example of the numerology supported by the NR system.

TABLE 5

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Referring to the Table 5, the numerologies may be defined based on an SCS, a cyclic prefix (CP) length, and a number of OFDM symbols per slot, which are used in an OFDM system. The aforementioned values may be provided to a UE through upper layer parameters, DL-BWP-mu and DL-BWP-cp (DL) and UL-BWP-mu and UL-BWP-cp (UL).

For example, referring to the following Table 5, if μ=2 and SCS=60 kHz, a normal CP and an extended CP may be applied. In other numerology index, only the normal CP may be applied.

A normal slot may be defined as a basic time unit used to transmit a single piece of data and control information in the NR system. A length of the normal slot may basically include 14 OFDM symbols. Also, dissimilar to a slot, a subframe may have an absolute time length corresponding to 1 ms in the NR system and may be used as a reference time for a length of another time section. Here, for coexistence and backward compatibility of the LTE and the NR system, a time section, such as an LTE subframe, may be required for an NR standard.

For example, in the LTE, data may be transmitted based on a transmission time interval (TTI) that is a unit time. The TTI may include at least one subframe unit. Here, even in the LTE, a single subframe may be set to 1 ms and may include 14 OFDM symbols (or 12 OFDM symbols).

Also, in the NR system, a non-slot may be defined. The non-slot may refer to a slot having a number of symbols less by at least one symbol than that of the normal slot. For example, in the case of providing a low latency such as an Ultra-Reliable and Low Latency Communications (URLLC) service, a latency may decrease through the non-slot having the number of slots less than that of the normal slot. Here, the number of OFDM symbols included in the non-slot may be determined based on a frequency range. For example, a non-slot with 1 OFDM symbol length may be considered in the frequency range of 6 GHz or more. As another example, a number of symbols used to define the non-slot may include at least two OFDM symbols. Here, the range of the number of OFDM symbols included in the non-slot may be configured with a length of a mini slot up to (normal slot length)−1. Here, although the number of OFDM symbols may be limited to 2, 4, or 7 as a non-slot standard, it is provided as an example only.

Also, for example, an SCS corresponding to μ=1 and 2 may be used in the unlicensed band of 6 GHz or less and an SCS corresponding to μ=3 and 4 may be used in the unlicensed band above 6 GHz.

TABLE 6

| u | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 6 shows, in the case of normal CP, a number of OFDM symbols per slot ($N_{slot}^{symb,\mu}$), a number of slots per frame ($N_{slot}^{frame,\mu}$), and a number of slots per subframe ($N_{slot}^{subframe,\mu}$) for each SCS setting parameter μ, as provided by Table 6. Here, in Table 6, the values are based on the normal slot having 14 OFDM symbols.

TABLE 7

| u | $N_{symb}^{slot}$ | $N_{slot}^{frame,\mu}$ | $N_{slot}^{subframe,\mu}$ |
|---|---|---|---|
| 2 | 12 | 40 | 4 |

Table 7 shows, in the case the extended CP may be applied (μ=2 and SCS=60 kHz), a number of slots per frame and a number of slots per subframe based on the normal slot of which the number of OFDM symbols per slot ($N_{slot}^{symb,\mu}$) is 12. Also, as described above, a single subframe may correspond to 1 ms on a time axis. Also, a single slot may correspond to 14 symbols on the time axis. Also, for example, a single slot may correspond to 7 symbols on the time axis. Therefore, a number of slots and a number of symbols available in 10 ms corresponding to a single radio frame may be differently set. Table 8 shows a number of slots and a number of symbols according to each SCS. Here, for example, an SCS of 480 kHz may not be considered and the present disclosure is not limited thereto.

TABLE 8

| SCS | Number of Slots within 10 ms (14 symbols per slot) | Number of Slots within 10 ms (7 symbols per slot) | Number of symbols within 10 ms |
|---|---|---|---|
| 15 kHz | 10 | 20 | 140 |
| 30 kHz | 20 | 40 | 280 |
| 60 kHz | 40 | 80 | 560 |
| 120 kHz | 80 | N/A | 1120 |
| 240 kHz | 160 | N/A | 2240 |
| 480 kHz | 320 | N/A | 4480 |

Figure 7:
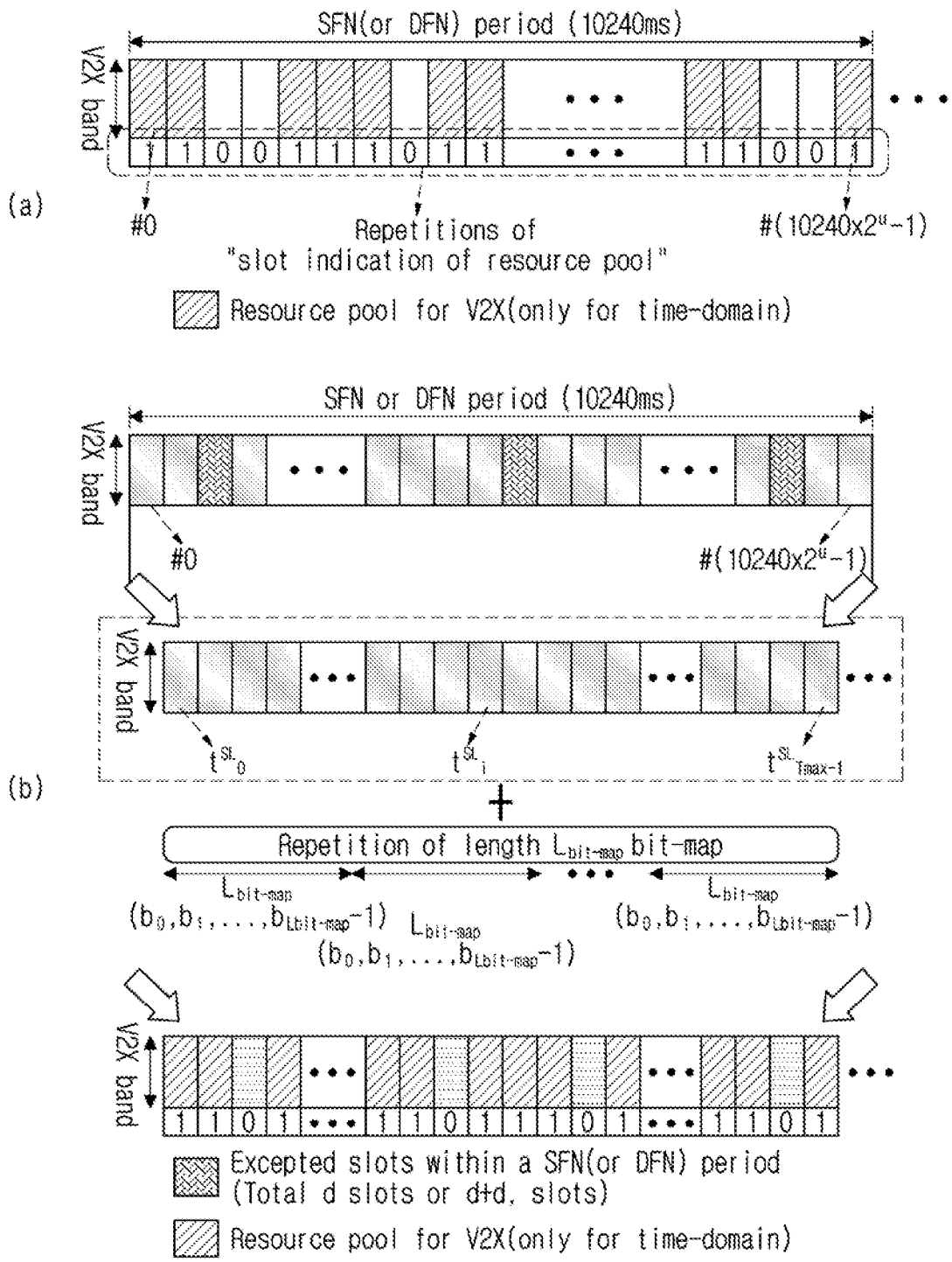
FIGS. 7 and 8 illustrate examples of a V2X resource pool configuration to which the present disclosure may apply.
Figure 8:
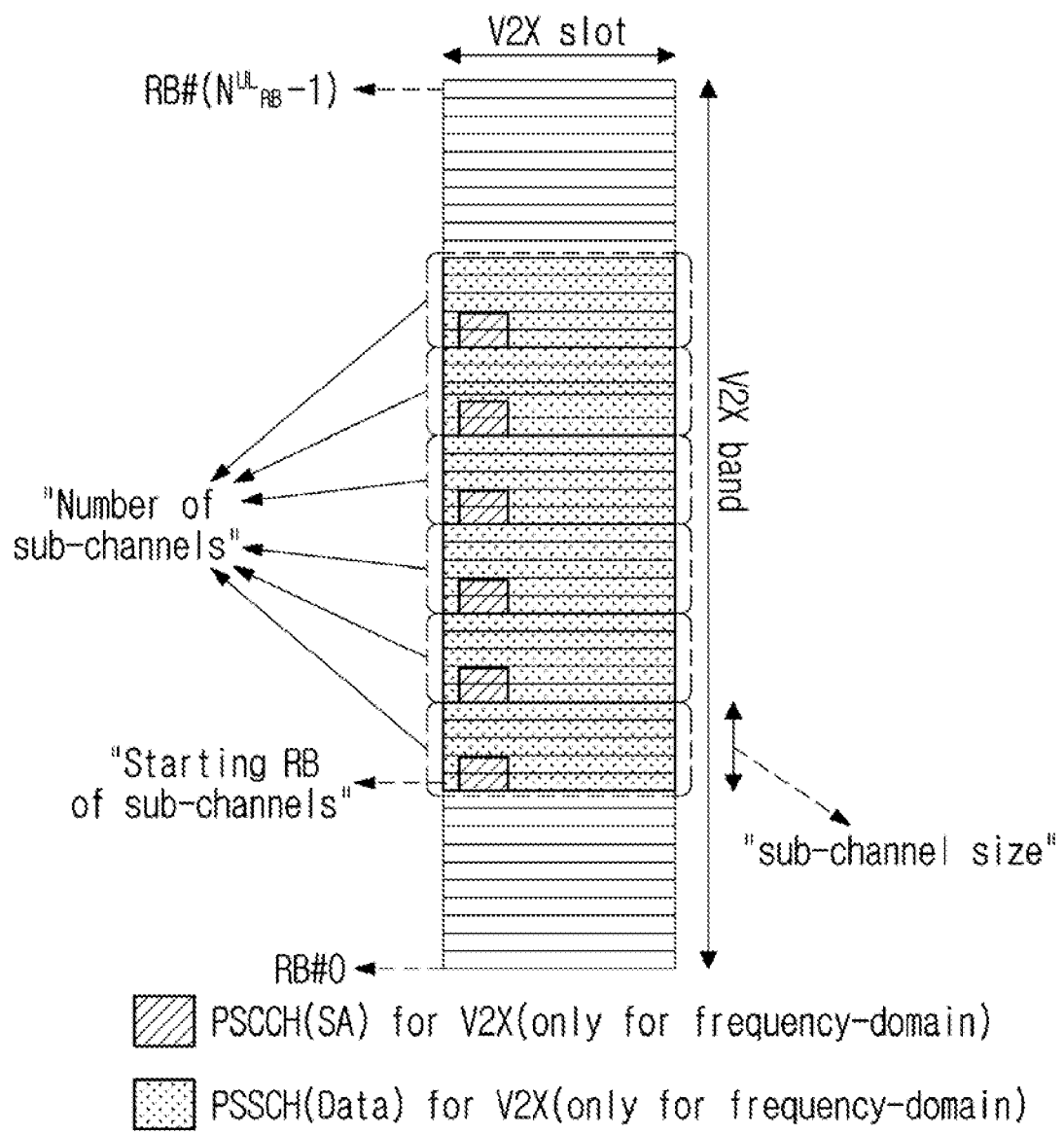

FIGS. 7 and 8 illustrate examples of V2X resource pool configuration to which the present disclosure may apply. Referring to FIGS. 7 and 8, a method of configuring a resource pool for a control channel (PSCCH) through which scheduling assignment (SA) is transmitted and a data channel (PSSCH) through which data related thereto is transmitted in V2X is described. Here, the resource pool may refer to a set of resource candidates available for transmission of SA and/or data. Each resource pool may be called a slot pool in a time domain and may also be called a resource block pool in a frequency domain. Here, the resource pool as in the examples of FIGS. 7 and 8 may be one for vehicle (V)-UE in V2X. Also, the resource pool configuration method as in the examples of FIGS. 7 and 8 are provided as an example only and the resource pool may be configured using another method.

The resource pool as in the examples of FIGS. 7 and 8 may be defined in a UE autonomous resource selection mode (or mode 2).

In an eNodeB resource scheduling mode (or mode 1), all of sidelink slots (e.g., corresponding to all of uplink slots in NR) in the time domain and resources corresponding to all of resource blocks (RBs) within V2X carrier or band in the frequency domain may be a set of resource candidates available for transmitting SA and/or data. Also, even in the eNodeB resource scheduling mode (or mode 1), a set of resource candidates available for transmitting SA and/or data may be configured by separately defining the resource pool as in the UE autonomous resource selection mode (or mode 2).

That is, the resource pool according to the present disclosure described with reference to FIGS. 7 and 8 may be defined in the UE autonomous resource selection mode (or mode 2) and/or the eNodeB resource scheduling mode (or mode 1).

Hereinafter, the slot pool corresponding to the resource pool in the time domain will be further described.

FIG. 7 illustrates slots in which the resource pool is configured in the time domain, with respect to the resource pool. Referring to FIG. 7, slots for the resource pool for V2X may be defined by indicating a repetition of a bitmap with respect to all of the slots excepting specific slots. The slots for the resource pool for V2X may be slots in which transmission and/or reception of SA and/or data is allowed for the resource pool in V2X.

Here, slots to be excepted from applying of bitmap repetitions may include slots used for transmission of a Sidelink Signal Block (SSB) including a Primary Sidelink Synchronization Signal (PSSS), a Secondary Sidelink Synchronization Signal (SSSS), and a Physical Sidelink Broadcast Channel (PSBCH). Also, the excepted slots may further include downlink (DL) slots or flexible slots, not uplink (UL) slots available as sidelink (SL) slots in TTD. Here, the excepted slots are not limited to the aforementioned example.

For example, excepted slots within a system frame number (SNF) or a D2D frame number (DFN) period may include non-uplink slots and slots for SSB. Also, the excepted slots may further include d' slots that are additionally excepted such that a bitmap with a length of $L_{bitmap}$ may be repeatedly applied by an integer multiple within the SFN or DFN period. Here, the excepted slots are not limited to the aforementioned example.

Also, the repeatedly applied bitmap may be indicated with upper layer signaling (signaling field "slot indication of resource pool" in FIG. 7) such as RRC and the like. A length of the signaling field may be 16, 20, or 100, but is not limited thereto. If the bitmap value is 1, it may indicate a slot for the resource pool. If the bitmap value is 0, it may indicate a slot that does not belong to the resource pool. Here, a value of u of FIG. 7 may follow a value defined in Table 5 to Table 7 as a value according to a Subcarrier Spacing (SCS).

Next, the resource block pool corresponding to the resource pool in the frequency domain will be further described.

FIG. 8 illustrates slots in which the resource pool is configured in the frequency domain. Referring to FIG. 8, a PSCCH that transmits SA and a PSSCH that transmits data within the resource pool may be simultaneously transmitted in a single sub-channel. Here, the PSSCH may be transmitted over the entire sub-channel, whereas the PSCCH may be transmitted in a portion of the sub-channel.

Referring to FIG. 8, in a slot in which the resource pool is configured in the time domain for V2X "Starting RB of sub-channels" may be defined based on a single RB unit with respect to all of RBs (RB #0 to RB # ($N^{UL}_{RB}-1$)) in the frequency domain (here, $N^{UL}_{RB}$ denotes a total number of RBs corresponding to a system bandwidth for uplink (UL) and V2X for a sidelink is defined in a UL band and thus, UL may be replaced with SL (i.e., $N^{SL}_{RB}$ may be applied instead of $N^{UL}_{RB}$). The signaling field "Starting RB of sub-channels" may be indicated through upper layer signaling, such as RRC and the like. Consecutive RBs corresponding to a total number of K sub-channels starting from RB indicated with such "Starting RB of sub-channels" belong to the resource pool. Here, a number of RBs that constitute a single sub-channel may be indicated with a signaling field "Sub-channel size" and the number of K sub-channels may be indicated with a signaling field "Number of sub-channels" through upper layer signaling such as RRC.

For example, "Sub-channel size" $N_{subchannel}$ may be 10, 15, 20, 25, 50, 75, or 100 RBs, but without being limited thereto, 4, 5, or 6 RBs may be used. Also, referring to FIG. 8, the PSCCH for SA allocated to a portion of the sub-channel may be allocated to X RBs within the sub-channel. Here, $X \leq N_{subchannel}$.

Figure 9:
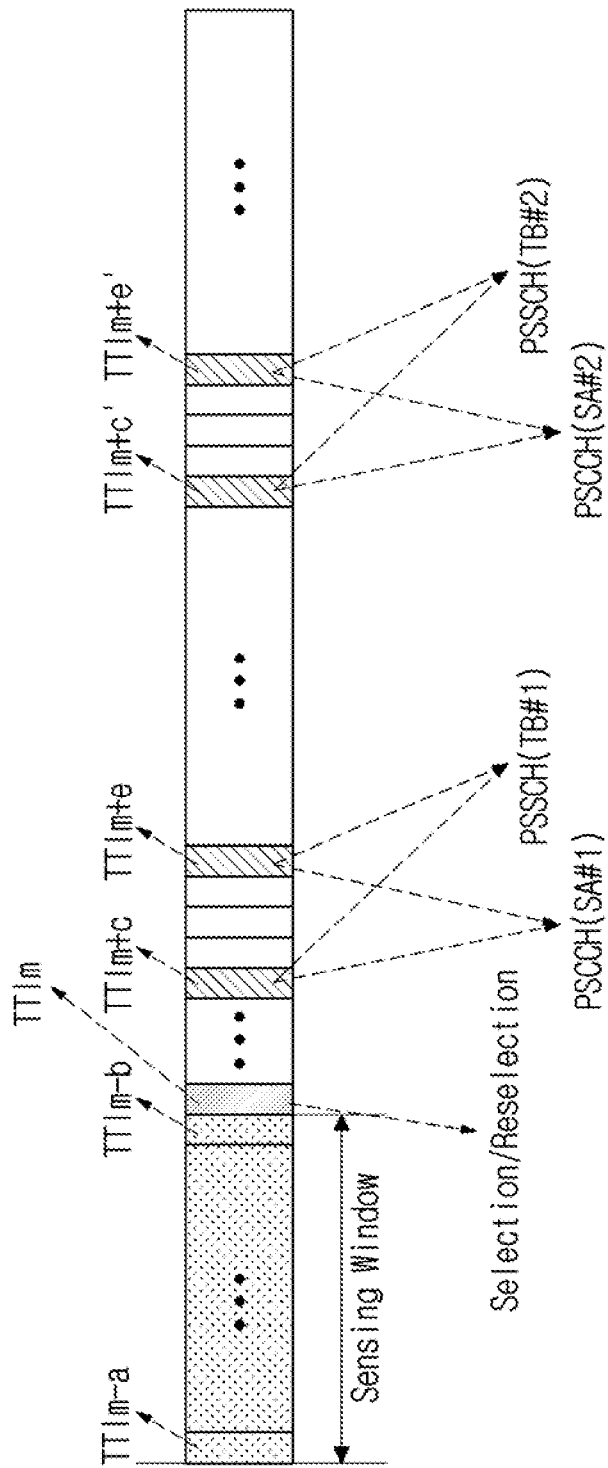
FIG. 9 illustrates an example of a sidelink transmission slot determination method based on a user equipment (UE) sensing to which the present disclosure may apply.

FIG. 9 illustrates an example of a sidelink transmission slot determination method based on a UE sensing to which the present disclosure may apply.

In the UE autonomous resource selection mode (or mode 2), a UE may autonomously determine slots in which the PSCCH for SA and the PSSCH for data are transmitted.

TABLE 9

| Notation related to FIG. 9 | Specific parameter value | Possible actual value (example) | Possible indication method |
|---|---|---|---|
| a | $a = T_o$ | $T_o = 1000 \cdot 2^u$ (slots) | (pre-)configured |
| b | $b = T_{proc,0}$ | $T_{proc,0} = 1$ | fixed |
| $T_1 \leq c \leq T_2$ | $T_1 \leq T_{proc,1}$ | $T_{proc,1} = 3$ (slots) for u = 0, $1T_{proc,1} = 4$ (slots) for u = 2, 3 | fixed |
| | $T_2 \geq T_{2,min}$ | $T_{2,min} = 5 \cdot 2^u, 10 \cdot 2^u$ or $20 \cdot 2^u$ (slots) | (pre-)configured |
| | e-c | 0~31 (slots) | indicated by SCI |
| c'-c | $P_{max}$ | 0, 5, 10, 20, 50, 100, 200, 300, . . . , 1000 (ms) | (pre-)configured + indicated by SCI |

FIG. 9 illustrates a method of selecting slots for transmitting a control channel and a data channel by sensing in a resource pool for transmission of the control channel (PSCCH) and the data channel (PSSCH) related thereto. In a sensing window corresponding to a duration from "TTI m-a" to "TTI m-b", the UE may verify a resource that has been occupied and used by another UE through sensing. Based thereon, the UE may select a resource from among remaining resources excluding a resource occupied and used or to be used by the other terminal from among resources that belong to the resource pool. That is, sensing a specific resource for resource selection may include referencing whether a resource corresponding to the specific resource is occupied or used within the sensing window (i.e., at a previous point in time based on the specific resource). Since a sidelink resource allocation may have a periodic characteristic, a resource to be sensed in the resource pool (or a selection window) may correspond to a sensing reference resource within a previous sensing window. For example, when the sensing reference resource within the sensing window corresponding to the resource to be sensed in the resource pool (or the selection window) is used, it may be assumed that the corresponding resource to be sensed in the resource pool (or the selection window) is highly to be occupied or used by the other UE. Therefore, a transmission resource may be selected from among the remaining resources excluding the corresponding resource from the resource pool. Therefore, the UE may perform transmission of the control channel and/or the data channel on the selected resource.

Also, "TTI m" corresponding to a time at which the UE determines a selection/resection corresponds to a time at which a corresponding TB arrives (i.e., a TB generated in an upper layer of the UE arrives at a physical layer).

In detail, it may be expressed as $a=T_O$ and may be expressed as $b=T_{proc,0}$. Here, a length of the sensing window corresponding to a duration from "TTI m-a" to "TTI m-b" may be expressed as a-b+1. For example, $a=T_O=1000 \cdot 2^u$ and $b=T_{proc,0}=1$. Here, the sensing window corresponds to a duration from slot "TTI m-1000·$2^u$" to slot "TTI m-1" and the length of the sensing window (corresponding to "a-b+1=$T_O-T_{proc,0}+1=T_O-1+1=T_O$") corresponds to $1000 \cdot 2^u$ slots and thus, may be 1000 ms. Although 1000 ms corresponding to $T_O=1000 \cdot 2^u$ slots is used as an example above, it is provided as an example only and 1100 ms or 100 ms is possible. Here, $T_O$ is (pre-)configured as one of the aforementioned values and a value fixed to $T_{proc,0}=1$ may be used.

"TTI m+c" may correspond to a TTI for transmission of SA #1 (first SA) (or, if a single TTI corresponds to a single slot, a slot for transmission of SA #1 (first SA)). "TTI m+d" may correspond to a TTI for initial transmission of TB #1 (first TB) that is instructed by SA #1 (first SA) and transmitted (or if a single TTI corresponds to a single slot, a slot for initial transmission of TB #1 (first TB)). "TTI m+e" may correspond to a TTI for retransmission of TB #1 (first TB) that is instructed by SA #1 (first SA) and transmitted (or, if a single TTI corresponds to a single slot, a slot for retransmission of TB #1 (first TB)).

In the example of FIG. 9, since it is considered that SA and data are transmitted in the same slot in V2X, c=d.

Here, after initial transmission in "TTI m+c", only retransmission in "TTI m+e" is mentioned. However, retransmission may be performed up to three times by a value of $N_{max}$. For example, if $N_{max}=1$, only the initial transmission in "TTI m+c" may be present. If $N_{max}=2$, the initial transmission in "TTI m+c" and the retransmission in "TTI m+e" may be present. If $N_{max}=3$, the initial transmission in "TTI m+c", the retransmission in "TTI m+e", and, although not illustrated, retransmission in "TTI m+f" may be present.

"TTI m+c'" may correspond to a TTI for transmission of SA #2 (second SA) (or, if a single TTI corresponds to a single slot, a slot for transmission of SA #2 (second SA)). "TTI m+d'" may correspond to a TTI for initial transmission of TB #2 (second TB) instructed by SA #2 (second SA) and transmitted (or, if a single TTI corresponds to a single slot, a slot for initial transmission of TB #2 (second TB)). "TTI m+e'" may correspond to a TTI for retransmission of TB #2 (second TB) that is instructed by SA #2 (second SA) and transmitted (or, if the single TTI corresponds to a single slot, a slot for retransmission of TB #2 (second TB)).

In the example of FIG. 9, since it is considered that SA and data are transmitted in the same slot in V2X, c'=d'.

Here, referring to Table 9, $T_1 \leq c \leq T_2$, $T_1 \leq T_{proc,1}$, and $T_2 \geq T_{2,min}$. Here, if u=0, 1 (i.e., if SCS=15 kHz, 30 kHz), it may be fixed to a value corresponding to $T_{proc,1}=3$ slots. Also, if u=2, 3 (i.e., if SCS=60 kHz, 120 kHz), it may be fixed to a value corresponding to $T_{proc,1}=4$ slots. Also, $T_{2,min}$ may be (pre-)configured as a value corresponding to $5 \cdot 2^u$, $10 \cdot 2^u$ or $20 \cdot 2^u$ slots.

Also, a value of "e-c" corresponding to a duration between initial transmission and retransmission of the same TB may be indicated through SCI as a value corresponding to 0, 1, 2, . . . , 31 slots. If the value is zero, it indicates that there is no retransmission after the initial transmission. If the value is $N_{retransmission} \in \{1, 2, \ldots, 31\}$, it may indicate that retransmission of the same TB is present after $N_{retransmission}$ slots from the initial transmission.

In detail, resources for the initial transmission and the retransmission of the same TB may be defined within a W duration and, here, W corresponds to 32 slots. That is, within the W duration corresponding to 32 slots starting from slot "TTI m+c" corresponding to the initial transmission to "TTI m+c+31", 0, 1, or 2 retransmissions are possible according to the aforementioned value of $N_{max}$ after the initial transmission. Specifically, in which slot each corresponding retransmission is performed among 32 slots may be indicated through SCI. If $N_{max}=2$, the retransmission is possible in corresponding "TTI m+e" after $N_{retransmission} \in \{1, 2, \ldots, 31\}$ slots from "TTI m+c".

Also, it may be expressed as d'=d+P*j (since c=d and c'=d', c'=c+P*j) and thus, it may be expressed as d'−d=c'−c=P*j. Here, P denotes a resource reservation interval.

A value of P may be determined by upper layer signaling. Here, a maximum value of P*j may be expressed as $P_{max}$. P=100 ms ($100 \cdot 2^u$ slots), but it is provided as an example only. Here, j may be determined through carrier-specific network configuration or pre-configuration used for V2X within the range of [0, 1, . . . , 10]. Also, a single value among values selected for j may be selected and indicated through a signaling field "Resource reservation" of SCI included in SA. Here, j=0 indicates that a value of d' is absent, that is, that a resource reservation is absent after a TTI corresponding to "P*j" from "TTI m+d" for transmission of TB #2 (second TB). Also, only if j=1, a value of P may be one of 5, 10, 20, and 50 ms. Therefore, a value of $P_{max}$ may correspond to one of values corresponding to 0, 5, 10, 20, 50, 100, 200, 300, . . . , 1000 ms.

A meaning of "indicated by SCI" in Table 9 includes that, in the case of the UE autonomous resource selection mode (or mode 2), a transmitting UE (or a first UE) autonomously determines a corresponding parameter value and then uses a parameter to be used for Table 9 based on the determined value and instructs a receiving UE (second UE) through SCI such that the receiving UE (or the second UE) may know the determined value.

FIG. 10 illustrates a V2X resource allocation method to which the present disclosure may apply to.

As described above, in the eNodeB resource scheduling mode (or mode 1), a slot in which SA is transmitted may be a first slot included in a set of the resource candidates that may be used for V2X on a V2X carrier (or band) among slots after Ams (here, A=4, but not limited thereto) from a slot in which the eNodeB transmits DCI. Here, information about a resource block that is a frequency axis resource used for transmission of the SA within the slot in which the SA is transmitted may be indicated through the DCI.

Also, in the eNodeB resource scheduling mode (or mode 1), the DCI includes contents related to the SCI included in the SA as information required for the UE to transmit data in V2X communication. The DCI is transmitted from the eNodeB to the UE.

Here, a first UE may determine sidelink scheduling information based on the DCI and may generate the determined sidelink scheduling information as first SCI and second SCI. The first UE may transmit the first SCI to a second UE through a PSCCH and may transmit the second SCI to the second UE through a portion of available PSSCH transmission resources. The second UE may identify a sidelink resource through which the first UE is to transmit sidelink data through a PSSCH based on the first and second SCI received from the first UE. The second UE may receive the sidelink data from the first UE through the PSSCH on the identified resource.

Also, in the UE autonomous resource selection mode (or mode 2), the UE autonomously determines a slot in which the SA is transmitted within the resource pool through sensing and a resource block that is a frequency axis resource used for transmission of the SA within the slot in which the SA is transmitted may be autonomously determined by the UE within the resource pool. Therefore, dissimilar to the eNodeB resource scheduling mode (or mode 1), in the UE autonomous resource selection mode (or mode 2), the UE autonomously determines a resource without separately receiving signaling fields related to resource scheduling included and thereby indicated in the DCI.

Also, in the UE autonomous resource selection mode (or mode 2), the contents related to the SCI included in the SA as information required for the UE to transmit data in V2X communication is autonomously determined by the UE. Therefore, dissimilar to the eNodeB resource scheduling mode (or mode 1), in the UE autonomous resource selection mode (or mode 2), the UE performs autonomous determination without separately receiving signaling fields related to the SCI included and thereby indicated in the DCI.

Here, the first UE may autonomously determine sidelink scheduling information and may generate the determined sidelink scheduling information as first SCI and second SCI. The first UE may transmit the first SCI to the second UE through the PSCCH and may transmit the second SCI to the second UE through a portion of available PSSCH transmission resources. The second UE may identify a sidelink resource through which the first UE is to transmit sidelink data through the PSSCH based on the first and second SCI received from the first UE. The second UE may receive the sidelink data from the first UE through the PSSCH on the identified resource.

That is, there is a difference in that the SCI included in the SA as information required for the UE to transmit data is scheduled by the eNodeB in the eNodeB resource scheduling mode (or mode 1) and autonomously selected by the UE in the UE autonomous resource selection mode (or mode 2). However, in both of the eNodeB resource scheduling mode (or mode 1) and the UE autonomous resource selection mode (or mode 2), the SCI included in the SA is required for a data receiving UE (the receiving UE or the second UE) recto decode data transmitted from a data transmitting UE (the transmitting UE or the first UE). Therefore, the data transmitting UE (or the first UE) needs to transmit the SA including the SCI to the data transmitting UE (or the second UE).

As described above, configuration of the pool resource in V2X, particularly, for V-UE is described above with reference to FIGS. 7 and 8 and a sensing-based resource selection method is described above with reference to FIG. 9.

Dissimilar to vehicle-to-vehicle (V2V) that considers V-UE, additional energy saving may be considered in vehicle-to-pedestrian (V2P) that is transmitted from V-UE to pedestrian-user equipment (P-UE) or pedestrian-to-vehicle (P2V) that is transmitted from P-UE to V-UE. That is, although the V-UE may not consider a power limitation situation as the UE that is included in the vehicle, the P-UE is a UE of a pedestrian with limited battery power and thus, needs to consider the power limitation situation.

Therefore, as illustrated in FIG. 8, for V-UE, a sensing-based resource selection method (hereinafter, a full sensing method) may be applied to all of resources within a specific duration (e.g., 1000 ms corresponding to a duration from "TTI m-a" to "TTI m-b"). Meanwhile, for P-UE, a sensing-based resource selection method (hereinafter, a partial sensing method) is required with respect to some resources within a specific duration (e.g., 1000 ms corresponding to the duration from "TTI m-a" to "TTI m-b") to save power consumption.

A case in which the P-UE transmits sidelink control information and data to the V-UE (corresponding to a case in which V2P communication is performed and a case in which the V-UE, such as a vehicle, acquires information about the P-UE, such as a pedestrian, and prepares for safety matters) may be considered. On the contrary, a case in which the P-UE does not receive the sidelink control information and the data from the V-UE (corresponding to a case in which V2P communication is not performed and a case in which the V-UE, such as a vehicle, does not need to acquire information about the P-UE, such as a pedestrian, and to prepare for safety matters) may be considered. In the case of considering a case of supporting devices lacking such sidelink reception capabilities, a random-based resource selection method (hereinafter, a random resource selection method) is also required for the P-UE.

That is, the full sensing method as in the example of FIG. 8 may be applied to the resource selection method for the V-UE and the resource pool may be configured as in the examples of FIGS. 7 and 8.

Although the resource selection method for the P-UE that considers power limitations may require the partial sensing method, a detailed operation related thereto is not defined so far. Also, a detailed configuration method is not defined so far with respect to the resource pool for the P-UE that considers power limitations.

Also, although the random resource selection method may need to be applied to the resource selection method for the P-UE lacking the sidelink reception capability, a detailed operation related thereto is not defined so far. Also, a detailed configuration method is not defined so far with respect to the resource pool for the P-UE that lacks the sidelink reception capability.

The partial sensing-based resource pool for P-UE (particularly, a slot pool corresponding to a time domain resource) may be defined based on the full sensing-based resource pool for V-UE (particularly, the slot pool corresponding to the time domain resource) as in the examples of FIGS. 7 and 8. That is, the full sensing method and the partial sensing method may simply differ in terms of a sensing window size and may perform a similar sensing-based operation, which may lead to simplifying complexity.

Also, the random resource selection-based resource pool for P-UE (particularly, the slot pool corresponding to the time domain resource) may be independently defined from the full sensing-based resource pool for V-UE (particularly, the slot pool corresponding to the time domain resource) as in the examples of FIGS. 7 and 8. When the resource pool for P-UE (particularly, the slot pool corresponding to the time domain resource) is independently configured, the performance of the P-UE may be improved compared to sharing the resource pool (particularly, the slot pool corresponding to the time domain resource). That is, since a random resource selection-based resource for P-UE is independently configured without being affected by other resources (e.g., a partial sensing-based resource for P-UE and/or a full sensing-based resource for V-UE), the performance of the P-UE may be improved.

On the other hand, the random resource selection-based resource pool for P-UE (particularly, the slot pool corresponding to the time domain resource) may be defined by sharing the full sensing based-resource pool for V-UE (particularly, the slot pool corresponding to the time domain resource) as in the examples of FIGS. 7 and 8. This is to prevent a decrease in resources available for V2V when configuring an independent resource for the P-UE, thereby affecting the performance of V2V. Also, since a single pool is used through sharing, it is possible to more efficiently use resources without wasting resources.

Here, the random resource selection-based resource pool for P-UE (particularly, the slot pool corresponding to the time domain resource) and the partial sensing based-resource pool for P-UE (particularly, the slot pool corresponding to the time domain resource) may be distinguished from each other with mutual orthogonality. This is to ensure that resources used by partial sensing-based P-UEs do not interfere with random resource selection-based P-UEs.

Hereinafter, prior to describing a method of configuring the partial sensing-based resource selection method and resource pool for P-UE (particularly, the slot pool corresponding to the time domain resource), a configuration of the full sensing-based V-UE resource selection and resource pool is initially described.

Figure 11:
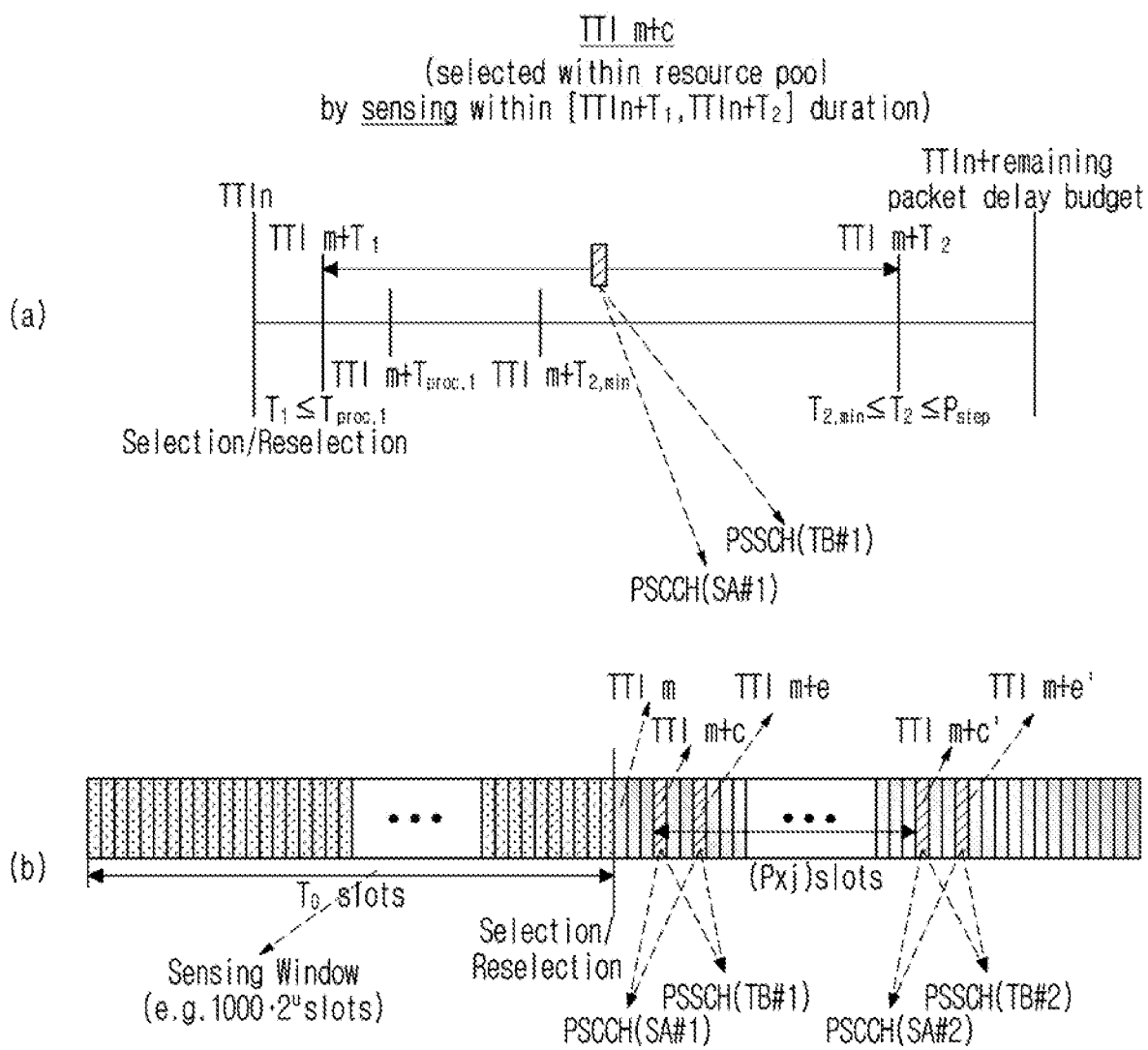
FIG. 11 illustrates a full sensing-based resource selection and resource pool configuration to which the present disclosure may apply.

FIG. 11 illustrates a full sensing-based resource selection and resource pool configuration to which the present disclosure may apply.

In FIG. 11, the resource pool may be configured based on an excepted slot and bitmap repetition within an SFN or DFN period, which is described in the example of FIG. 7. A resource may be selected based on sensing from the resource pool configured as above.

Referring to FIG. 11 (e.g., part (a) of FIG. 11), in the case of TTI m+c, a transmission resource is selected from the resource pool that belongs to a duration of [TTI m+$T_1$, TTI m+$T_2$] and a sensing result in consecutive resource slots (i.e., a sensing window in full sensing) may be used for resource selection.

Here, $m \leq m+T_1 \leq m+T_{proc,1}$ and $m+T_{2,min}+T_2 \leq m+P_{step}$. That is, values of $T_1$ and $T_2$ may be determined using $T_1 \leq T_{proc,1}$ and $T_{2,min} \leq T_2 \leq P_{step}$.

Here, as described above, if u=0, 1 (i.e., if SCS=15 kHz, 30 kHz), it may be fixed to a value corresponding to $T_{proc,1}$=3 slots. If u=2, 3 (i.e., if SCS=60 kHz, 120 kHz), it may be fixed to a value corresponding to $T_{proc,1}$=4 slots. Also, $T_{2,min}$ may be (pre-)configured as a value corresponding to $5 \cdot 2^u$, $10 \cdot 2^u$, or $20 \cdot 2^u$ slots.

$P_{step}$ refers to a maximum value of a window (i.e., selection window) for selection of V2X data transmission resource and a value that considers traffic period of a periodic V2X message in an upper layer. For example, 100 ms ($100 \cdot 2^u$ slots) that is a maximum value among the aforementioned resource reservation interval P values may be a value of $P_{step}$, but is not limited thereto.

Referring to FIG. 11 (e.g., part (b) of FIG. 11), sensing may be performed on a total of $T_o$ slots. Here, $T_o$ slots may correspond to slots corresponding to a duration from "TTI m-a" to "TTI m-b". For example, as described above, if $a=T_o=1000 \cdot 2^u$ (slots) and $b=T_{proc,0}-1$, a resource occupied and used by another terminal may be verified through sensing on a sensing window corresponding to $1000 \cdot 2^u$ slots. Based thereon, transmission of a control channel and a data channel may be performed on resources (i.e., TTI m+c, TTI m+e, TTI m+c', and TTI m+e' are selected) from among the remaining resources excluding the resource being occupied and used or to be used by the other UE from among the resources that belong to the resource pool.

Here, TTI m+c and TTI m+c' (similarly, TTI m+e and TTI m+e') may differ by P*j TTIs (P*j slots if a single TTI represents a single slot to which the resource pool indication bitmap is to be applied). Here, the maximum value of P*j may be expressed as $P_{max}$. Here, P=100 ms ($100 \cdot 2^u$ slots), but without being limited thereto, may be determined by upper layer signaling. Also, j may be determined through carrier-specific network configuration or pre-configuration used for V2X within the range of [0, 1, . . . , 10]. Also, a single value among values selected for j may be selected and indicated through a signaling field "Resource reservation" of SCI included in SA. Here, j=0 indicates that a value of c' is absent, that is, that a resource reservation is absent after a TTI corresponding to "P*j" after "TTI m+c" for transmission of TB #2 (second TB). Also, only if j=1, a value of P may be one of 5, 10, 20, and 50 ms. Therefore, a value of $P_{max}$ may correspond to one of values corresponding to 0, 5, 10, 20, 50, 100, 200, 300, . . . , 1000 ms.

Figure 12:
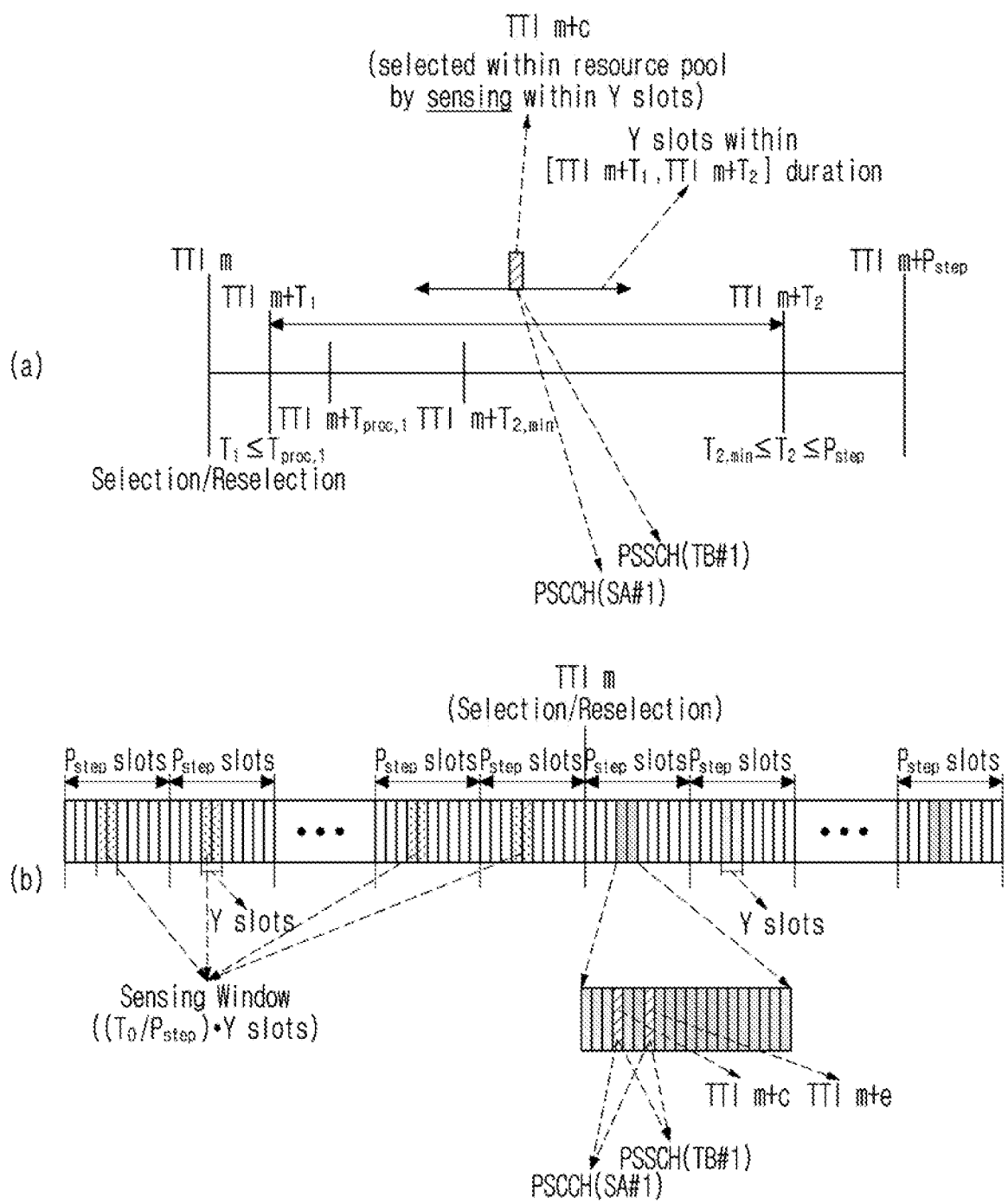
FIG. 12 illustrates a partial sensing-based resource selection and resource pool configuration to which the present disclosure may apply.

FIG. 12 illustrates a partial sensing-based resource selection and resource pool configuration to which the present disclosure may apply.

In FIG. 12, the resource pool may be configured based on an excepted slot and bitmap repetition within an SFN or DFN period, which is described in the example of FIG. 7. A resource may be selected based on sensing from the resource pool configured as above.

Referring to FIG. 12(a), in the case of partial sensing, TTI m+c selects a transmission resource from the resource pool that belongs to a resource area corresponding to Y slots and a sensing result in inconsecutive resource slots (i.e., a sensing window in partial sensing) may be used for resource selection. Here, Y slots may be selected within a duration of [TTI m+$T_1$, TTI m+$T_2$].

That is, in the case of full sensing, a data transmission resource may be selected within the resource pool included in the duration of [TTI m+$T_1$, TTI m+$T_2$] using the sensing results in the sensing window that includes consecutive resource slots of [TTI m-a, TTI m-b]. In the case of partial sensing, the data transmission resource may be selected from among Y slots within the duration of [TTI m+$T_1$, TTI m+$T_2$] using the sensing results in the sensing window that includes inconsecutive resource slots. As described above, a size of a sensing target in partial sensing may decrease compared to full sensing.

Referring to FIG. 12(b), to determine whether to select a resource to be sensed corresponding to Y slots within the selection window, partial sensing is performed only with respect to a total of $(T_o/P_{step}) \cdot Y \cdot N/10$ slots. That is, a sensing reference resource within the sensing window may be configured with $(T_o/P_{step}) \cdot Y \cdot N/10$ slots. If N=10, partial sensing may be performed on a total of $(T_o/P_{step}) \cdot Y$ slots (i.e., sensing reference resource) as illustrated in FIG. 12.

A total of $T_o$ slots that belong to the sensing window may be divided into a predetermined duration corresponding to $P_{step}$ slots, partial sensing may be performed on Y slots within the predetermined duration corresponding to the $P_{step}$ slots. The predetermined duration corresponding to the $P_{step}$ slots may be repeated a total of $(T_o/P_{step}) \cdot N/10$ times. A sub-duration corresponding to Y slots is present within a predetermined duration corresponding to each of the $P_{step}$ slots and partial sensing may be performed within such sub-durations. That is, the sub-duration may correspond to a partial sensing unit duration.

Therefore, a resource occupied and used by another UE may be verified from sensing reference resources corresponding to a total of $(T_o/P_{step}) \cdot Y \cdot N/10$ slots on the sensing window. Based thereon, transmission of the control channel and the data channel may be performed on resources (e.g., TTI m+c and TTI m+e may be selected and, although not illustrated in FIG. 12, if configuration of TTI m+c' and TTI m+e' is supported as in FIG. 9, a corresponding resource may be selected) selected from among the remaining resources excluding the resource being occupied and used or to be used by the other UE from among the resources that belong to the resource pool.

Parameter values related to FIG. 12 are arranged as follows:

$T_o$: $T_o$ slots corresponds to slots that belong to a duration of from "TTI m-a" to "TTI m-b" in full sensing. For example, as described above, if $a=T_o=1000 \cdot 2^u$ (slots) and $b=T_{proc,0}=1$, To may be a value corresponding to $1000 \cdot 2^u$ slots.

$P_{step}$ and N: $P_{step}$ corresponds to the maximum value of the selection window, for example, $100 \cdot 2^u$ (slots) corresponding to 100 m, but is not limited thereto. Here, N may correspond to a number of predetermined durations of $P_{step}$ size that includes the sensing reference resource among predetermined durations with a plurality of $P_{step}$ sizes. For example, if $T_o$=1000 ms and $P_{step}$=100 ms, a total of ten (1000 ms/100 ms) durations may be present and a size of each of the ten predetermined durations may be 100 ms. Here, the predetermined duration that includes the sensing reference resource among the ten predetermined durations may be indicated with a 10-bit bitmap (hereinafter, a sensing reference resource indication bitmap). That is, each bit position of the 10-bit bitmap may correspond to one of the ten predetermined durations. Here, a value of N may correspond to a number of bit positions having a bit value of 1 in the 10-bit bitmap.

Y: Y may be referred to as the partial sensing unit duration. That is, Y may be configured with some slots within a partial duration corresponding to [TTI m+$T_1$, TTI m+$T_2$], which is described above with reference to FIG. 12, within the predetermined duration corresponding to $P_{step}$ slots. Here, $T_1 \leq T_{proc,1}$ and $T_{2,min} \leq T_2 \leq P_{step}$. Here, if u=0, 1 (i.e., if SCS=15 kHz, 30 kHz), it may be fixed to a value corresponding to $T_{proc,1}$=3 slots. Also, if u=2, 3 (i.e., if SCS=60 kHz, 120 kHz), it may be fixed to a value corresponding to $T_{proc,1}$=4 slots. Also, $T_{2,min}$ may be (pre-)configured as a value corresponding to $5 \cdot 2^u$, $10 \cdot 2^u$ or $20 \cdot 2^u$ slots.

As described above, the UE may select a sidelink transmission resource based on partial sensing. To meet requirements in NR V2X, there is a need to minimize power consumption of a partial sensing performing UE (e.g., a sidelink transmitting UE or first UE) or to not perform unnecessary sensing. Also, it is necessary to improve the resource use efficiency of the entire system by ensuring there is no missing duration in sensing. Hereinafter, examples according to the present disclosure to improve the partial sensing operation is described.

For example, when a resource reservation interval has a period less than the maximum value of the selection window, unnecessary sensing may be performed or the sensing missing duration may occur. Here, the resource reservation interval may be expressed as a value of P. For example, the value of P may be determined as one of 0, 5, 10, 20, 50, 100, 200, 300, . . . , 1000 ms according to a value of j. The maximum value of the selection window may be expressed as a value of $P_{step}$. For example, the value of $P_{step}$ may be 100 ms (or ($100 \cdot 2^u$ slots)). As a detailed example, if $P<P_{step}$ (e.g., if P=5, 10, 20, 50 ms), unnecessary sensing may be performed or the sensing missing duration may occur.

Example 1

If the resource reservation interval is less than the maximum value of the selection window (i.e., $P<P_{step}$) and the partial sensing unit duration (or the sub-duration) is greater than the resource reservation interval (i.e., Y>P), the partial sensing window may be greater than an actual required resource selection area and thus, the unnecessary partial consumption may occur in partial sensing. Here, Y that is the partial sensing unit duration (or sub-duration) may be configured with some slots within a partial duration corresponding to [TTI m+$T_1$, TTI m+$T_2$] within the predetermined duration corresponding to $P_{step}$ slots (refer to FIG. 12). Here, $T_1 \leq T_{proc,1}$ and $T_{2,min} \leq T_2 \leq P_{step}$. In an example in which Y is slots corresponding to a duration of 40 ms from TTI m+10 ms to TTI m+55 ms, if P=20 ms, unnecessary partial sensing may be performed in slots corresponding to a difference between Y and P (i.e., 25 ms(=45 ms-20 ms)).

This example may include at least one of a method of changing at least one of $P_{step}$ and $T_2$, which are bases of configuring Y that is the partial sensing unit duration (or sub-duration), and a method of limiting Y based on TTI m+P. Therefore, it is possible to prevent unnecessary partial sensing from being performed.

Example 1-1

This example may include a method of changing $P_{step}$, which is a basis of configuring Y that is the partial sensing unit duration (or sub-duration), with P'.

Figure 13:
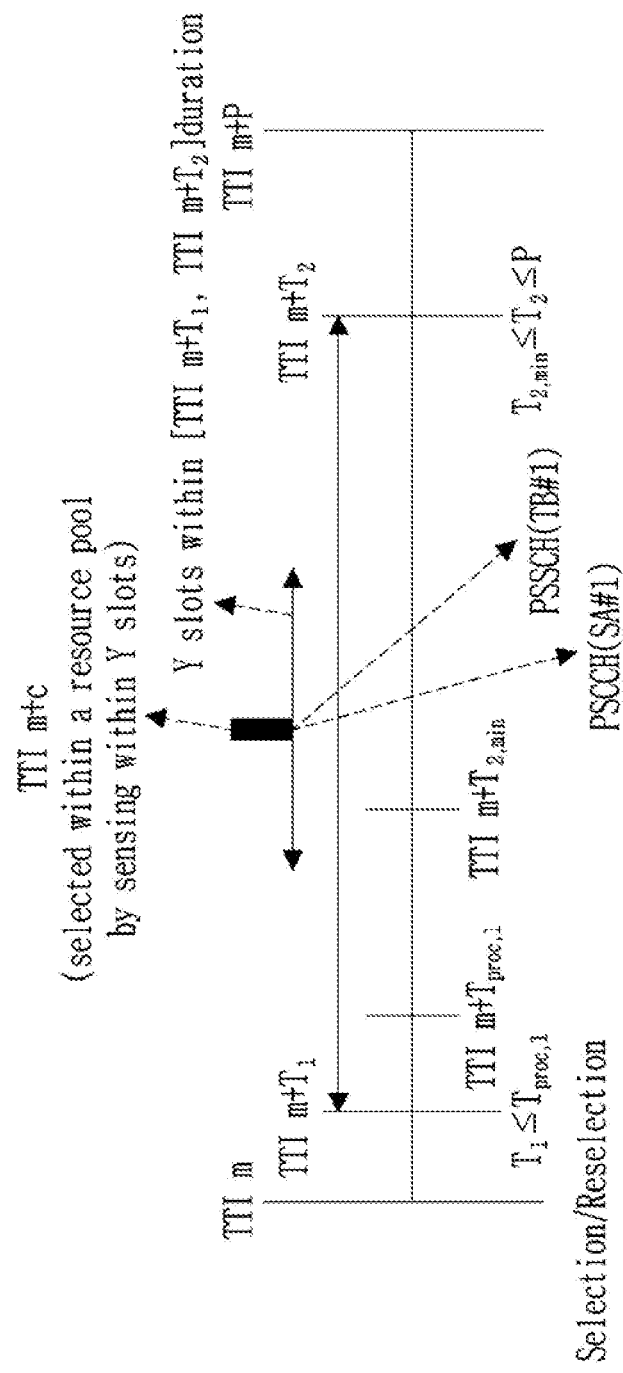
FIG. 13 illustrates an example of a partial sensing-based resource selection method to which the present disclosure may apply.

FIG. 13 illustrates an example of a partial sensing-based resource selection method to which the present disclosure may apply.

The example of FIG. 13 may include applying P' instead of $P_{step}$ in the example of FIG. 12.

Here, P' may be defined with a larger value between $T_{2,min}$ and P. If P is greater than or equal to $T_{2,min}$ at all times, P'=P.

Therefore, Y may be configured with some slots within a partial duration corresponding to [TTI m+$T_1$, TTI m+$T_2$] of FIG. 13 within the predetermined duration corresponding to P' slots. Here, $T_1 \leq T_{proc,1}$ and $T_{2,min} \leq T_2 \leq P'$. Here, if u=0, 1 (i.e., if SCS=15 kHz, 30 kHz), it may be fixed to a value corresponding to $T_{proc,1}$=3 slots. Also, if u=2, 3 (i.e., if SCS=60 kHz, 120 kHz), it may be fixed to a value corresponding to $T_{proc,1}$=4 slots. Also, $T_{2,min}$ may be (pre-)configured with a value corresponding to $5 \cdot 2^u$, $10 \cdot 2^u$, or $20 \cdot 2^u$ slots.

The value of P may be one of 5, 10, 20, 50, and 100 ms. Alternatively, some values less than or equal to a reference value among values of P may not be used for partial sensing. If reference value=10 ms, the value of P may be one of 20, 50, and 100 ms.

Example 1-2

This example may include changing $T_2$, which is a basis of configuring Y that is the partial sensing unit duration (or sub-duration), with $T_2 \cdot i$.

Figure 14:
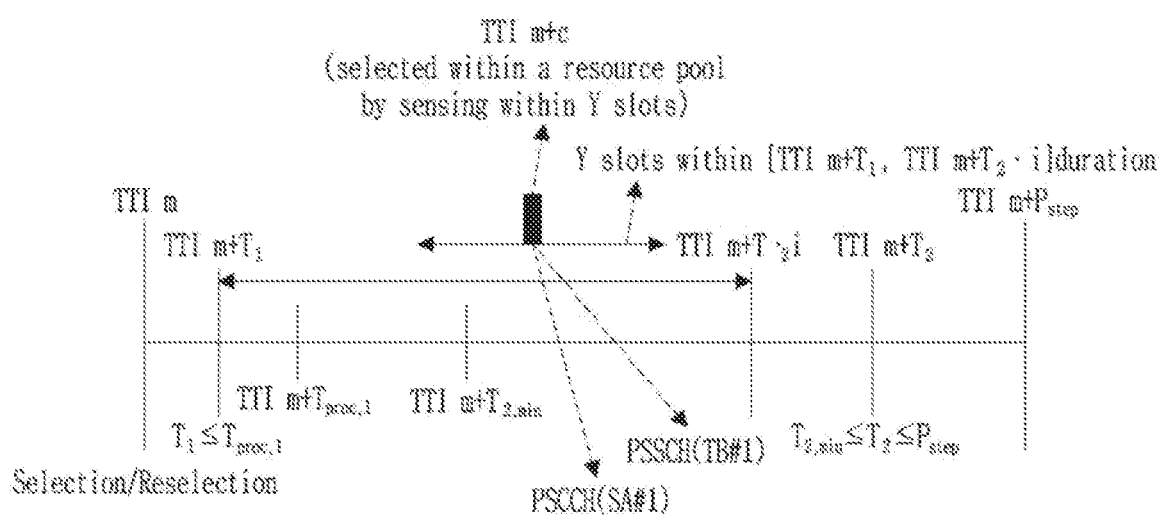
FIG. 14 illustrates an additional example of a partial sensing-based resource selection method to which the present disclosure may apply.

FIG. 14 illustrates an additional example of a partial sensing-based resource selection method to which the present disclosure may apply.

The example of FIG. 14 may include applying $T_2 \cdot I$ instead of $T_2$ in the example of FIG. 12.

Here, i(0<i≤1) may be defined as $P/P_{step}$.

Dissimilar to selecting some slots within the partial duration corresponding to [TTI m+$T_1$, TTI m+$T_2$] slots as Y slots in the example of FIG. 12, some slots within the partial duration corresponding to [TTI m+$T_1$, TTI m+$T_2 \cdot i$] may be selected as Y slots in the example of FIG. 14.

Therefore, Y may be configured with some slots within the partial duration corresponding to [TTI m+$T_1$, TTI m+$T_2 \cdot i$] of FIG. 14 within the predetermined duration corresponding to $P_{step}$ slots. Here, $T_1 \leq T_{proc,1}$ and $T_{2,min} \leq T_2 \leq P_{step}$. Here, if u=0, 1 (i.e., if SCS=15 kHz, 30 kHz), it may be fixed to a value corresponding to $T_{proc,1}$=3 slots. Also, if u=2, 3 (i.e., if SCS=60 kHz, 120 kHz), it may be fixed to a value corresponding to $T_{proc,1}$=4 slots. Also, $T_{2,min}$ may be (pre-)configured with a value corresponding to $5 \cdot 2^u$, $10 \cdot 2^u$, or $20 \cdot 2^u$ slots.

The value of P may be one of 5, 10, 20, 50, and 100 ms. Alternatively, some values less than or equal to the reference value among values of P may not be used for partial sensing. If reference value=10 ms, the value of P may be one of 20, 50, and 100 ms.

Example 1-3

This example may include limiting Y based on TTI m+P in configuring Y that is the partial sensing unit duration (or sub-duration).

Figure 15:
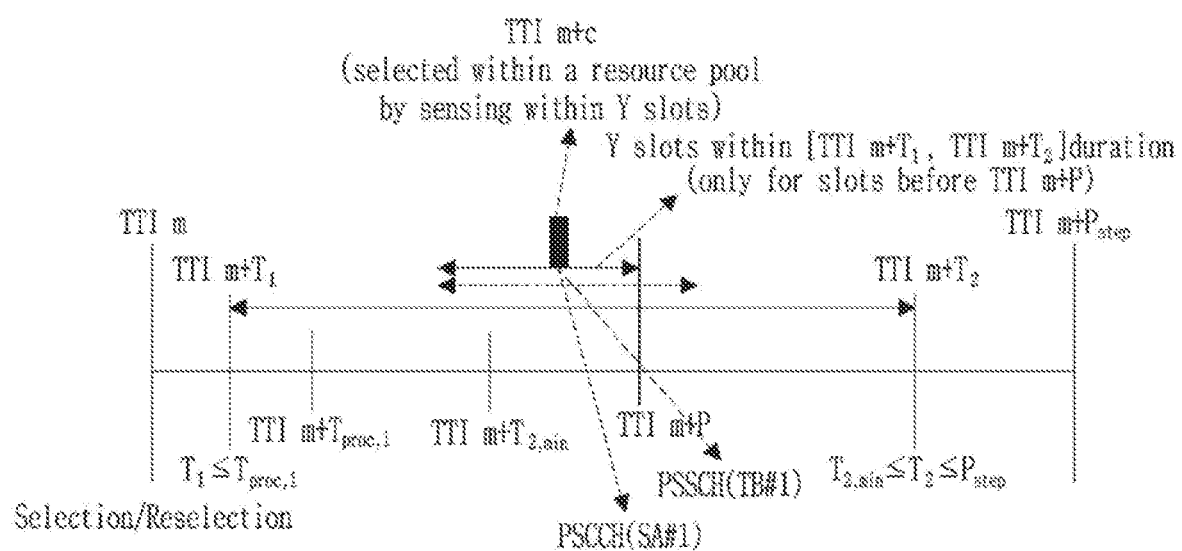
FIG. 15 illustrates an additional example of a partial sensing-based resource selection method to which the present disclosure may apply.

FIG. 15 illustrates an additional example of a partial sensing-based resource selection method to which the present disclosure may apply.

The example of FIG. 15 may include additionally applying a condition of limiting Y slots to previous slots of TTI m+P while selecting Y slots as in the example of FIG. 12.

That is, some slots may be selected as Y slots within a partial duration corresponding to [TTI m+$T_1$, TTI m+$T_2$] and slots that belong to [TTI m+P, TTI m+$P_{step}$] may not be selected as (or excepted from) Y slots.

In other words, if $T_2 \leq P$, some slots may be selected as Y slots within the partial duration corresponding to [TTI m+$T_1$, TTI m+$T_2$]. If $T_2 > P$, some slots may be selected as Y slots within the partial duration corresponding to [TTI m+$T_1$, TTI m+P].

Therefore, Y may be configured with some slots within the partial duration corresponding to [TTI m+$T_1$, TTI m+$T_2$] of FIG. 15 within the predetermined duration corresponding to $P_{step}$ slots. Here, previous slots of TTI m+P may be Y slots (i.e., slots beyond TTI m+P may be excepted from the Y slots). Here, $T_1 \leq T_{proc,1}$ and $T_{2,min} \leq T_2 \leq P_{step}$. Here, if u=0, 1 (i.e., if SCS=15 kHz, 30 kHz), it may be fixed to a value corresponding to $T_{proc,1}$=3 slots. Also, if u=2, 3 (i.e., SCS 가 60 kHz, 120 kHz), it may be fixed to a value corresponding to $T_{proc,1}$=4 slots. Also, $T_{2,min}$ may be (pre-)configured with a value corresponding to $5 \cdot 2^u$, $10 \cdot 2^u$, or $20 \cdot 2^u$ slots.

The value of P may be one of 5, 10, 20, 50, and 100 ms. Alternatively, some values less than or equal to the reference value among values of P may not be used for partial sensing. If reference value=10 ms, the value of P may be one of 20, 50, and 100 ms.

Example 2

If the resource reservation interval is less than the maximum value of the selection window (i.e., $P<P_{step}$), some resource reservation intervals may not belong to the partial sensing unit duration (or sub-duration). That is, if data (or TB) generated in the upper layer is delivered to the physical layer at periods of P, a duration corresponding to a $K^{th}$ P period may not belong to the Y slots. In this case, a sensing missing duration may occur. For example, Y may be set to period of $P_{step}$=100 ms and if data is delivered in a shorter period than $P_{step}$ (e.g., 20 ms or 50 ms), resource selection (or reselection) may be performed at a shorter period than $P_{step}$ before sensing in the Y slot is performed at the period of $P_{step}$. Therefore, a missing probability of actual information may increase.

This example may include at least one of a method of chanting at least one of $P_{step}$ and $T_o$, which are bases of configuring Y that is the partial sensing unit duration (or sub-duration), and a method of changing a format of the sensing reference resource indication bitmap. Therefore, sensing missing may be prevented.

Figure 16:
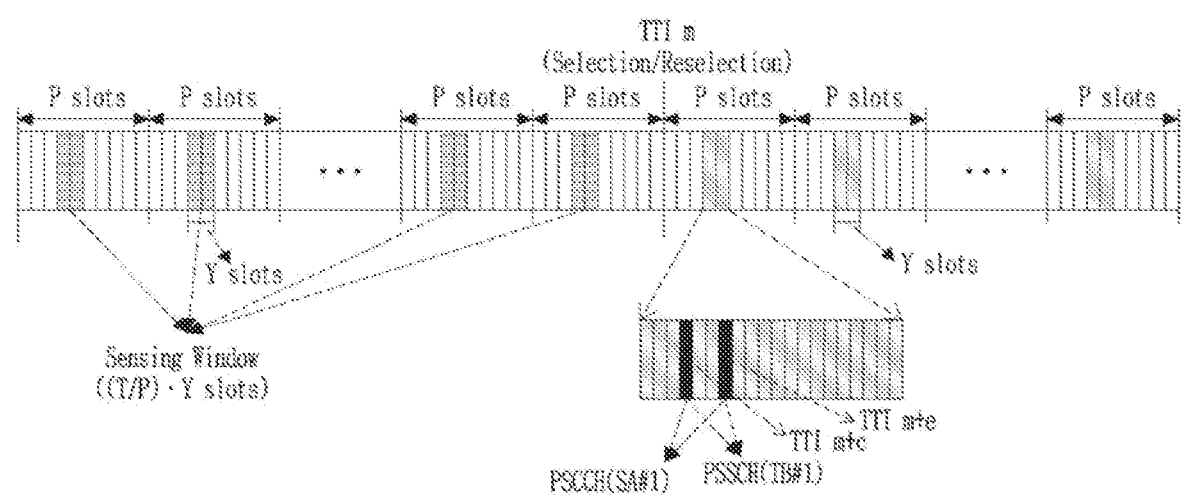
FIG. 16 illustrates an example of a partial sensing resource pool configuration to which the present disclosure may apply.

FIG. 16 illustrates an example of a partial sensing resource pool configuration to which the present disclosure may apply.

The example of FIG. 16 may include changing $P_{step}$ with $P_{step}$ in the example of FIG. 12. In this case, instead of dividing $T_o$ slots into predetermined durations each with $P_{step}$ slots, the $T_o$ slots may be divided into predetermined durations each with $P_{step}'$ slots. Here, although the value of $P_{step}$ is configured or given as in the example of FIG. 12, a value of $P_{step}$ corresponding to a size of the predetermined duration may be expressed as being configured separate from $P_{step}$.

Here, $P_{step}'$=P. That is, the size ($P_{step}'$) of the predetermined duration may be configured to be the same as the resource reservation interval (P). However, it may not indicate that the maximum value ($P_{step}$) of the selection window is substituted or changed with $P_{step}'$.

Here, the value of $P_{step}'$ that is the same size of the predetermined duration as the resource reservation interval may be one of 5, 10, 20, 50, and 100 ms. Alternatively, some values less than or equal to the reference value among values of $P_{step}$ may not be used for partial sensing. If reference value=10 ms, the value of $P_{step}$ may be one of 20, 50, and 100 ms.

Separate therefrom or additionally, the example of FIG. 16 may include changing $T_o$ with T in the example of FIG. 12. Here, it may be defined as $T=T_o \cdot i$. Here, it may be defined as $i(0<i \leq 1)=P_{step}'/P_{step}=P/P_{step}$. Here, i may be defined as a ratio of the size of the predetermined duration (or resource reservation interval) and the maximum value of the selection window.

As described above, if at least one of $P_{step}$ and $T_o$ is changed, a format of a bitmap (i.e., a sensing reference resource indication bitmap) indicating a predetermined duration that includes a sensing reference resource among predetermined durations of the predetermined $P_{step}$ sizes within slots corresponding to a time of $T_o$ may be changed. Therefore, definition related to a value of N corresponding to a number of bit positions having a bit value of 1 in the sensing reference resource indication bitmap may be changed as follows.

Example 2-1

This example may include configuring the size of the predetermined duration to be equal to the resource reservation interval and not changing $T_o$. That is, this example corresponds to an example in which $P_{step}'$=P and $T_o$=1000 ms are applied.

In this case, with respect to $T_o$=1000 ms, the number of bit positions having the bit value of 1 may be defined in a 10/i-bit bitmap corresponding to a total of 10/I (1000 ms/$P_{step}'$=1000 ms/P) predetermined durations. Here, $i(0<i \leq 1)=P_{step}'/P_{step}=P/P_{step}$.

If $P_{step}'$=P=100 ms and $P_{step}$=100 ms, $i=P_{step}'/P_{step}$=1 and $T_o$=1000 ms may be divided into a total of 10(=10/1) predetermined durations. That is, 10 predetermined durations each with the size of 100 ms may be present. In this case, the sensing reference resource indication bitmap may have a format of a 10-bit bitmap. That is each bit position of the 10-bit bitmap may correspond to one of 10 predetermined durations. Here, N may correspond to the number of bit positions having the bit value of 1 in the 10-bit bitmap.

If $P_{step}'$=P=50 ms and $P_{step}$=100 ms, $i=P_{step}'/P_{step}$=0.5 and $T_o$=1000 ms may be divided into a total of 20(=10/0.5) predetermined durations. That is, 20 predetermined durations each with the size of 20 may be present. In this case, the sensing reference resource indication bitmap may have a format of a 20-bit bitmap. That is, each bit position of the 20-bit bitmap may correspond to one of 20 predetermined durations. Here, N may correspond to the number of bit positions having the bit value of 1 in the 20-bit bitmap.

If $P_{step}'$=P=20 ms and $P_{step}$=100 ms, $i=P_{step}'/P_{step}$=0.2 and $T_o$=1000 ms may be divided into a total of 50(=10/0.2) predetermined durations. That is, 50 predetermined durations each with the size of 20 ms may be present. In this case, the sensing reference resource indication bitmap may have a format of a 50-bit bitmap. That is, each bit position of the 50-bit bitmap may correspond to one of 50 predetermined durations. Here, N may correspond to the number of bit positions having the bit value of 1 in the 50-bit bitmap.

As described above, a length of the sensing reference resource indication bitmap may be differently determined according to a value of P. That is, in the aforementioned examples, the 10-bit, 20-bit, and 50-bit bitmaps may be configured to be independent with respect to each other.

Example 2-2

Similar to example 2-1, this example may include applying $P_{step}'$=P and $T_o$=1000 ms and thereby configuring the sensing reference resource indication bitmap as the 10/i-bit bitmap.

Here, the 10/i-bit bitmap may include repetitions of a predetermined unit bitmap. For example, if the predetermined unit is 10-bit, the 10/i-bit bitmap may include 1/i repetitions of the 10-bit bitmap. For example, the 10-bit, 20-bit, and the 50-bit bitmap may include 1 repetition, 2 repetitions, and 5 repetitions of the 10-bit bitmap, respectively.

Therefore, the predetermined duration that includes the sensing reference resource among a plurality of predetermined durations each with the size of $P_{step}'=P$ among $T_o$ slots may be configured with a pattern in which a predetermined unit is repeated.

As an additional example, a predetermined unit bitmap and a group bitmap indicating whether to apply the predetermined unit bitmap may be defined for the sensing reference resource indication bitmap. For example, when the sensing reference resource indication bitmap is configured as an E-bit bitmap, the predetermined unit bitmap may be an F-bit bitmap and the group bitmap may be a G(=E/F)-bit bitmap. In this case, each bit position of the group bitmap may correspond to an F-bit unit in the E-bit bitmap and the F-bit bitmap may be applied to an F-bit unit corresponding to a bit position having a value of 1 in the group bitmap. Also, the F-bit bitmap may not be applied to the F-bit unit corresponding to a bit position having a value of 0 in the group bitmap (i.e., all of F bits may have a value of 0). Therefore, overhead of the sensing reference resource indication bitmap may be reduced.

Example 2-3

This example may include configuring the size of the predetermined duration to be equal to the resource reservation interval and setting as $T=T_o \cdot i$. That is, this example corresponds to an example in which $P_{step}'=P$ and $T=T_o \cdot i=T_o \cdot (P_{step}'/P_{step})$ are applied.

In this case, with respect to $T=T_o \cdot i=T_o \cdot (P_{step}'/P_{step})$ slots, the number of bit positions having the bit value of 1 in the 10-bit bitmap corresponding to a total of 10 predetermined durations may be defined as N.

If $P_{step}'=P=100$ ms and $P_{step}=100$ ms, $i=P_{step}'/P_{step}=1$ and $T=T_o \cdot i=T_o \cdot (P_{step}'/P_{step})=1000$ ms may be divided into a total of 10 predetermined durations. That is, 10 predetermined durations each with the size of 100 ms may be present. In this case, the sensing reference resource indication bitmap may have the format of the 10-bit bitmap. That is, each bit position of the 10-bit bitmap may correspond to one of 10 predetermined durations. Here, N may correspond to the number of bit positions having the bit value of 1 in the 10-bit bitmap.

If $P_{step}'=P=50$ ms and $P_{step}=100$ ms, $i=P_{step}'/P_{step}=0.5$ and $T=T_o \cdot i=T_o \cdot (P_{step}'/P_{step})=500$ ms may be divided into a total of 10 predetermined durations. That is, 10 predetermined durations each with the size of 50 ms may be present. In this case, the sensing reference resource indication bitmap may have the format of the 10-bit bitmap. That is, each bit position of the 10-bit bitmap may correspond to one of 10 predetermined durations. Here, N may correspond to the number of bit positions having the bit value of 1 in the 10-bit bitmap.

If $P_{step}'=P=20$ ms and $P_{step}=100$ ms, $i=P_{step}'/P_{step}=0.2$ and $T=T_o \cdot i=T_o \cdot (P_{step}'/P_{step})=200$ ms may be divided into a total of 10 predetermined durations. That is, 10 predetermined durations each with the size of 20 ms may be present. In this case, the sensing reference resource indication bitmap may have the format of the 10-bit bitmap. That is, each bit position of the 10-bit bitmap may correspond to one of 10 predetermined durations. Here, N may correspond to the number of bit positions having the bit value of 1 in the 10-bit bitmap.

According to this example, without changing the sensing reference resource indication bitmap, the size of the entire sensing window duration may decrease according to i.

Figure 17:
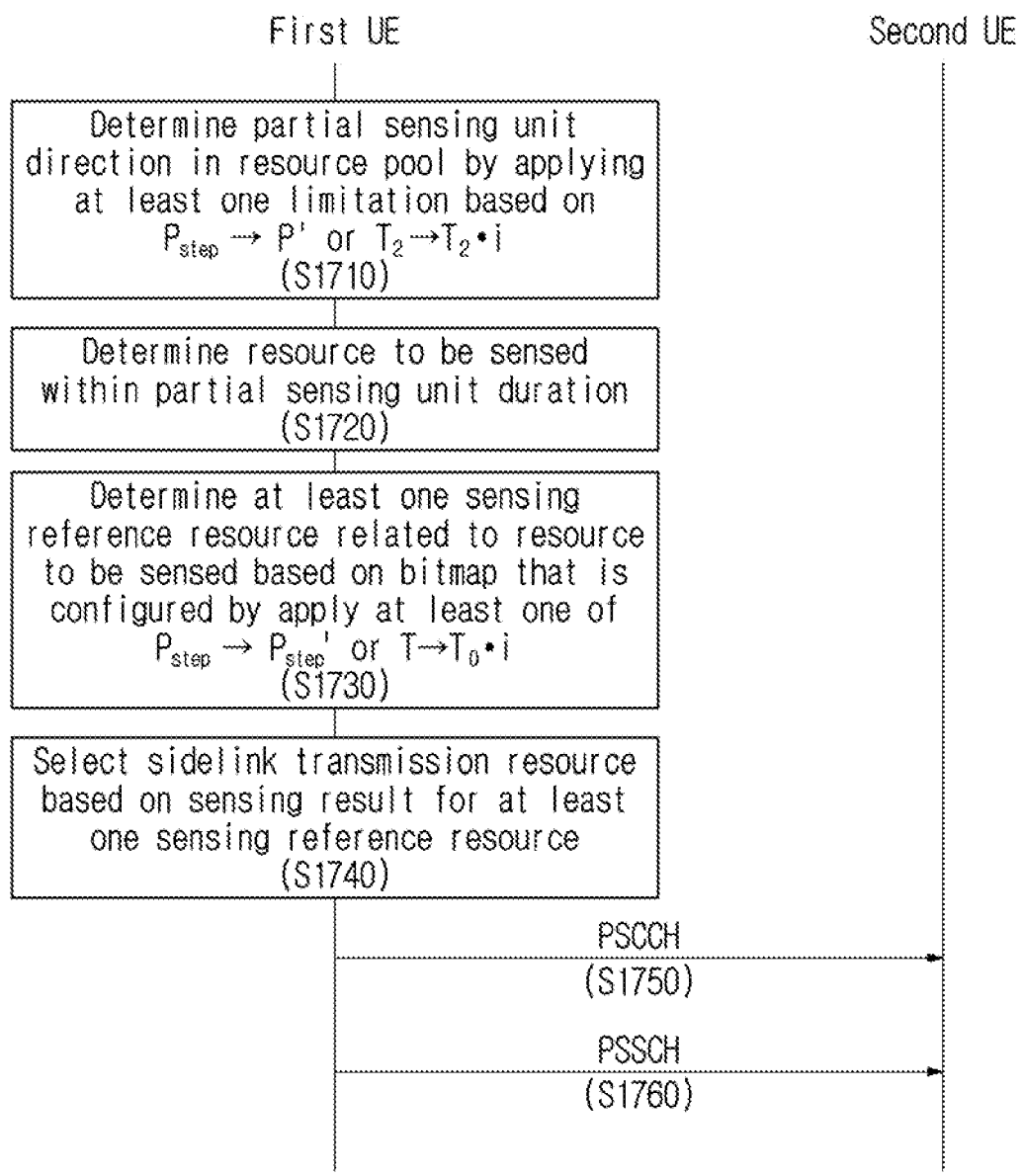
FIG. 17 is a flowchart illustrating a partial sensing-based resource selection method to which the present disclosure may apply.

FIG. 17 is a flowchart illustrating a partial sensing-based resource selection method to which the present disclosure may apply.

When data (or TB) is delivered from an upper layer (i.e., in TTI m), a first UE may perform partial sensing and may determine a sidelink transmission resource (i.e., TTI m+c, etc.).

In operation S1710, the first UE may determine a partial sensing unit duration in a resource pool. The resource pool may be determined, for example, as in the examples of FIGS. 7 and 8. When the resource pool is determined, the partial sensing unit duration (i.e., a duration that includes Y slots) may be determined therefrom.

Here, the aforementioned example 1 may be applied when the first UE determines the partial sensing unit duration. For example, if the resource reservation interval is less than the maximum value of the selection window (i.e., $P<P_{step}$), the aforementioned example 1 may be applied.

In detail, the first UE may change $P_{step}$ with P' (here, P' that is a larger value between $T_{2,min}$ and P) and may determine Y slots corresponding to some slot(s) within [TTI m+$T_1$, TTI m+$T_2$] (here, $T_{2,min} \leq T_2 \leq P'$) within a predetermined duration corresponding to P' slots as the partial sensing unit duration (refer to example 1-1). Alternatively, the first UE may change $T_2$ with $T_2 \cdot i$ (here, $i(0<i\leq 1)=P/P_{step}$) and may determine Y slots corresponding to some slot(s) in [TTI m+$T_1$, TTI m+$T_2 \cdot i$] within the predetermined duration corresponding to $P_{step}$ slots as the partial sensing unit duration (refer to example 1-2). Alternatively, the first UE may determine Y slots as the partial sensing unit duration by limiting Y slots to previous slots of TTI m+P in [TTI m+$T_1$, TTI m+$T_2$] within the predetermined duration corresponding to $P_{step}$ slots (refer to example 1-3). Also, one or a combination of at least two of the aforementioned examples 1-1, 1-2, and 1-3 may be applied when determining the partial sensing unit duration.

In operation S1720, the first UE may determine a resource to be sensed within the partial sensing unit duration. For example, the partial sensing unit duration may correspond to Y slots and the resource to be sensed may be determined as slot y among them.

In operation S1730, the first UE may determine at least one sensing reference resource related to the determined slot y.

For example, when the slot y is determined as the resource to be sensed, one or more slots corresponding to y−k*P may be determined as the sensing reference resource.

Here, the sensing reference resource may be determined by a bitmap (i.e., a sensing reference resource indication bitmap). The sensing reference resource indication bitmap may be configured as in the aforementioned example 2. For example, if the resource reservation interval is less than the maximum value of the selection window (i.e., $P<P_{step}$), the aforementioned example 2 may be applied.

In detail, the first UE may change $P_{step}$ corresponding to the size of the predetermined duration with $P_{step}'=P$ (i.e., set the size of the predetermined duration to be equal to the resource reservation interval), and may determine the sensing reference resource using the 10/i-bit bitmap corresponding to a total of 10/i (here, $i(0<i\leq 1)=P_{step}'/P_{step}=P/P_{step}$) predetermined durations with respect to a duration corresponding to $T_o$. Here, the sensing reference resource may be independently configured according to a value of P of the 10/i-bit bitmap (refer to example 2-1), or may be configured with repetitions of the 10-bit bitmap (refer to example 2-2). Alternatively, the first UE may change $P_{step}$ corresponding to the size of the predetermined duration with $P_{step}'=P$ (i.e., set the size of the predetermined duration to be equal to the resource reservation interval), and may determine the sensing reference resource using the 10-bit bitmap corresponding to a total of 10 predetermined durations with respect to a duration corresponding to $T=T_o \cdot i = T_o \cdot (P_{step}'/P_{step})$ (refer to example 2-3). Also, one of or a combination of at least two of the aforementioned examples 2-1, 2-2, and 2-3 may be applied when determining the sensing reference resource.

For example, slot y-k*$P_{step}$' that is the sensing reference resource related to the slot y, which is the resource to be sensed, may be determined as a slot that belongs to a 10/i-bit bitmap or predetermined duration(s) in which a bit value of a $k^{th}$ bit position corresponds to 1 in the 10-bit bitmap.

For example, it is assumed that the sensing reference resource indication bitmap is configured as a 20-bit bitmap of 10000000001100000000. In this case, bit values of $1^{st}$, $2^{nd}$, $11^{th}$, and $12^{th}$ bit positions in the bit map indicate 1, which means k=1, 2, 11, and 12. That is, slots corresponding to y-$P_{step}$', y-2$P_{step}$, y-11$P_{step}$', and y-12$P_{step}$ may be determined as the sensing reference resource.

In operation S1740, the first UE may select the sidelink transmission resource based on a sensing result for at least one sensing reference resource.

For example, since the at least one sensing reference resource is configured with some slot(s) in the duration of $T_o$ or T from "TTI m-a" to "TTI m-b", it may be said that partial sensing is performed.

In detail, for the first UE, partial sensing may include the following detailed procedure.

Step 1: Selects slot y (corresponding to the aforementioned resource to be sensed) from the resource pool that belongs to a resource area (corresponding to the aforementioned partial sensing unit duration) corresponding to Y slots.

Step 2: Performs monitoring on the slot y-k*$P_{step}$' that is the sensing reference resource related to the slot y, that is, a single resource to be sensed selected in step 1.

Step 3: Determines a threshold to be used in the following resource exclusion operation.

Step 4: Sets a set $S_A$ of candidate single-subframe/slot resources and resource set SB. Here, $S_A$ denotes a set of all the possible candidate single-subframe/slot resources. The candidate single-subframe/slot resource may be expressed as $R_{x,y}$, y denotes the slot y that is the aforementioned single resource to be sensed, and x corresponds to a frequency axis resource in the slot y. Here, $S_B$ is first set as an empty set.

Step 5: Excludes slots that meet a specific condition with respect to all the possible y values in the resource pool that belongs to the resource area corresponding to Y slots. That is, slots y for which resources are already reserved by other UEs are excluded from the resource pool that belongs to the resource area corresponding to Y slots based on SCI greater than a threshold among a plurality of pieces of SCI received by the UE.

Step 6: If a number of candidate single-subframe/slot resources belonging to $S_A$ after the exclusion is less than 0.2$M_{total}$, step 4 is repeated by increasing the threshold in step 3 by 3 dB. Here, $M_{total}$ denotes a number of all the candidate single-subframe/slot resources.

Step 7: Calculates $E_{x,y}$ by averaging monitoring values for all the slots corresponding to y-k*$P_{step}$' in step 2, with respect to each of candidate single-subframe/slot resources remaining in $S_A$ in step 6.

Step 8: Moves candidate single-subframe/slot resources that belongs to the set $S_A$ to the set $S_B$ in descending order of values of $E_{x,y}$ calculated in step 7, until the number of candidate single-subframe/slot resources belonging to $S_B$ becomes 0.2$M_{total}$.

Step 9: Reports $S_B$ to an upper layer.

Based on the reported partial sensing result, a resource used for each UE to transmit V2X data is determined. In particular, in an eNodeB scheduling mode, an eNodeB may determine the resource based on the reported information and may transmit the determined resource to the UE. Based thereon, the resource used for each UE to transmit V2X data may be determined.

In operation S1750, the first UE may transmit information (e.g., $S_A$) that indicates the determined sidelink transmission resource to a second UE through a PSCCH.

In operation S1760, the first UE may transmit sidelink data on the indicated sidelink transmission resource to the second UE through a PSSCH.

Figure 18:
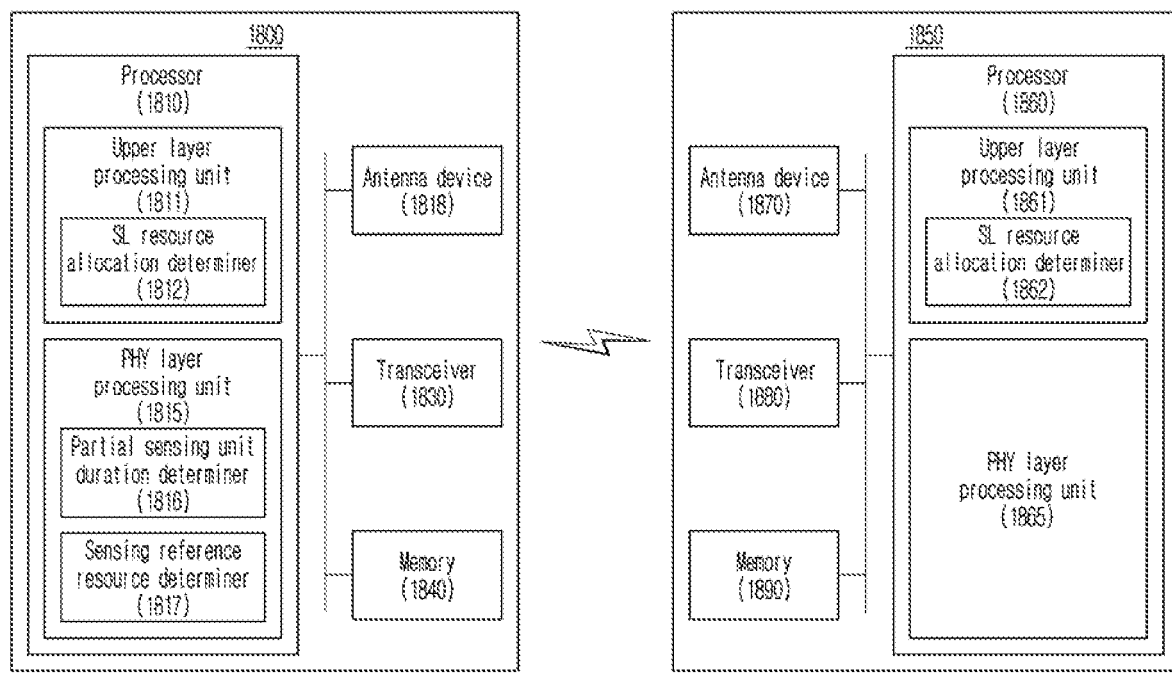
FIG. 18 is a diagram illustrating a configuration of a first terminal device and a second terminal according to the present disclosure.

FIG. 18 is a diagram illustrating a configuration of a first terminal device and a second terminal device according to the present disclosure.

A first terminal device 1800 may include a processor 1810, an antenna device 1820, a transceiver 1830, and a memory 1840.

The processor 1810 may perform baseband-related signal processing and may include an upper layer processing unit 1811 and a physical (PHY) layer processing unit 1815. The upper layer processing unit 1811 may process an operation of a MAC layer, an RRC layer, or more upper layers. The PHY layer processing unit 1815 may process an operation (e.g., downlink received signal processing, uplink transmission signal processing, sidelink transmission signal processing, etc.) of a PHY layer. The processor 1810 may also control the overall operation of the first terminal device 1800, in addition to performing the baseband-related signal processing.

The antenna device 1820 may include at least one physical antenna. If the antenna device 1820 includes a plurality of antennas, multiple input multiple output (MIMO) transmission and reception may be supported. The transceiver 1830 may include a radio frequency (RF) transmitter and an RF receiver. The memory 1840 may store operation processed information of the processor 1810, software, an operating system (OS), an application, etc., associated with an operation of the first terminal device 1800, and may include a component, such as a buffer.

The processor 1810 of the first terminal device 1800 may be configured to implement an operation of the sidelink transmitting UE (or the first terminal) in the examples set forth herein.

For example, the upper layer processing unit 1811 of the processor 1810 of the first terminal device 1800 may include a sidelink (SL) resource allocation determiner 1812.

The SL resource allocation determiner 1812 may determine an SL transmission resource based on a partial sensing result delivered from the PHY layer processing unit 1815 and may deliver information on the SL transmission resource to the PHY layer processing unit 1815.

The PHY layer processing unit 1815 of the processor 1810 of the first terminal device 1800 may include a partial sensing unit duration determiner 1816 and a sensing reference resource determiner 1817.

When data (or TB) is delivered from the upper layer processing unit 1811, (i.e., in TTI m), the PHY layer processing unit 1815 may determine the sidelink transmission resource (i.e., TTI m+c, etc.) by performing partial sensing.

The partial sensing unit duration determiner 1816 may determine a partial sensing unit duration (i.e., a duration that includes Y slots) in the resource pool.

Here, the aforementioned example 1 may be applied when the first UE determines the partial sensing unit duration. For example, if the resource reservation interval is less than a maximum value of a selection window (i.e., $P<P_{step}$), the aforementioned example 1 may be applied.

In detail, the partial sensing unit duration determiner 1816 may determine, as the partial sensing unit duration, Y slots corresponding to some slot(s) within [TTI m+$T_1$, TTI m+$T_2$] (here, $T_{2,min} \leq T_2 \leq P'$) within a predetermined duration corresponding to P' (here, P' that is a larger value between $T_{2,min}$ and P) slots (refer to example 1-1).

Alternatively, the partial sensing unit duration determiner 1816 may determine, as the partial sensing unit duration, Y slots corresponding to some slot(s) within [TTI m+$T_1$, TTI m+$T_2$·i] (here, $i(0<i\leq1)=P/P_{step}$) within a predetermined duration corresponding to $P_{step}$ slots (refer to example 1-2). Alternatively, the partial sensing unit duration determiner 1816 may determine, as the partial sensing unit duration, Y slots among previous slots of TTI m+P within [TTI m+$T_1$, TTI m+$T_2$] within a predetermined duration corresponding to $P_{step}$ slots (refer to example 1-3). Also, one of or a combination of at least two of the aforementioned examples 1-1, 1-2, and 1-3 may be applied.

The PHY layer processing unit 1815 may determine a resource to be sensed within the partial sensing unit duration. For example, the partial sensing unit duration may correspond to Y slots and the resource to be sensed may be determined as slot y among them.

The sensing reference resource determiner 1817 may determine at least one sensing reference resource related to the determined slot y.

For example, when the slot y is determined as the resource to be sensed, one or more slots corresponding to y−k*P may be determined as the sensing reference resource.

Here, the sensing reference resource may be determined by a bitmap (i.e., a sensing reference resource indication bitmap). The sensing reference resource indication bitmap may be configured as in the aforementioned example 2. For example, if the resource reservation interval is less than the maximum value of the selection window (i.e., $P<P_{step}$), the aforementioned example 2 may be applied.

In detail, if a size of a predetermined duration is set to $P_{step}'=P$ (i.e., if the size of the predetermined duration is set to be equal to the resource reservation interval), the sensing reference resource determiner 1817 may determine the sensing reference resource using a 10/i-bit bitmap corresponding to a total of 10/i (here, $i(0<i\leq1)=P_{step}'/P_{step}=P/P_{step}$) predetermined durations with respect to a duration corresponding to $T_o$. Here, the sensing reference resource may be independently configured according to a value of P of the 10/i-bit bitmap (refer to example 2-1), or may be configured with repetitions of the 10-bit bitmap (refer to example 2-2). Alternatively, if the size of the predetermined duration is set to $P_{step}'=P$ (i.e., if the size of the predetermined duration is set to be equal to the resource reservation interval), the sensing reference resource determiner 1817 may determine the sensing reference resource using the 10-bit bitmap corresponding to a total of 10 predetermined durations with respect to a duration corresponding to $T=T_o \cdot i=T_o \cdot (P_{step}'/P_{step})$ (refer to example 2-3). Also, one of or a combination of at least two of the aforementioned examples 2-1, 2-2, and 2-3 may be applied when determining the sensing reference resource.

The PHY layer processing unit 1815 may deliver a sensing result about at least one sensing reference resource to the upper layer processing unit 1811 or the SL resource allocation determiner 1812.

SL data to be transmitted or retransmitted may be delivered from the upper layer processing unit 1811 to the PHY layer processing unit 1815 and then transmitted to the second terminal device 1850. Also, the PHY layer processing unit 1815 may perform transmission to the second terminal device 1850 on the SL transmission resource determined by the SL resource allocation determiner 1812. In detail, the PHY layer processing unit 1815 may generate SCI, may transmit the generated SCI to the second terminal device 1850 through a PSCCH, and may transmit SL data to the second terminal device 1850 through a PSSCH on a resource indicated by the SCI.

The second terminal device 1850 may include a processor 1860, an antenna device 1870, a transceiver 1880, and a memory 1890.

The processor 1860 may perform baseband-related signal processing and may include an upper layer processing unit 1861 and a PHY layer processing unit 1865. The upper layer processing unit 1861 may process an operation of a MAC layer, an RRC layer, or more upper layers. The PHY layer processing unit 1865 may process an operation (e.g., downlink received signal processing, uplink transmission signal processing, sidelink transmission signal processing, etc.) of a PHY layer. The processor 1860 may also control the overall operation of the second terminal device 1860, in addition to performing the baseband-related signal processing.

The antenna device 1870 may include at least one physical antenna. If the antenna device 1870 includes a plurality of antennas, MIMO transmission and reception may be supported. The transceiver 1880 may include an RF transmitter and an RF receiver. The memory 1890 may store operation processed information of the processor 1860, software, an OS, an application, etc., associated with an operation of the second terminal device 1850, and may include a component, such as a buffer.

The processor 1860 of the second terminal device 1850 may be configured to implement an operation of the sidelink receiving UE (or the second terminal) in the examples set forth herein.

For example, the upper layer processing unit 1861 of the processor 1860 of the second terminal device 1850 may include an SL resource allocation determiner 1862.

The SL resource allocation determiner 1862 may determine a resource for SL data reception based on SL resource allocation information provided from the first terminal device 1800.

SL data transmitted or retransmitted from the first terminal device 1800 may be received through the PHY layer processing unit 1865. In detail, the PHY layer processing unit 1865 may receive first and second SCI from the first terminal device 1800 according to a dynamic resource allocation method or a configured grant method, and may receive the SL data from the first terminal device 1800 on a resource indicated by the first and second SCI.

The same description related to the sidelink transmitting UE and the sidelink receiving UE made in the examples of the present invention may equally apply to an operation of the first terminal device 1800 and the second terminal device 1850 and a repeated description is omitted here.

Hereinafter, examples related to resource exclusion in a sensing procedure in an NR sidelink according to the present disclosure is described.

The following examples may also apply to full sensing as well as partial sensing in the NR sidelink.

Initially, a TB retransmission operation in the NR sidelink is described. TB retransmission represents a case in which, after initial transmission of a first TB is performed in TTI m+c (or TTI m+d), the same first TB is retransmitted in TTI m+e if $N_{max}$=2, in the aforementioned examples. For example, if $N_{max}$=3, the initial transmission of the first TB may be performed in TTI m+c (or TTI m+d), first retransmission of the same first TB may be performed in TTI m+e, and second retransmission of the same first TB may be performed in TTI m+f. Meanwhile, initial transmission of a second TB may be performed in TTI m+c' (or TTI m+d') and, according to a value of $N_{max}$, first retransmission of the same second TB may be performed in TTI m+e' and second retransmission of the same second TB may be performed in TTI m+f'.

Here, timings of initial transmission (or first transmission) and first retransmission (or second retransmission) of the same TB may be determined based on a slot (e.g., slot n) in which SCI is transmitted. Additionally, a timing of second retransmission (or third transmission) may be determined.

In relation to a retransmission timing, SCI may include retransmission time gap information and retransmission index information. For example, the retransmission time gap information may correspond to a 4-bit, 5-bit, or 9-bit field "Time gap between initial transmission and retransmission". Also, the retransmission index information may correspond to a 1-bit or 2-bit field "Retransmission index".

By the field "Time gap between initial transmission and retransmission", a value of a gap parameter (e.g., $SF_{gap}$, or $Gap_1$, or $Gap_1$ and $Gap_2$) may be indicated. The gap parameter may refer to a parameter related to a gap between initial transmission (or first transmission), first retransmission (or second transmission) and second retransmission (or third transmission) of a corresponding TB based on a reference timing (e.g., time unit (slot or subframe) index n). If value of gap parameter=0, it may indicate that there is no retransmission for the corresponding TB. If value of gap parameter≠0, it may indicate that there is retransmission for the corresponding TB. Here, a value of the gap parameter may be set to be the same in all of the initial transmission, the first retransmission, and the second retransmission of the same TB.

Here, the reference timing (e.g., subframe n or slot n) may correspond to a timing at which the first UE (i.e., the sidelink transmitting UE) transmits SCI or a timing at which the second UE (i.e., the sidelink receiving UE) receives the SCI. In the following description, the content based on the timing of receiving the SCI from perspective of the second UE may be replaced with the timing of transmitting the SCI from perspective of the first UE. Here, it is assumed that the timing (e.g., TTI m+c) of transmitting or receiving the SCI and the timing (TTI m+d) of transmitting or receiving the TB are included in the same time unit (e.g., subframe or slot).

The field "Retransmission index" may indicate the initial transmission (or the first transmission), the first retransmission (or the second transmission), or the second retransmission (or the third transmission) of the corresponding TB.

For example, in the case of supporting a maximum of one retransmission for the same TB, the initial transmission and the retransmission timing may be determined based on the retransmission time gap information and the retransmission index information, as shown in the following Table 10.

TABLE 10

- "Time gap between initial transmission and retransmission" field: 4 bits - If $SF_{gap}$=0, the above field value is 0000 - If $SF_{gap}$=1, 2, ...., 15, each field value is 0001, 0010, ..., 1111 - "Retransmission index" field: 1 bit - If bit value=0: first transmission (initial transmission) - If bit value=1: second transmission (retransmission) - If $SF_{gap}$=0 - subframe that received SCI is n, and if "Retransmission index" field value of this SCI=0 - transmission in subframe n - If $SF_{gap}$≠0 - subframe that received SCI is n, and if "Retransmission index" field value of this SCI=0 - transmission in subframe n and subframe n+ $SF_{gap}$ - subframe that received SCI is n, and if "Retransmission index" field value of this SCI= 1 - transmission in subframe n-$SF_{gap}$ and subframe n In the example of Table 10, if a value of $SF_{gap}$ indicated by "Time gap between initial transmission and retransmission" within the SCI received in the subframe n is 0, it may indicate that retransmission is absent. Also, if a value of the field "Retransmission index" within the SCI is 0, it may indicate the initial transmission. Therefore, it may indicate that the initial transmission of the TB is present in the subframe n. Unless the value of $SF_{gap}$ indicated by "Time gap between initial transmission and retransmission" within the SCI received in the subframe n is 0, it may indicate that there is retransmission and a gap between the initial transmission and the retransmission is $SF_{gap}$. Also, if a value of the field "Retransmission index" within the SCI is 0, it may indicate the initial transmission. Therefore, it may indicate that the initial transmission of the TB is present in the subframe n and retransmission of the same TB will be present in subframe n+$SF_{gap}$. Also, if the value of the field "Retransmission index" within the SCI is 1, it may indicate retransmission. Therefore, it may indicate that the retransmission of the TB is present in the subframe n and initial transmission of the same TB was present in subframe n-$SF_{gap}$.

A retransmission timing in the case of supporting a maximum of two retransmissions for the same TB will be described with reference to FIG. 19.

FIG. 19 illustrates a retransmission method to which the present disclosure may apply.

FIG. 19(a) illustrates an example of indicating timings of initial transmission, first retransmission, and second retransmission of the same TB based on retransmission index information.

When the initial transmission and one retransmission are set (e.g., if $N_{max}$=2), timings of the initial transmission and the retransmission may be determined based on the retransmission time gap information and the retransmission index information as shown in Table 11.

TABLE 11

If $N_{max}$=2 - "Time gap between initial transmission and retransmission" field: 5bits - If $Gap_1$=0, the above field value is 00000 - if $Gap_1$=1, 2, ...., 31, each field value is 00001, 00010, ..., 11111 - "Retransmission index" field: 1 bit - If bit value= 0: first transmission (initial transmission) - If bit value= 1: second transmission (retransmission) - If $Gap_1$=0

TABLE 11-continued

- subframe that received SCI is n, and if "Retransmission index" field value of this SCI=0
- transmission in subframe n - If $Gap_1 \neq 0$ - subframe that received SCI is n, and if
"Retransmission index" field value of this SCI=0 - transmission in slot n and slot n+
$Gap_1$ - subframe that received SCI is n, and if "Retransmission index" field value of this
SCI=1 - transmission in slot n-$Gap_1$ and slot n In the example of Table 11, $Gap_1$ corresponds to a gap between the initial transmission and the first retransmission. By the 5-bit field "Time gap between initial transmission and retransmission", $Gap_1$ may be indicated as one value among 0 to 31. Here, if $Gap_1$=0, it may indicate that retransmission is absent. If the retransmission is present, $Gap_1$ may have one value among 1 to 31. If the value of $Gap_1$ indicated by "Time gap between initial transmission and retransmission" within the SCI received in the slot n is 0, it may indicate that the first retransmission is absent. If the value of the field "Retransmission index" within the SCI is 0, it may indicate the initial transmission. Therefore, it may indicate that the initial transmission of the TB is present in the slot n.

Unless the value of $Gap_1$ indicated by "Time gap between initial transmission and retransmission" within the SCI received in the slot n is 0, it may indicate that the first retransmission is present and the gap between the initial transmission and the first retransmission is $Gap_1$. If the value of the field "Retransmission index" within the SCI is 0, it may indicate the initial transmission. Therefore, it may indicate that the initial transmission of the TB is present in the slot n and the first retransmission of the same TB will be present in slot n+$Gap_1$. Also, if the value of the field "Retransmission index" within the SCI is 1, it may indicate the first retransmission. Therefore, it may indicate that the first transmission of the TB is present in the slot n and the initial retransmission of the same TB was present in slot n−$Gap_1$.

When the initial transmission and two retransmissions are set (e.g., if $N_{max}$=3), timings of the initial transmission, the first retransmission, and the second retransmission may be determined based on the retransmission time gap information and the retransmission index information as shown in Table 12.

initial transmission and retransmission". For example, 5 bits of least significant bit (LSB) of the field "Time gap between initial transmission and retransmission" may indicate the value of $Gap_1$. Here, if all of $Gap_1$ and $Gap_2$=0, it may indicate that retransmission is absent. If $Gap_1 \neq 0$ and $Gap_2$=0, it may indicate that the first retransmission is present. In this case, $Gap_1$ may have a single value among 1 to 31. If each of $Gap_1$ and $Gap_2 \neq 0$, it may indicate that the first retransmission and the second retransmission are present. In this case, since the second retransmission is performed after the first retransmission, $Gap_2$ may be greater than $Gap_1$ at all times. $Gap_1$ and $Gap_2$ may have non-overlapping values among 1 to 31. Therefore, the value of the 9-bit field "Time gap between initial transmission and retransmission" may indicate one of 465 combinations of $Gap_1$ and $Gap_2$. If all the values of $Gap_1$ and $Gap_2$ indicated by "Time gap between initial transmission and retransmission" within the SCI received in the slot n are 0, it may indicate that retransmission is absent. If the value of the field "Retransmission index" within the SCI is 00, it may indicate the initial transmission. Therefore, it may indicate that the initial transmission of the TB is present in the slot n.

If the value of $Gap_1$ indicated by "Time gap between initial transmission and retransmission" within the SCI received in the slot n is not 0 and the value of $Gap_2$ is 0, it may indicate that the first retransmission is present and the gap between the initial transmission and the first retransmission is $Gap_1$. If the value of the field "Retransmission index" within the SCI is 00, it may indicate the initial transmission. Therefore, it may indicate that the initial transmission of the TB is present in the slot n and the first retransmission of the same TB will be present in slot n+$Gap_1$. Also, if the value of the field "Retransmission index" within the SCI is 01, it may indicate the first

TABLE 12

If $N_{max}$=3 - "Time gap between initial transmission and retransmission" field: 9bits - If $Gap_1$=0 and $Gap_2$=0, the above field value is 000000000 - if $Gap_1$=1, 2, ...., 31 and $Gap_2$=0, each field value is 000000001, 000000010, ...., 000011111 - If two of {1, 2, ..., 31} are arbitrarily selected for $Gap_1$ and $Gap_2$ (here, $Gap_1 < Gap_2$) - a total of 465 cases (000100000, 000100001, ..., 111110000) - "Retransmission index" field: 2bits - If bit value=00: first transmission (initial transmission) - If bit value=01: second transmission (first retransmission) - If bit value=10: third transmission (second retransmission) - If $Gap_1$=0 and $Gap_2$=0 - subframe that received SCI is n, and if "Retransmission index" field value of this SCI=00 -transmission in slot n - If $Gap_1 \neq 0$ and $Gap_2$=0 - S subframe that received SCI is n, and if "Retransmission index" field value of this SCI=00 - transmission in slot n and slot n+ $Gap_1$ - subframe that received SCI is n, and if "Retransmission index" field value of this SCI=01 - transmission in slot n-$Gap_1$ and slot n - If $Gap_1 \neq 0$ and $Gap_2 \neq 0$ - subframe that received SCI is n, and if "Retransmission index" field value of this SCI=00 - transmission in slot n, slot n+ $Gap_1$, and slot n+ $Gap_2$ - subframe that received SCI is n, and if "Retransmission index" field value of this SCI=01 - transmission in slot n-$Gap_1$, slot n, and slot n+ $Gap_2$-$Gap_1$ - subframe that received SCI is n, and if "Retransmission index" field value of this SCI=10 - transmission in slot n-Gap2, slot n+ $Gap_1$-$Gap_2$, and slot n In the example of FIG. 12, $Gap_1$ corresponds to a gap between the initial transmission and the first retransmission and $Gap_2$ corresponds to a gap between the initial transmission and the second retransmission. Values of $Gap_1$ and $Gap_2$ may be indicated by a single 9-bit field "Time gap between retransmission. Therefore, it may indicate that the first transmission of the TB is present in the slot n and the initial retransmission of the same TB was present in slot n−$Gap_1$.

Unless each of values of $Gap_1$ and $Gap_2$ indicated by "Time gap between initial transmission and retransmission"

within the SCI received in the slot n is 0, it may indicate that the first retransmission and the second retransmission are present, the gap between the initial transmission and the first retransmission is $Gap_1$, and the gap between the initial transmission and the second retransmission is $Gap_2$. If the value of the field "Retransmission index" within the SCI is 00, it may indicate the initial transmission. Therefore, it may indicate that the initial transmission of the TB is present in the slot n and the first retransmission of the same TB may be present in slot n+$Gap_1$ and the second retransmission of the same TB may be present in slot n+$Gap_2$. Also, if the value of the field "Retransmission index" within the SCI is 01, it may indicate the first retransmission. Therefore, it may indicate that the first transmission of the TB is present in the slot n, the initial retransmission of the same TB was present in slot n−$Gap_1$, and the second retransmission of the same TB will be present in slot n+$Gap_2$−$Gap_1$. If the value of the field "Retransmission index" within the SCI is 10, it may indicate the second retransmission. Therefore, it may indicate that the second retransmission of the TB is present in the slot n, the initial transmission of the same TB was present in slot n−$Gap_2$, and the first retransmission of the same TB was present in slot n+$Gap_1$−$Gap_2$.

FIG. 19(b) illustrates an example of indicating timings of the initial transmission, the first retransmission, and the second retransmission of the same TB without using the retransmission index information. In this case, the initial transmission, the first retransmission, and the second retransmission of the same TB may be identified based on new data indication information.

The new data indication information may be defined as a 1-bit new data indicator (NDI) field and included in SCI. A value of NDI may not be toggled in the case of retransmission of the same TB and may be toggled in the case of transmission of a new TB. For example, in the case in which a value of NDI for a TB included in the SCI is 1 (or 0), if a value of NDI included in previous SCI is 0 (or 1), it may indicate initial transmission of a new TB and, if the value of NDI included in the previous SCI is 1 (or 0), it may indicate retransmission of the same TB.

When the initial transmission and one retransmission are set (e.g., if $N_{max}$=2), timings of the initial transmission and the first retransmission may be determined based on the retransmission time gap information and the new data indication information, as shown in Table 13.

TABLE 13

| If $N_{max}$=2 - "Time gap between initial transmission and retransmission" field: 5bits - If $Gap_1$=0, the above field value is 00000 - if $Gap_1$=1, 2, ...., 31, each field value is 00001, 00010, ..., 11111 - not "Retransmission index" field but 1-bit "NDI" field is used as below - If bit value (0 or 1) differs from NDI value of previous SCI: initial transmission - If bit value (0 or 1) is equal to NDI value of previous SCI: retransmission - If $Gap_1$=0 - If slot in which SCI is received is n - transmission in slot n - If $Gap_1 \neq 0$ - If slot in which SCI is received is n - transmission in slot n and slot n+ $Gap_1$ |
|---|

In the example of Table 13, explanation related to $Gap_1$ is identical to Table 11 and thus, further description is omitted. If a value of $Gap_1$ indicated by "Time gap between initial transmission and retransmission" within the SCI received in the slot n is 0, it may indicate that the first retransmission is absent. Therefore, it may indicate that the initial transmission of the TB is present in the slot n. In this case, the "NDI" value of the SCI may have a value different from an NDI value of previous SCI.

Unless the value of $Gap_1$ indicated by "Time gap between initial transmission and retransmission" within the SCI received in the slot n is 0, it may indicate that the first retransmission is present and the gap between the initial transmission and the first retransmission is $Gap_1$. When the value of the "NDI" field within the SCI is toggled compared to the NDI value of the previous SCI, it may indicate the initial transmission. Therefore, it may indicate that the initial transmission of the TB is present in the slot n and the first retransmission of the same TB is present in slot n+$Gap_1$. In this case, the "NDI" value of the SCI received in the slot n may have a value different from the NDI value of the previous SCI and the "NDI" value of the SCI received in the slot n+$Gap_1$ may have the same value as the NDI value of the previous SCI (i.e., the SCI received in the slot n).

When the initial transmission and two retransmissions are set (e.g., if $N_{max}$=3), timings of the initial transmission, the first retransmission, and the second retransmission may be determined based on the retransmission time gap information and the new data indication information, as shown in Table 14.

TABLE 14

| If $N_{max}$=3 - "Time gap between initial transmission and retransmission" field: 9bits - If $Gap_1$=0 and $Gap_2$=0, the above field value is 000000000 - if $Gap_1$=1, 2, ...., 31 and $Gap_2$=0, each field value is 000000001, 000000010, ..., 000011111 - If two of {1, 2, ..., 31} are arbitrarily selected for $Gap_1$ and $Gap_2$ (here, $Gap_1$< $Gap_2$) - a total of 465 cases (000100000, 000100001, ..., 111110000) - not "Retransmission index" field but 1-bit "NDI" field is used as below - If bit value (0 or 1) differs from NDI value of previous SCI: initial transmission - If bit value (0 or 1) is equal to NDI value of previous SCI: retransmission - If $Gap_1$=0 and $Gap_2$=0 - If slot in which SCI is received is n - transmission in slot n - If $Gap_1 \neq 0$ and $Gap_2$=0 - If slot in which SCI is received is n - transmission in slot n and slot n+ $Gap_1$ - If $Gap_1 \neq 0$ and $Gap_2 \neq 0$ - If slot in which SCI is received is n - transmission in slot n, slot n+ $Gap_1$, and slot n+ $Gap_2$ |
|---|

In the example of Table 14, explanation related to $Gap_1$ and $Gap_2$ is identical to Table 13 and thus, further description is omitted. If all of the values of $Gap_1$ and $Gap_2$ indicated by "Time gap between initial transmission and retransmission" within SCI received in slot n are 0, it may indicate that the retransmission is absent. Therefore, it may indicate that the initial transmission of the TB is present in the slot n. In this case, the "NDI" value of the SCI may have a value different from an NDI value of previous SCI.

If the value of Gap$_1$ indicated by "Time gap between initial transmission and retransmission" within the SCI received in the slot n≠0 and Gap$_2$=0, it may indicate that the first retransmission is present and the gap between the initial transmission and the first retransmission is Gap$_1$. Therefore, it may indicate that the initial transmission of the TB is present in the slot n and the first retransmission of the same TB is present in slot n+Gap$_1$. In this case, the "NDI" value of the SCI received in the slot n may have a value different from the NDI value of the previous SCI and the "NDI" value of the SCI received in the slot n+Gap$_1$ may have the same value as the NDI value of the previous SCI (i.e., the SCI received in the slot n).

Unless each of values of Gap$_1$ and Gap$_2$ indicated by "Time gap between initial transmission and retransmission" within the SCI received in the slot n is 0, it may indicate that the first retransmission and the second retransmission are present, the gap between the initial transmission and the first retransmission is Gap$_1$, and the gap between the initial transmission and the second retransmission is Gap$_2$. Therefore, it may indicate that the initial transmission of the TB is present in the slot n and the first retransmission of the same TB is present in the slot n+Gap$_1$, and the second retransmission of the same TB is present in the slot n+Gap$_2$. In this case, the "NDI" value of the SCI received in the slot n may have a value different from the NDI value of the previous SCI, the "NDI" value of the SCI received in the slot n+Gap$_1$ may have the same value as the NDI value of the previous SCI (i.e., the SCI received in the slot n), and the "NDI" value of the SCI received in the slot n+Gap$_2$ may have the same value as the NDI value of the previous SCI (i.e., the SCI received in the slot n+Gap$_1$).

Table 15 illustrates an example of a detailed procedure of the partial sensing operation described in operations S1710 to S1740 of FIG. 17.

TABLE 15

If partial sensing is configured by higher layers then the following steps are used:

1) A candidate single-subframe resource for PSSCH transmission $R_{x,y}$ is defined as a set of $L_{subCH}$ contiguous sub-channels with sub-channel x + j in subframe $t_y^{SL}$ where j = 0, . . . , $L_{subCH}$ − 1. The UE shall determine by its implementation a set of subframe which consists of at least Y subframes with the time interval [n + T$_1$, n + T$_2$] where selections of T$_1$ and T$_2$ are up to UE implementations under T$_1$ ≤ 4 and T$_{2min}$ (prio$_{TX}$) ≤ T$_2$ ≤ 100, if T$_{2min}$ (prio$_{TX}$) is provided by higher layers for prio$_{TX}$, otherwise 20 ≤ T$_2$ ≤ 100. UE selection of T$_2$ shall fulfil the latency requirement and Y shall be greater than or equal to the high layer parameter minNumCandidateSF. The UE shall assume that any set of $L_{subCH}$ contiguous sub-channels included in the corresponding PSSCH resource pool (described in 14.1.5) within the determined set of subframes correspond to one candidate single-subframe resource. The total number of the candidate single-subframe resources is denoted by $M_{total}$.

2) If a subframe $t_y^{SL}$ is included in the set of subframes in Step 1, the UE shall monitor any subframe $t_{y-k \times P_{step}}^{SL}$ if k-th bit of the high layer parameter gapCandidateSensing is set to 1. The UE shall perform the behaviour in the following steps base on PSSCCH decoded and S-RSSI measured in these subframes.

3) The parameter Th$_{a,b}$ is set to the value indicated by the i-th SL − ThresPSSCH − RSRP field in SL − ThresPSSCH − RSRP − List where i = a * 8 + b + 1.

4) The set S$_A$ is initialized to the union of all the candidate single-subframe resources. The set S$_B$ is initialized to an empty set.

5) The UE shall exclude any candidate single-subframe resource $R_{x,y}$ from the set S$_A$ if it meets all the following conditions:
the UE receives an SCI format 1 in subframe $t_m^{SL}$, and "Resource reservation" field and "Priority" field in the received SCI format 1 indicate the values $P_{rsvpRX}$ and prio$_{RX}$, respectively according to Subclause 14.2.1.
PSSCH-RSRP measurement according to the received SCI format 1 is higher that Th$_{prio_{TX},prio_{RX}}$
the SCI format received in subframe $t_m^{SL}$ or the same SCI format 1 which is assumed to be received in subframe(s) $t_{m+q \times P_{step} \times P_{rsvP\_RX}}^{SL}$ determines according to 14.1.1.4C the set of resource blocks and subframes which overlaps with $R_{x,y+j \times P_{rsvp\_TX}}$ for q =

$$1, 2, \ldots, Q \text{ and } j = 0, 1, \ldots, C_{resel} - 1. \text{ Here, } Q = \frac{1}{P_{rsvp\_RX}} \text{ if}$$

$P_{rsvp\_RX}$ < 1 and y' − m ≤ $P_{step} \times P_{rsvpRX} + P_{step}$, where $t_y^{SL}$ is the last subframe of the Y subframes, and Q = 1 otherwise.

6) If the number of candidate single-subframe resources remaining in the set S$_A$ is smaller than 0.2 · $M_{total}$, then Step 4 is repeated with Th$_{a,b}$ increased by 3 dB.

7) For a candidate single-subframe resource $R_{x,y}$ remaining in the set S$_A$, the metric $E_{x,y}$ is defined as the linear average of S-RSSI measured in sub-channels x + k for k = 0, . . . , $L_{subCH}$ − 1 in the monitored subframes in Step 2 that can be expressed by $t_{y-P_{step}*j}^{SL}$ for a non-negative integer j.

TABLE 15-continued

If partial sensing is configured by higher layers then the following steps are used:

8) The UE moves the candidate single-subframe resource $R_{x,y}$ with the smallest metric $E_{x,y}$ from the set $S_A$ to $S_B$. This step is repeated until the number of candidate single-subfraeme resources in the set $S_B$ becomes greater than or equal to $0.2 \cdot M_{total}$.
9) When the UE is configured by upper layers to transmit using resource pools on multiple carriers, it shall exclude a candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10]. The UE shall report set $S_B$ to higher layers.

In step 1), the first UE may select slot y (i.e., a target to be sensed, refer to operation S1720 of FIG. 17) from a resource pool (i.e., partial sensing unit duration, refer to operation S1710 of FIG. 17) that belongs to a resource area corresponding to Y slots. Here, for details related to the Y slots and the slot y, reference may be made to the contents described with reference to FIG. 12.

In step 2), the first UE may perform monitoring (or sensing) on all the slots (i.e., at least one sensing reference resource, refer to operation S1730 of FIG. 17) corresponding to y−k*P (or y−k*$P_{step}$') with respect to the slot y (i.e., the resource to be sensed) selected in step 1). Here, for details related to the slots corresponding to y−k*P (or y−k*$P_{step}$'), reference may be made to the contents described with reference to FIG. 12.

In step 3), the first UE may determine a threshold to be used for a resource exclusion (i.e., step 5).

In step 4), the first UE may set a set $S_A$ of candidate single-time unit (subframe or slot) resources (or candidate resources to be sensed) and a resource set $S_B$. Here, $S_A$ denotes a set of all the possible candidate single-time resources. The candidate single-time unit resource (or candidate single-subframe/slot resource) may be expressed as $R_{x,y}$. Here, y denotes the slot y that is the resource to be sensed, and x corresponds to a frequency axis resource in the slot y. Here, $S_B$ may be first set as an empty set.

Step 5) may be referred to as the resource exclusion step. The first UE may exclude slots that meet a specific condition with respect to all the possible y values in the resource pool that belongs to the resource area corresponding to Y slots. For example, when the first UE receives SCI from third UE(s) (e.g., when the first UE receives SCI transmitted from the third UE to the first UE, or when the first UE overhears SCI transmitted from the third UE to another UE), the first UE may determine whether transmission scheduled by the SCI exceeds a predetermined threshold. Here, the third UE(s) may be at least one UE contiguous to the first UE. For example, the third UE(s) may include the second UE that is to transmit sidelink data and may also include remaining other UE(s) excluding the second UE.

If the transmission scheduled by the SCI of the third UE exceeds the predetermined threshold, it may be assumed that transmission of the third UE may be performed on resources scheduled and/or reserved by the SCI. Based on the above assumption, the first UE may exclude slots y for which resources are reserved by the third UE in the resource pool that belongs to the resource area corresponding to the Y slots. Therefore, some candidate single-subframe/slot resources may be excluded from $S_A$.

In step 6), if a number of candidate single-subframe/slot resources belonging to $S_A$ after the resource exclusion is applied does not meet the predetermined threshold, steps 3) and 4) may be repeated. For example, if the number of candidate single-subframe/slot resources belonging to $S_A$ after the resource exclusion is less than $0.2M_{total}$ (here, $M_{total}$ denotes a total number of candidate single-subframe/slot resources), step 4) may be repeated by increasing the threshold determined in step 3) by 3 dB. This process may be repeated until the number of candidate single-subframe/slot resources belonging to $S_A$ becomes greater than or equal to $0.2M_{total}$ and $S_A$ may be finally determined.

In step 7), the first UE may calculate $E_{x,y}$ by averaging monitoring (or sensing) values for all the slots (i.e., sensing reference resources) corresponding to y−k*P (or y−k*$P_{step}$') in step 2, with respect to each of the candidate single-subframe/slot resources that belong to $S_A$ determined in step 6.

In step 8), the first UE may move the candidate single-subframe/slot resources from the set $S_A$ to the set $S_B$ in descending order of values of $E_{x,y}$ calculated in step 7. Movement from the set $S_A$ to the set $S_B$ may be performed until the number of candidate single-subframe/slot resources belonging to $S_B$ becomes $0.2M_{total}$.

In step 9), the first UE may report the finally determined set $S_B$ to an upper layer.

Based on the partial sensing result reported to the upper layer, a resource used for the first UE to transmit sidelink data may be determined. If the first UE operates in an eNodeB resource scheduling mode, the partial sensing result may be delivered to the eNodeB and the eNodeB may determine a sidelink transmission resource and may indicate the same to the first UE.

In the aforementioned partial sensing procedure, step 5), that is, the resource exclusion step is further described.

In step 5-1), the first UE may receive SCI in slot m from the third UE. Here, a resource reservation field in the SCI may indicate a parameter value $P_{rsvp\_RX}$ and a priority field in the SCI may indicate a value $prio_{RX}$.

In step 5-2), if a PSSCH-RSRP measurement value corresponding to the SCI (i.e., for a data channel to be scheduled by the SCI) exceeds a threshold $Th_{prioTX,prioRX}$, the first UE may determine a corresponding resource as an exclusion candidate.

In step 5-3), the first UE may determine whether slot m and resources (i.e., exclusion candidates) periodically reserved for transmission by the third UE from the slot m overlap slot y and resources (i.e., candidate resources to be sensed) periodically reservable for transmission from the slot y. When the exclusion candidate and the candidate resource to be sensed, the corresponding resource may be excluded from $S_A$.

Here, the slot m corresponds to $t^{SL}_m$ in the above Table 15. The resources periodically reserved for transmission from the slot m correspond to $t^{SL}_{m+q \cdot Pstep \cdot Prsvp\_RX}$ (or, $t^{SL}_{m+q \cdot Pstep'/Prsvp\_RX}$) in the above Table 15. The slot y and the resources periodically reservable for transmission from the slot y correspond to $R_{x,y+j \cdot P'rsvp\_TX}$ in the above Table 15.

This resource exclusion step may be equally applied to full sensing as well as partial sensing. For example, the slot y in the resource exclusion step is not limited to being within Y that is the partial sensing unit duration, and may be expanded to all the possible slots of the entire duration of [TTI m+$T_1$, TTI m+$T_2$] as in FIG. 11. Examples related to the resource exclusion in the present disclosure are described with the assumption of partial sensing for clarity of description, but may be equally applied to the full sensing.

Figure 20:
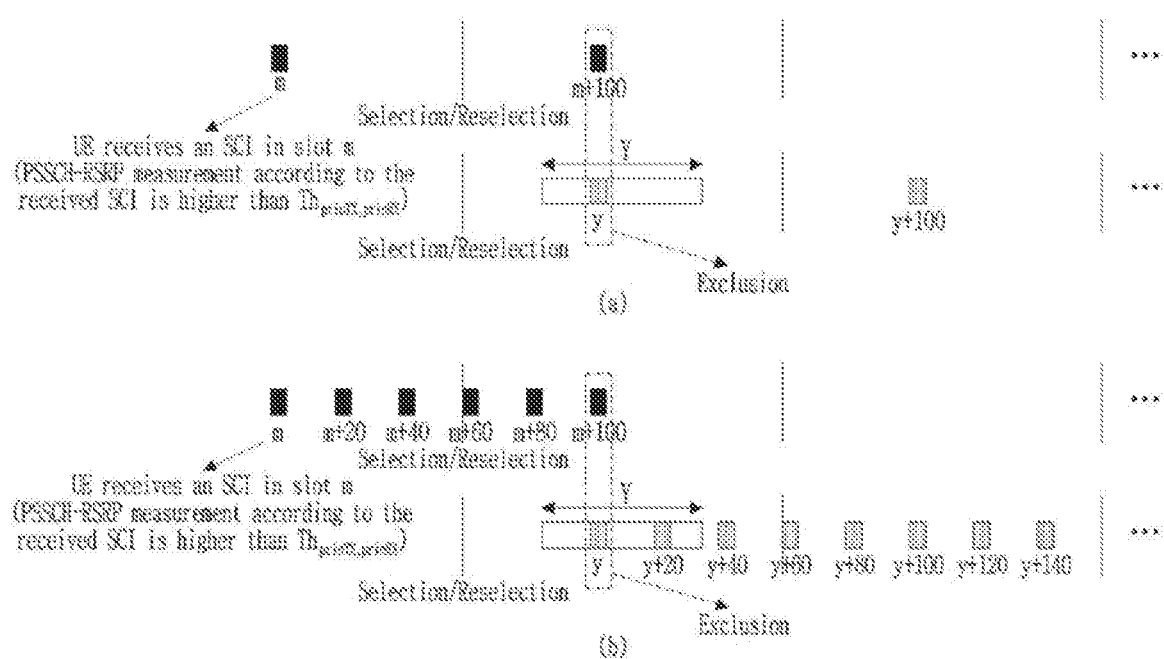
FIG. 20 illustrates an example of a resource exclusion process to which the present disclosure may apply.

FIG. 20 illustrates an example of a resource exclusion process to which the present disclosure may apply.

FIG. 20 illustrates an example of the aforementioned step 5-3).

The example of FIG. 20(*a*) assumes a case in which SCS=15 kHz, q=1, $P_{step}$=100 ms, $P_{rsvp\_RX}$=1, and $P'_{rsvp\_TX}$=$P_{step} \cdot P_{rsvp\_TX}$=100 ms. Therefore, among resources related to the resource exclusion step, slot m may be represented as $t^{SL}_m$, resources periodically reserved for transmission from the slot m may be represented as $t^{SL}_{m+q \cdot Pstep \cdot Prsvp\_RX} = t^{SL}_{m+100}$, and slot y and resources periodically reservable from the slot y may be represented as $R_{x,y+j/P'rsvp\_TX} = R_{x,y}$, $R_{x,y+100}$, $R_{x,y+100(Cresel-1)}$.

According to the example of FIG. 20(*a*), since slot m+100 and the slot y overlap, a resource corresponding to the slot y is excluded from the Y slots (i.e., (partial) sensing unit duration).

The example of FIG. 20(*b*) assumes a case in which SCS=15 kHz, q={1, 2, 3, 4, 5}, $P_{step}$=100 ms, $P_{rsvp\_RX}$=0.2, and $P'_{rsvp\_TX}$=$P_{step} \cdot P_{rsvp\_TX}$=20 ms. Therefore, among resources related to the resource exclusion step, the slot m may be represented as $t^{SL}_m$, the resources periodically reserved for transmission from the slot m may be represented $t^{SL}_{m+q \cdot Pstep \cdot Prsvp\_RX} = t^{SL}_{m+20}$, $t^{SL}_{m+40}$, $t^{SL}_{m+60}$, $t^{SL}_{m+80}$, $t^{SL}_{m+100}$, and the slot y and the resources periodically reservable for transmission from the slot y may be represented as $R_{x,y+j \cdot P'rsvp\_TX} = R_{x,y}$, $R_{x,y+20}$, $R_{x,y+40}$, $R_{x,y+60}$, $R_{x,y+80}$, $R_{x,y+100}$, $R_{x,y+120}$, $R_{x,y+140}$, $R_{x,y+20(Cresel-1)}$.

According to the example of FIG. 20(*b*), although slots m+20, m+40, m+60, and m+80 do not overlap the slot y, slot m+100 and the slot y overlap. Therefore, a resource corresponding to the slot y is excluded from the Y slots (i.e., the (partial) sensing unit duration).

In the examples of FIG. 20, the resource corresponding to the slot m is expressed as $t^{SL}_m$. However, additionally, if the resource corresponding to the slot m+20 is $t^{SL}_m$ in FIG. 20(*b*), a resource corresponding to slot y+20 may also be excluded from the duration Y in FIG. 20(*b*) by the same resource exclusion operation.

As described above, when the first UE excludes a candidate resource to be sensed, the first UE may exclude a corresponding candidate resource to be sensed (i.e., slot y) from a resource to be sensed if any one of the resource (i.e., slot m) used for the first UE to receive SCI from the third UE and the resources reserved by the SCI (i.e., the resources periodically reserved for transmission from the slot m) among the resources that exceed a predetermined threshold overlaps any one of the candidate resource to be sensed of the first UE and associated resources (i.e., the slot y and resources periodically reservable for transmission from the slot y).

Figure 21:
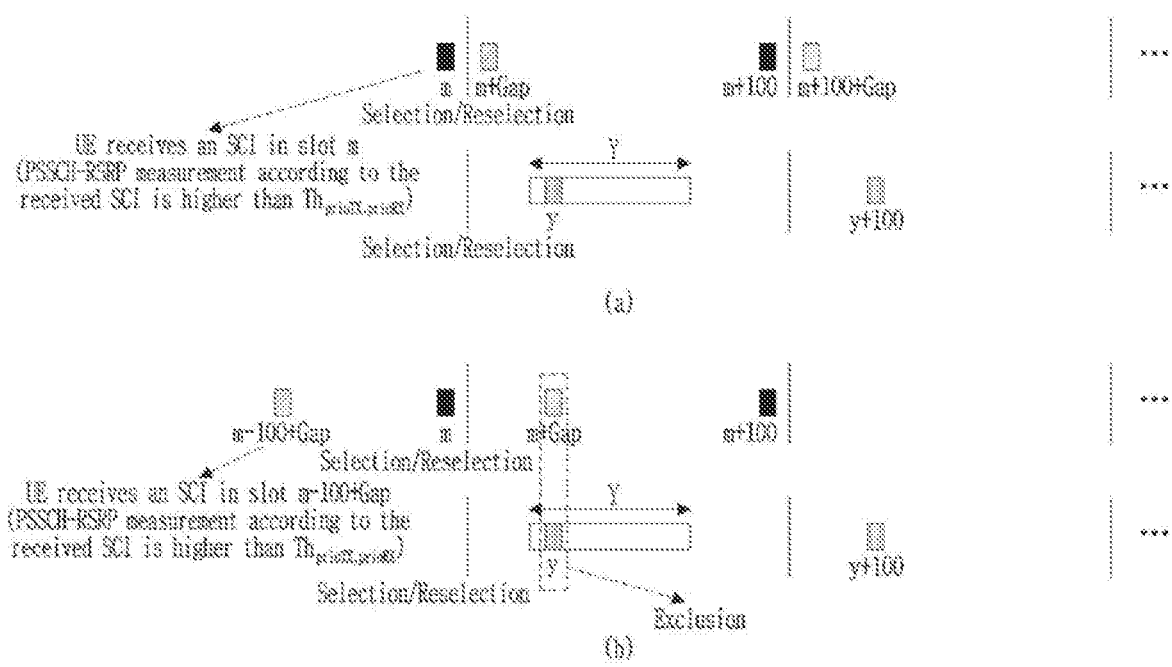
FIG. 21 illustrates an additional example of a resource exclusion process to which the present disclosure may apply.

FIG. 21 illustrates an additional example of a resource exclusion process to which the present disclosure may apply.

The example of FIG. 21 assumes a case in which SCS=15 kHz, q=1, $P_{step}$=100 ms, $P_{rsvp\_RX}$=1, and $P'_{rsvp\_TX}$=$P_{step} \cdot P_{rsvp\_TX}$=100 ms.

In the example of FIG. 20, resources periodically reserved by SCI of the third UE in slot m may be used for transmission of another TB. That is, in the example of FIG. 20, each of slots m, m+20, m+40, m+100 may be periodically reserved for transmission of a new TB. That is, the resource for transmission of the same TB transmitted in the resource reserved by the SCI in the slot m is not considered in the resource exclusion process.

As in the example of FIG. 21(*a*), initial transmission of SCI of the third UE and a TB scheduled by the SCI in the slot m may be performed and retransmission of the same TB may be performed in slot m+Gap. If a time interval between the slot m and the slot m+Gap is relatively small, a probability that retransmission of the third UE in the slot m+Gap overlaps any slot y within the duration Y of the first UE may decrease. Therefore, although the resource for retransmission is not considered in the resource exclusion process, it may not be a great issue.

Also, when the time interval between the slot m and the slot m+Gap is relatively great, a probability that retransmission of the third UE in the slot m+Gap overlaps any slot y within the duration Y of the first UE may increase. Even in this case, if the resource for retransmission of TB in the slot m+Gap of the third UE is included in a periodical resource reserved (for transmission of another TB) by the third UE in the slot m, the corresponding resource may be excluded by the first UE and thus, it may not be a great issue.

For example, as in the example of FIG. 21(*b*), initial transmission of the TB in the slot m and retransmission of the same TB in the slot m+Gap by the third UE may be periodically repeated. In this case, when presence of retransmission of the third UE in a previous period (i.e., retransmission of the first TB in the slot m−100+Gap) is verified, it periodically repeats and accordingly, it is possible to determine that retransmission of the second TB of the third UE in a subsequent period (i.e., retransmission of the second TB in the slot m+Gap) will be present. That is, when transmission of the third UE in the slot m−100+Gap (the transmission herein refers to arbitrary transmission and includes all the cases of the initial transmission and the retransmission) is verified, periodical resources after the slot m−100+Gap may be excluded. Therefore, there may be no need to separately verify whether retransmission of the third UE is present in the slot m+Gap. Accordingly, when a subsequent periodical resource (here, including a resource on which retransmission in the slot m+Gap is performed) overlaps arbitrary slot y within the duration Y of the first UE based on transmission/retransmission in the slot m−100+Gap of the third UE, the corresponding resource may be excluded.

That is, in the example of FIG. 21(*b*), when the resource corresponding to the slot m−100+Gap is $t^{SL}_m$, the resource corresponding to the slot m+Gap may be $t^{SL}_{m+100}$. As described above with reference to FIG. 20, the resource corresponding to the slot m+Gap may be excluded from the duration Y.

Figure 22:
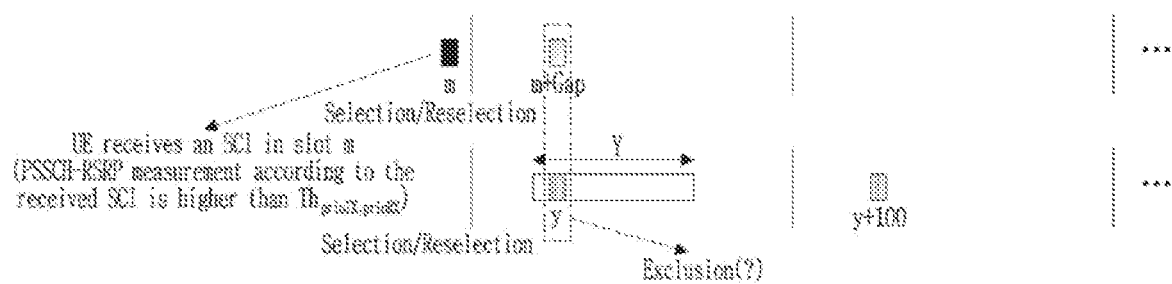
FIG. 22 illustrates an additional example of a resource exclusion process to which the present disclosure may apply.

FIG. 22 illustrates an additional example of a resource exclusion process to which the present disclosure may apply.

The example of FIG. 22 may consider a situation in which a time interval between slot m and slot m+Gap in which the third UE perform initial transmission and retransmission, respectively, is relatively large (i.e., the retransmission in the slot m+Gap and the arbitrary slot y in the duration Y may overlap) and the initial transmission in the slot m and the retransmission in the slot m+Gap by the third UE are not periodically repeated (e.g., an aperiodic sidelink transmission). In this case, although the slot m+Gap resource in which the retransmission of the third UE is performed overlaps arbitrary slot y within the duration Y of the first UE, the corresponding resource may not be excluded and serious performance degradation may occur.

For example, when the third UE performs aperiodic sidelink transmission, the initial transmission of the TB of the third UE may be performed in the slot m. When the retransmission of the same TB is performed in the slot m+Gap, the resource, the slot m+Gap that is a resource in which the retransmission is performed may not have a periodic relationship with arbitrary transmission of the third UE at a previous point in time of the slot m.

In this case, the slot m may be before a selection/resection point in time of the first UE and the slot m+Gap may be after the selection/resection point in time of the first UE and may belong to the duration Y. According to a currently defined resource exclusion method in this situation, since the TB retransmission of the third UE in the slot m+Gap is not excluded from the sensing procedure of the first UE, a resource that may overlap the transmission of the third UE may be selected by the first UE.

Hereinafter, examples of the present disclosure in which the resource in which the initial transmission and the retransmission of the third UE are performed may be excluded from the resource exclusion step of the sensing procedure of the first UE are described in detail. As described above, the following resource exclusion method may be applied even with respect to full sensing as well as partial sensing.

Example 3

In this example, the first UE determines a retransmission resource of the third EU based on retransmission index information within SCI of the third UE and excludes the determined resource from a resource to be sensed of the first UE. For example, the first UE may determine an additional exclusion candidate by referring to the retransmission time gap information and the retransmission index information within the SCI of the third UE in the resource exclusion operation described above with reference to Table 15.

The first UE may receive the SCI of the third UE in the slot m. Here, the resource reservation field within the SCI may indicate a parameter value $P_{rsvp\_RX}$ and the priority field within the SCI may indicate a value $prio_{Rx}$. Additionally, the retransmission time gap information (e.g., the field "Time gap between initial transmission and retransmission") within the SCI may indicate the parameter value "Gap" and the retransmission index information (e.g., field "Retransmission index") may indicate a parameter value "Retransmission index".

If a PSSCH-RSRP measurement value corresponding to the SCI (i.e., for a data channel to be scheduled by the SCI) exceeds a threshold $Th_{prioTX,prioRX}$, the first UE may determine a corresponding resource as an exclusion candidate.

The first UE may determine whether slot m and resources (i.e., first exclusion candidate) periodically reserved for transmission by the third UE from the slot m overlap slot y and resources (i.e., candidate resource to be sensed and associated resources) periodically reservable for transmission based on the SCI received from the third UE in the slot m. Additionally, the first UE may determine whether the slot m and resources (i.e., second exclusion candidate) periodically reserved for retransmission of the same TB in the slot m+Gap overlap slot y and resources (i.e., candidate resource to be sensed and associated resources) periodically reservable for transmission from the slot y based on the SCI received from the third UE in the slot m. If the first and/or second exclusion candidate and the candidate resource to be sensed and associated resources overlap, the corresponding resource may be excluded from $S_A$.

Here, the slot m that is the first exclusion candidate corresponds to $t^{SL}_m$ and the resources periodically reserved for transmission from the slot m correspond to $t^{SL}_{m+q\cdot Pstep\cdot Prsvp\_RX}$ (or, $t^{SL}_{m+q\cdot Pstep'\cdot Prsvp\_RX}$). The second exclusion candidate, that is, the resources reserved for retransmission of the same TB as the TB transmitted in the slot m in the slot m+Gap correspond to $t^{SL}_{m+Gap}$. The candidate resource to be sensed and the associated resources, that is, the slot y and the resources periodically reservable for transmission from the slot y correspond to $R_{x,y+j\cdot P'rsvp\_TX}$.

That is, in the resource exclusion step described with reference to step 5) of Table 15, whether the first exclusion candidate, the candidate resource to be sensed, and the associated resources overlap and may exclude the overlapping resource from the duration Y. Additionally, this example may determine whether the second exclusion candidate, the candidate resource to be sensed, and the associated resources overlap and may exclude the overlapping resource from the duration Y.

As an additional example, the second exclusion candidate may include a retransmission resource associated with the initial transmission in the first exclusion candidate. Therefore, the second exclusion candidate may be expressed with the first exclusion candidate including the retransmission.

That is, the first exclusion candidate including the retransmission, slot m+Gap (here, the slot m if Gap=0), corresponds to $t^{SL}_{m+Gap}$. Likewise, resources periodically reserved for transmission from the slot m+Gap (the slot m if Gap=0) corresponds to $t^{SL}_{m+Gap+q/Pstep/Prsvp\_RX}$ (or, $t^{SL}_{m+q\cdot Pstep'\cdot Prsvp\_RX}$). The candidate resource to be sensed and the associated resources, that is, the slot y and the resources periodically reservable for transmission from the slot y correspond to $R_{x,y+j\cdot P'rsvp\_RX}$.

Example 3-1

In the aforementioned examples, the parameter value "Gap" indicated by the retransmission time gap information (e.g., field "Time gap between initial transmission and retransmission") of SCI received by the first UE in the slot m may be defined as in the following Table 16 and Table 17, which is similar to the description made above with reference to FIG. 19.

A resource specified according to the parameter value "Gap" and resources periodically reserved for transmission after the corresponding resource may be determined as an exclusion candidate. The corresponding resource may be excluded when the determined exclusion candidate overlaps the candidate resource to be sensed and the associated resources.

When the initial transmission and one retransmission are set for the third UE (e.g., if $N_{max}=2$), timings of the initial transmission and the first retransmission of the third UE may be determined based on the retransmission time gap information and the retransmission index information within the SCI, as shown in Table 16.

TABLE 16

If $N_{max}=2$ - "Time gap between initial transmission and retransmission" field indicates a value of "Gap1" - if $Gap_1=0$ : Gap=0 - If $Gap_1\neq0$ - If Retransmission index=0 : Gap=$Gap_1$ - If Retransmission index=1 : Gap=-$Gap_1$ In the example of Table 16, $Gap_1$ corresponds to the gap between the initial transmission and the first retransmission of the third UE. A value of $Gap_1$ may be indicated by the field "Time gap between initial transmission and retransmission". If $Gap_1=0$, the parameter value "Gap"=0.

If $Gap_1\cdot 0$, the parameter value "Gap" is $Gap_1$ for a value of the field "Retransmission index"=0 and the parameter value "Gap" is –$Gap_1$ for the value of the field "Retransmission index"=1.

Therefore, the first UE may determine, as the exclusion candidate, slot m+Gap (here, one of Gap=0, Gap=$Gap_1$, and Gap=-$Gap_1$) and resources periodically reserved for transmission from the slot m+Gap, and, if the exclusion candidate overlaps the candidate resource to be sensed and the associated resources, may exclude the corresponding resource.

When the initial transmission and two retransmissions are set for the third UE (e.g., if $N_{max}=3$), timings of the initial transmission, the first retransmission, and the second retransmission of the third UE may be determined based on retransmission time gap information and retransmission index information, as shown in Table 17.

TABLE 17

If $N_{max}=3$ - "Time gap between initial transmission and retransmission" field indicates values of "$Gap_1$" and "$Gap_2$" - If $Gap_1=0$ and $Gap_2=0$ : Gap=0 - If $Gap_1\neq0$ and $Gap_2=0$ - If Retransmission index=00 : Gap=$Gap_1$ - If Retransmission index=01 : Gap=-$Gap_1$ - If $Gap_1\neq0$ and $Gap_2\neq0$ - If Retransmission index=00 : Gap=$Gap_1$, Gap=$Gap_2$ - If Retransmission index=01 : Gap=-$Gap_1$, Gap=$Gap_2$-$Gap_1$ - If Retransmission index=10 : Gap=-$Gap_2$, Gap=$Gap_1$-$Gap_2$ In the example of Table 17, $Gap_1$ corresponds to the gap between the initial transmission and the first retransmission of the third UE and $Gap_2$ corresponds to the gap between the initial transmission and the second retransmission. Values of $Gap_1$ and $Gap_2$ may be indicated by the field "Time gap between initial transmission and retransmission". If all of values of $Gap_1$ and $Gap_2=0$, the parameter value "Gap" is 0. That is, the first UE may determine whether the initial transmission resource (or exclusion candidate) based on the parameter value "Gap" overlaps the candidate resource to be sensed and the associated resources of the first UE.

If $Gap_1\cdot 0$ and $Gap_2=0$, the parameter value "Gap" is $Gap_1$ for the field "Retransmission index" having a value of 00 and the parameter value "Gap" is –$Gap_1$ for the field Retransmission index" having a value of 01. That is, the first UE may determine whether the re transmission resource (or exclusion candidate) based on the parameter value "Gap" overlaps the candidate resource to be sensed and the associated resources of the first UE.

If each of values of $Gap_1$ and $Gap_2\neq0$ and the value of the field "Retransmission index"=00, the parameter value "Gap" has two values of $Gap_1$ and $Gap_2$. That is, the first UE may determine whether all of the retransmission resources (or the exclusion candidate) of the third UE based on the two parameter values "Gap" overlap the candidate resource to be sensed and the associated resources of the first UE.

If each of values of $Gap_1$ and $Gap_2\neq0$ and the value of the field "Retransmission index"=01, the parameter value "Gap" has two values of –$Gap_1$ and $Gap_2$-$Gap_1$. That is, the first UE may determine whether all of the retransmission resources (or the exclusion candidate) of the third UE based on the two parameter values "Gap" overlap the candidate resource to be sensed and the associated resources of the first UE.

If each of values of $Gap_1$ and $Gap_2\neq0$ and the value of the field "Retransmission index"=01, the parameter value "Gap" has two values of –$Gap_2$ and $Gap_1$-$Gap_2$. That is, the first UE may determine whether all of the retransmission resources (or the exclusion candidate) of the third UE based on the two parameter values "Gap" overlap the candidate resource to be sensed and the associated resources of the first UE.

Therefore, the first UE may determine, as the exclusion candidate, slot m+Gap (here, one of Gap=0, Gap=$Gap_1$, Gap=-$Gap_1$, Gap=$Gap_1$ and $Gap_2$, Gap=-$Gap_1$ and $Gap_2$-$Gap_1$, and Gap=-$Gap_2$ and $Gap_1$-$Gap_2$) and resources periodically reserved for transmission from the slot m+Gap and, when the determined exclusion candidate overlaps the candidate resource to be sensed and the associated resources, may exclude the corresponding resource.

For example, example 3-1 may be applied when the initial transmission and the retransmission (or the first retransmission and the second retransmission) of the same TB by the third UE are not periodically repeated.

Example 3-2

Similar to the example of FIG. 21, when the initial transmission and the retransmission (or the first retransmission and the second retransmission) of the same TB by the third UE are periodically repeated, the exclusion candidate determination operation that considers the retransmission may be more briefly defined.

For example, when the first UE receives SCI for TB transmission of the third UE in the slot m, it is apparent to include the slot m in the candidate resource to be excluded. However, a retransmission resource of the same TB after the slot m is added to the exclusion candidate and transmission of the same TB before the slot m may not be added to the exclusion candidate. Transmission before the slot may be the exclusion candidate due to its periodicity even according to the existing resource exclusion procedure that does not consider retransmission, but transmission after the slot m may not be the exclusion candidate according to the existing resource exclusion procedure that does not consider the retransmission since it is after a resource selection/reselection point in time of the first UE.

As a detailed example, a case in which the slot m in which the first UE receives the SCI from the third UE is the first retransmission of the same TB of the third UE is assumed. For example, the first UE may verify that, based on the retransmission time gap information and the retransmission index information within the SCI, the first retransmission of the TB is preset in the slot m, the initial transmission of the same TB was present in the slot m-$Gap_1$, and the second retransmission of the same TB will be present in the slot m+$Gap_2$-$Gap_2$.

In this case, with respect to the slot m+$Gap_2$-$Gap_2$ and the resources (i.e., exclusion candidate) periodically reserved for transmission by the third UE from the slot m+$Gap_2$-$Gap_2$, the first UE may determine whether they overlap the slot y and resources (i.e., candidate resource to be sensed and associated resources) periodically reservable for transmission from the slot y.

Also, with respect to the slot m-$Gap_1$ and resources periodically reserved for transmission by the third UE from the slot m−Gap$_1$, the first UE may have no need to determine whether they overlap the candidate resource to be sensed and the associated resources.

In this regard, a case in which the initial transmission and the retransmission of the same TB of the third UE are repeated periodically (e.g., every 100 slots) is assumed. That is, initial transmission of the first TB may be performed in slot m−100−Gap$_2$, first retransmission of the first TB may be performed in slot m−100, and second retransmission of the first TB may be performed in slot m−100+Gap$_2$-Gap$_2$. Also, initial transmission of the second TB may be performed in slot m−Gap$_1$, first retransmission of the second TB may be performed in slot m, and second retransmission of the second TB may be performed in slot m+Gap$_2$-Gap$_2$.

In this case, when the first UE receives the SCI from the third UE in a first retransmission resource (e.g., slot m−100−Gap$_2$) of the first TB in a previous period of the third UE, and when a subsequent periodic resource (here, including slot m−Gap$_1$) overlaps arbitrary slot y (i.e., the candidate resource to be sensed and the associated resources) within the duration Y based on the received SCI, the first UE may exclude the corresponding resource even without considering the slot m−Gap$_1$ (i.e., even without determining whether the slot m−Gap$_1$ and resources periodically reserved for transmission by the third UE from the slot m−Gap$_1$ overlap the candidate resource to be sensed and the associated resources).

Therefore, the parameter value "Gap" indicated by retransmission time gap information (e.g., field "Time gap between initial transmission and retransmission") of the SCI received by the first UE in the slot m may be defined as shown in the following Table 18 and Table 19. A resource specified according to the parameter value "Gap" and resources periodically reserved for transmission after the corresponding resource may be determined as an exclusion candidate. When the determined exclusion candidate overlaps the candidate resource to be sensed and the associated resources, the corresponding resource may be excluded.

When the initial transmission and one retransmission are set for the third UE (e.g., if N$_{max}$=2), timings of the initial transmission and the first retransmission of the third UE may be determined based on the retransmission time gap information and the retransmission index information within the SCI, as shown in Table 18.

TABLE 18

If N$_{max}$=2 - "Time gap between initial transmission and retransmission" field indicates a value of "Gap$_1$" - if Gap$_1$=0 : Gap=0 - If Gap$_1$≠0 - Only if Retransmission index=0 : Gap=Gap$_1$ In the example of Table 18, explanation that overlaps the example of Table 16 is omitted. If Gap$_1$≠0 and a value of the field "Retransmission index"=1, the parameter value "Gap" is −Gap$_2$. However, when and the transmission and the retransmission of the same TB in the slot m and the slot m+Gap by the third UE are periodically repeated, the parameter value "Gap" for the field "Retransmission index" having a value of 1 may not be considered. That is, with respect to the slot m−Gap$_1$ and the resources periodically reserved for transmission by the third UE from the slot m−Gap$_1$, the first UE may have no need to determine whether they overlap the candidate resource to be sensed and the associated resources.

Therefore, the first UE may determine, as the exclusion candidate, the slot m+Gap (here, one of Gap=0 and Gap=Gap$_1$) and resources periodically reserved for transmission from the slot m+Gap and may exclude the corresponding resource when the exclusion candidate overlaps the candidate resource to be sensed and the associated resources.

When the initial transmission and two retransmissions are set for the third UE (e.g., if N$_{max}$=3), timings of the initial transmission, the first retransmission, and the second retransmission of the third UE may be determined based on the retransmission time gap information and the retransmission index information, as shown in Table 19.

TABLE 19

If N$_{max}$=3 - "Time gap between initial transmission and retransmission" field indicates values of "Gap$_1$" and "Gap$_2$" - If Gap$_1$=0 and Gap$_2$=0 : Gap=0 - If Gap$_1$≠0 and Gap$_2$=0 - Only if Retransmission index=00 : Gap=Gap$_1$ - If Gap$_1$≠0 and Gap$_2$≠0 - Only if Retransmission index=00 : Gap=Gap$_1$, Gap=Gap$_2$ - Only if Retransmission index=01 : Gap=Gap$_2$-Gap$_1$ In the example of Table 19, explanation that overlaps the example of Table 17 is omitted. If Gap$_1$≠0 and Gap$_2$=0, the parameter value "Gap" is −Gap$_1$ for a value of the field "Retransmission index"=01. However, when the transmission and the retransmission of the same TB in the slot m and the slot m+Gap by the third UE are periodically repeated, the parameter value "Gap" for the field "Retransmission index" having a value of 01 may not be considered. That is, with respect to the slot m−Gap$_1$ and the resources periodically reserved for transmission by the third UE from the slot m−Gap$_1$, the first UE may have no need to determine whether they overlap the candidate resource to be sensed and the associated resources.

If each of values of Gap$_1$ and Gap$_2$≠0 and the value of the field "Retransmission index"=01, the parameter value "Gap" has two values of −Gap$_1$ and Gap$_2$−Gap$_1$. Here, when the transmission and the retransmission of the same TB in the slot m and the slot m+Gap by the third UE are periodically repeated, a case in which the parameter value "Gap" is −Gap$_1$ may not be considered and only a case in which the parameter value "Gap" is Gap$_2$−Gap$_1$ may be considered. That is, with respect to slot m+Gap$_2$−Gap$_1$ and resources periodically reserved for transmission by the third UE from the slot m+Gap$_2$−Gap$_1$, the first UE may determine whether they overlap the candidate resource to be sensed and the associated resources. However, that is, with respect to slot m-Gap$_1$ and resources periodically reserved for transmission by the third UE from the slot m−Gap$_1$, the first UE may determine whether they overlap the candidate resource to be sensed and the associated resources.

If each of values of Gap$_1$ and Gap$_2$≠0 and the value of the field "Retransmission index"=10, the parameter value "Gap" has two values of −Gap$_2$ and Gap$_1$−Gap$_2$. However, when the transmission and the retransmission of the same TB in the slot m and the slot m+Gap by the third UE are periodically repeated, the parameter value "Gap in a case in which the value of the field "Retransmission index" is 10 may not be considered. That is, with respect to slot m−Gap$_2$ and resources periodically reserved for transmission by the third UE from the slot m−Gap$_2$, and slot m+Gap$_1$−Gap$_2$ and resources periodically reserved for transmission by the third UE from the slot m+Gap$_1$−Gap$_2$, the first UE may have no need to determine whether they overlap the candidate resource to be sensed and the associated resources.

Therefore, the first UE may determine, as the exclusion candidate, the slot m+Gap (here, one of Gap=0, Gap=Gap$_1$, Gap=Gap$_1$ and Gap$_2$, and Gap=Gap$_2$−Gap$_2$) and resources periodically reserved for transmission UE from the slot m+Gap and, when the exclusion candidate overlaps the candidate resource to be sensed and the associated resources, may exclude the corresponding resource.

Example 3-3

This example refers to a method of not including a corresponding resource in resources to be excluded additionally into consideration of retransmission since, if Gap=0 (i.e., if retransmission is absent), the corresponding resource is included in the existing resource exclusion operation.

Therefore, the parameter value "Gap" indicated by retransmission time gap information (e.g., field "Time gap between initial transmission and retransmission") of the SCI received by the first UE in the slot m may be defined as shown in the following Table 20 and Table 21. A resource specified according to the parameter value "Gap" and resources periodically reserved for transmission after the corresponding resource may be determined as an exclusion candidate. When the determined exclusion candidate overlaps the candidate resource to be sensed and the associated resources, the corresponding resource may be excluded.

When the initial transmission and one retransmission are set for the third UE (e.g., if $N_{max}=2$), timings of the initial transmission and the first retransmission of the third UE may be determined based on the retransmission time gap information and the retransmission index information within the SCI as shown in Table 20.

TABLE 20

If $N_{max}=2$ - "Time gap between initial transmission and retransmission" field indicates a value of "Gap1" - if $Gap_1 \neq 0$ and Retransmission index=0 : Gap=$Gap_1$ In the example of Table 20, explanation that overlaps the example of Table 16 or Table 18 is omitted. According to the example of Table 20, the first UE may determine, as an exclusion candidate, the slot m+Gap (here, Gap=$Gap_1$) and resources periodically reserved for transmission from the slot m+Gap and may exclude the corresponding resource when the exclusion candidate overlaps the candidate resource to be sensed and the associated resources.

When the initial transmission and two retransmissions are set for the third UE (e.g., $N_{max}=3$), timings of the initial transmission, the first retransmission, and the second retransmission of the third UE may be determined based on the retransmission time gap information and the retransmission index information, as shown in Table 21.

TABLE 21

If $N_{max}=3$ - "Time gap between initial transmission and retransmission" field indicates values of "$Gap_1$" and "$Gap_2$" - if $Gap_1 \neq 0$, $Gap_2=0$, and Retransmission index=00 : Gap=$Gap_1$ - If $Gap_1 \neq 0$, $Gap_2 \neq 0$, and Retransmission index=00 : Gap=$Gap_1$, Gap=$Gap_2$ - If $Gap_1 \neq 0$, $Gap_2 \neq 0$, Retransmission index=01 : Gap=$Gap_2$-$Gap_1$ In the example of Table 21, explanation that overlaps the example of Table 17 or Table 19 is omitted. According to the example of Table 21, the first UE may determine, as an exclusion candidate, the slot m+Gap (here, one of Gap=$Gap_1$, Gap=$Gap_1$ and $Gap_2$, and Gap=$Gap_2$-$Gap_2$) and resources periodically reserved for transmission by the third UE from the slot m+Gap and may exclude the corresponding resource when the exclusion candidate overlaps the candidate resource to be sensed and the associated resources.

Example 4

In this example, the first UE determines a retransmission resource of the third UE without using retransmission index information within SCI of the third UE and excludes the determined resource from a candidate resource to be sensed and associated resources of the first UE. For example, in the resource exclusion operation described with Table 15, the first UE may determine an additional exclusion candidate by referring to the retransmission time gap information within the SCI.

In the aforementioned example 3, information additionally referenced from the SCI of the third UE received by the first UE includes retransmission time gap information (e.g., field "Time gap between initial transmission and retransmission") indicating a parameter value "Gap" and retransmission index information (e.g., field "Retransmission index") indicating a parameter value "Retransmission index". In this example 4, only the retransmission time gap information (e.g., field "Time gap between initial transmission and retransmission") indicating the parameter value "Gap" may be additionally referenced without additionally using the retransmission index information (e.g., field "Retransmission index") indicating the parameter value "Retransmission index" in the SCI of the third UE received by the first UE.

Therefore, except that the retransmission index information is not referenced, the description made in example 3 may be equally applied to this example 4 and thus, repeated description is omitted.

Example 4-1

The parameter value "Gap" indicated by the retransmission time gap information (e.g., field "Time gap between initial transmission and retransmission") of the SCI received by the first UE in the slot m may be defined as shown in the following Table 22 and Table 23.

When the initial transmission and one retransmission are set for the third UE (e.g., if $N_{max}=2$), timings of the initial transmission and the first retransmission of the third UE may be determined based on the retransmission time gap information within the SCI as shown in Table 22.

TABLE 22

If $N_{max}=2$ - "Time gap between initial transmission and retransmission" field indicates a value of "$Gap_1$" - if $Gap_1=0$ : Gap=0 - If $Gap_1 \neq 0$ : Gap=$Gap_1$ According to the example of Table 22, the first UE may determine, as an exclusion candidate, slot m+Gap (here, Gap=0 or Gap=$Gap_1$) and resources periodically reserved for transmission from the slot m+Gap and may exclude the corresponding resource when the exclusion candidate overlaps the candidate resource to be sensed and the associated resources. When the initial transmission and two retransmissions are set for the third UE (e.g., if $N_{max}3$), timings of the initial transmission, the first retransmission, and the second retransmission of the third UE may be determined based on the retransmission time gap information and the retransmission index information, as shown in Table 23.

TABLE 23

If $N_{max}$=3 - "Time gap between initial transmission and retransmission" field indicates values of "Gap$_1$" and "Gap$_2$" - If Gap$_1$=0 and Gap$_2$=0 : Gap=0 - If Gap$_1\neq$0 and Gap$_2$=0 : Gap=Gap$_1$-If Gap$_1\neq$0 and Gap$_2\neq$0 : Gap=Gap$_1$, Gap=Gap$_2$ According to the example of Table 23, the first UE may determine, as an exclusion candidate, slot m+Gap (here, one of Gap=0, Gap=Gap$_1$, and Gap=Gap$_1$ and Gap$_2$) and resources periodically reserved for transmission from the slot m+Gap and may exclude the corresponding resource when the exclusion candidate overlaps the candidate resource to be sensed and the associated resources.

Example 4-2

This example refers to a method of not including a corresponding resource in resources to be excluded additionally into consideration of retransmission since, if Gap=0 (i.e., if retransmission is absent), the corresponding resource is included in the existing resource exclusion operation.

Therefore, the parameter value "Gap" indicated by retransmission time gap information (e.g., field "Time gap between initial transmission and retransmission") of the SCI received by the first UE in the slot m may be defined as shown in the following Table 24 and Table 25.

When the initial transmission and one retransmission are set for the third UE (e.g., if $N_{max}$=2), timings of the initial transmission and the first retransmission of the third UE may be determined based on the retransmission time gap information within the SCI as shown in Table 24.

TABLE 24

If $N_{max}$=2 - "Time gap between initial transmission and retransmission" field indicates a value of "Gap$_1$" - If Gap$_1\neq$0 : Gap=Gap$_1$ According to the example of Table 24, the first UE may determine, as an exclusion candidate, slot m+Gap (here, Gap=Gap$_1$) and resources periodically reserved for transmission from the slot m+Gap and may exclude the corresponding resource when the exclusion candidate overlaps the candidate resource to be sensed and the associated resources. When the initial transmission and two retransmissions are set for the third UE (e.g., if $N_{max}$3), timings of the initial transmission, the first retransmission, and the second retransmission of the third UE may be determined based on the retransmission time gap information and the retransmission index information, as shown in Table 25.

TABLE 25

Figure 23:
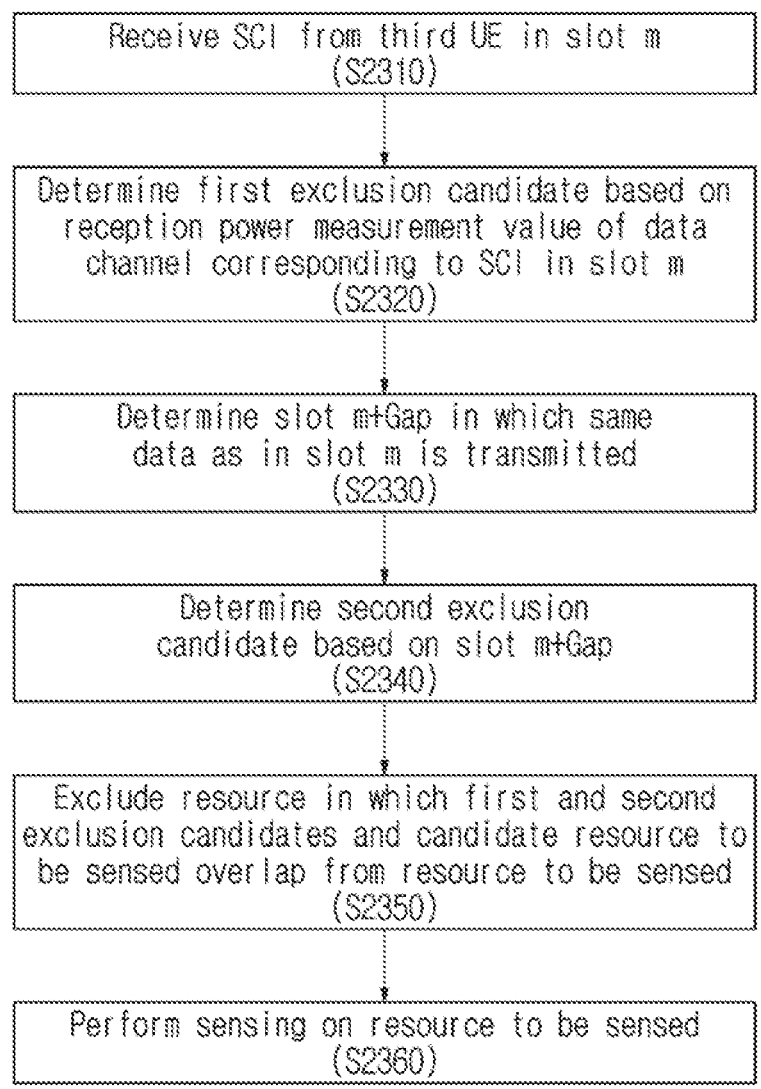
FIG. 23 illustrates a resource exclusion operation to which the present disclosure may apply.

If $N_{max}$=3 - "Time gap between initial transmission and retransmission" field indicates values of "Gap$_1$" and "Gap$_2$" - If Gap$_1\neq$0 and Gap$_2$=0 : Gap=Gap$_1$ - If Gap$_1\neq$0 and Gap$_2\neq$0 : Gap=Gap$_1$, Gap=Gap$_2$ According to the example of Table 25, the first UE may determine, as the exclusion candidate, the slot m+Gap (here, one of Gap=Gap$_1$ and Gap=Gap$_1$ and Gap$_2$) and resources periodically reserved for transmission by the third UE from the slot m+Gap and may exclude the corresponding resource when the exclusion candidate overlaps the candidate resource to be sensed and the associated resources. FIG. 23 illustrates a resource exclusion operation to which the present disclosure may apply.

The example of FIG. 23 may correspond to a resource exclusion procedure that is a portion of the sidelink transmission resource selection (or reselection) operation of operation S1740 of FIG. 17. Also, the example of FIG. 23 may apply to full sensing as well as partial sensing.

In operation S2310, the first UE may receive SCI in slot m from the third UE.

In operation S2320, the first UE may determine a first exclusion candidate based on a reception power measurement value (e.g., PSSCH-RSRP) of a data channel (e.g., to be scheduled by the SCI) corresponding to the SCI received in the slot m.

For example, if the reception power measurement value in the slot m exceeds a predetermined threshold (e.g., $Th_{prioTX,prioRX}$), the corresponding slot m may be included in the first exclusion candidate. Also, resources periodically reserved for transmission by the third UE from the slot m may be included.

In operation S2330, the first UE may determine slot m+Gap in which the same data as in the slot m is transmitted.

For example, a parameter value "Gap" may be determined based on retransmission time gap information (or retransmission time gap information and retransmission index information) included in the SCI of the third UE received in the slot m. For example, the parameter value "Gap" may be determined as in the aforementioned examples 3 and 4. Here, the slot m may correspond to one of an initial transmission resource, a first retransmission resource, and a second retransmission resource of the same TB, and remaining transmission/retransmission resources of the same TB may be determined from the parameter value "Gap".

In operation S2340, the first UE may determine a second exclusion candidate based on the slot m+Gap.

For example, when the slot m is included in the first exclusion candidate, the second exclusion candidate may include the slot m+Gap and resources periodically reserved for transmission by the third UE from the slot m+Gap.

In operation S2350, the first UE may determine a resource to be sensed depending on whether the first and second exclusion candidates and the candidate resource to be sensed overlap.

For example, if any one of all resources belonging to the first and second exclusion candidates overlaps one of the candidate resource to be sensed and associated resources, the corresponding resource may be excluded from the resource to be sensed.

The candidate resource to be sensed may refer to a resource that belongs to a predetermined duration. In the case of partial sensing, the predetermined duration may be the partial sensing unit duration (e.g., duration Y) as in FIG. 12 and the candidate resource to be sensed may refer to all the possible slots y within the corresponding duration. In the case of full sensing, the predetermined duration may be a selection window (e.g., a duration of [TTI m+T$_1$, TTI m+T$_2$]) as in FIG. 11 and the candidate resource to be sensed may be all the possible slots within the corresponding duration.

For example, if any one of the candidate resource to be sensed (e.g., slot y) within the predetermined duration and associated resources (e.g., resources periodically reservable for transmission from the slot y) overlaps any one of all the resources belonging to the first and second exclusion candidates, the corresponding resource may be excluded from the resource to be sensed.

In operation S2360, the first UE may perform sensing on the resource to be sensed.

For example, operations S2310 to S2350 may be repeated by increasing the threshold until a set of a predetermined number of resources to be sensed (e.g., $S_A$) is configured. When the set of resources to be sensed is configured, a sensing result may be derived by averaging sensing values in sensing reference resources (e.g., y−k*P (or y−k*$P_{step}$)) related to each resource to be sensed (e.g., slot y).

The sensing result may be reported to an upper layer and accordingly, a resource to be selected (or reselected) by the first UE for sidelink transmission may be determined.

Figure 24:
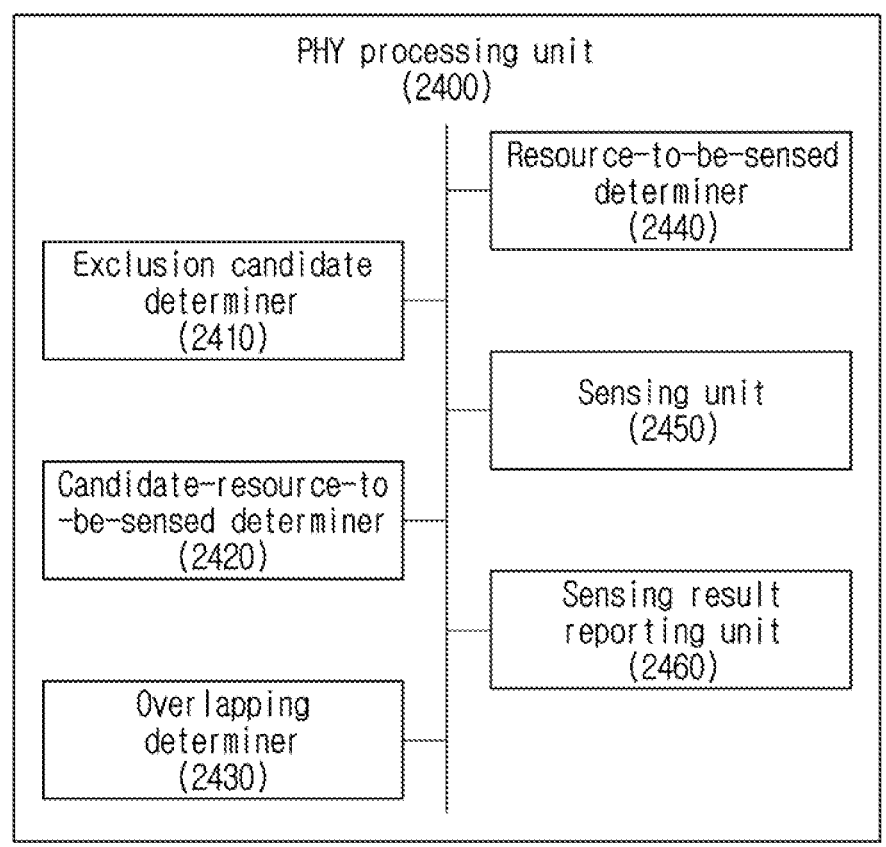
FIG. 24 is a diagram illustrating a detailed configuration of a first terminal device to which the present disclosure may apply.

FIG. 24 is a diagram illustrating a detailed configuration of a first terminal device to which the present disclosure may apply.

A PHY processing unit 2400 of FIG. 24 may correspond to the PHY processing unit 1815 of the first terminal device 1800 of FIG. 18.

The PHY processing unit 2400 may include an exclusion candidate determiner 2410, a candidate-resource-to-be-sensed determiner 2420, an overlapping determiner 2430, a resource-to-be-sensed determiner 2440, a sensing unit 2450, and a sensing result reporting unit 2460.

The exclusion candidate determiner 2410 may determine a first exclusion candidate (e.g., slot m and resources periodically reserved by the third UE for transmission from the slot m) based on a reception power measurement value of a data channel corresponding to SCI received in the slot m from the third UE.

Also, the exclusion candidate determiner 2410 may additionally determine a second exclusion candidate that considers a retransmission resource. For example, the exclusion candidate determiner 2410 may determine a parameter Gap (refer to the aforementioned examples 3 and 4 for the parameter value Gap) based on retransmission time gap information (or retransmission time gap information and retransmission index information) included in the SCI of the third UE received in the slot m. Also, when the slot m is included in the first exclusion candidate, the exclusion candidate determiner 2410 may determine a third exclusion candidate including slot m+Gap and resources periodically reserved for transmission by the third UE from the slot m+Gap.

The candidate-resource-to-be-sensed determiner 2420 may determine all the possible resources within the predetermined duration as the candidate resource to be sensed. For example, the candidate-resource-to-be-sensed determiner 2420 may determine, as the candidate resource to be sensed, all the possible slots (e.g., slot y) within the predetermined duration (e.g., duration Y) determined by the partial sensing unit duration determiner 1816 in the example of FIG. 18. Alternatively, the candidate-resource-to-be-sensed determiner 2420 may determine, as the candidate resource to be sensed, all the possible slots within the selection window (e.g., duration of [TTI m+$T_1$, TTI m+$T_2$]) of FIG. 11.

The overlapping determiner 2430 may determine whether any one of the candidate resource to be sensed (e.g., slot y) within the predetermined duration determined by the candidate-resource-to-be-sensed determiner 2420 and associated resources (e.g., resources periodically reservable for transmission from the slot y) overlaps any one of all the resources that belong to the first and second exclusion candidates determined by the exclusion candidate determiner 2410.

The resource-to-be-sensed determiner 2440 may exclude the resource that is determined to overlap by the overlapping determiner 2430 from the resource to be sensed and may determine a non-overlapping candidate resource to be sensed as the resource to be sensed. Also, the resource-to-be-sensed determiner 2440 may repeatedly acquire a result from the exclusion candidate determiner 2410, the candidate-resource-to-be-sensed determiner 2420, and the overlapping determiner 2430 until a set of a predetermined number of resources to be sensed is configured.

The sensing unit 2450 may perform sensing on each resource to be sensed within a set of resources to be sensed and may derive a sensing result by averaging sensing values.

The sensing result reporting unit 2450 may deliver the sensing result to the upper layer processing unit 1811. Therefore, the resource to be selected (or reselected) by the first UE for sidelink transmission may be determined.

Other components of the first terminal device including the PHY processing unit 2400 of FIG. 24 may correspond to components of FIG. 18.

While the exemplary method of the present invention is described as a series of operations, for clarity of description, this does not limit the order of steps. When needed, the steps may be performed at the same time or in a different order. In order to implement the method according to the present invention, the exemplary method may further include additional steps, include the remaining steps except for some steps, or may include additional steps other than some steps.

The various examples herein are to explain the representative aspects of the present disclosure instead of describing all the possible combinations and matters described in the various examples may independently apply or may apply through at least two combinations thereof.

Also, various examples of the present disclosure may be implemented by hardware, firmware, software, or combination thereof. In the case of implementation by hardware, the examples may be implemented by one or more application-specific integrated circuits (ASICs), digital signal processors (DSPs), digital signal processing devices (DSPDs), programmable logic devices (PLDs), field programmable gate arrays (FPGAs), general processors, controllers, microcontrollers, microprocessors, etc.

The scope of the present invention includes a software or machine executable instructions (for example, operating system, application, firmware, program, etc.) for enabling to implement operations according to the methods of the various examples, and a device or a non-transitory computer-readable medium executable on a computer storing such a software or instructions. Instructions available to program a processing system that performs features described herein may be stored on/in a storage medium or a computer-readable storage medium and the features described herein may be implemented using a computer program product that includes such storage medium. Storage media may include a high-speed random access memory, such as dynamic random access memory (DRAM), static RAM (SRAM), DDR RAM, or other random access solid state memory devices, and without being limited thereto, may include non-volatile memory, such as at least one magnetic disk storage device, optical disk storage device, flash memory device, or other non-volatile solid stage devices. Memory optionally includes at least one storage device remotely present from processor(s). Memory or, alternately, non-volatile memory device(s) in memory may include non-transitory computer-readable storage medium. Features described herein may be arbitrarily stored in one of machine-readable media to control hardware of the processing system. The processing system may be integrated into software and/or firmware that interlocks with other mechanisms using results according to the examples of the present disclosure. Such software or firmware may include an application code, a device driver, an OS, and an execution environment/container, but is not limited thereto.

The present disclosure may be applied to improve the performance of various wireless communication systems.

What is claimed is:

1. A method comprising:
   receiving, by a first wireless user device, configuration information for sidelink communication indicating:
   a resource pool;
   a sensing window; and
   at least one parameter for a partial sensing;
   monitoring a first subset of slots of a plurality of slots in the sensing window, wherein the plurality of slots comprises a second subset of slots that is not monitored by the first wireless user device;
   determining, based on the monitoring, at least one transmission resource in at least one candidate slot, wherein the at least one candidate slot is after the sensing window, wherein the first subset of slots comprises a plurality of partial sensing slot groups, wherein a time difference between the at least one candidate slot and each slot group of the plurality of partial sensing slot groups is a multiple of a resource reservation period, wherein the resource reservation period is selected from a subset of a configured set of resource reservation periods, and wherein the subset of the configured set of resource reservation periods is determined by excluding at least one resource reservation period from the configured set of resource reservation periods; and
   transmitting, to a second wireless user device via the at least one transmission resource, a sidelink signal.

2. The method of claim 1, wherein the configured set of resource reservation periods comprises at least 0ms, 5 ms, 10 ms, 20 ms, 50 ms, 100 ms, 200 ms, 300 ms, 400 ms, 500 ms, 600 ms, 700 ms, 800 ms, 900 ms, and 1000 ms.

3. The method of claim 2, wherein the subset of the configured set of resource reservation periods does not comprise a resource reservation period less than a threshold value.

4. The method of claim 2, wherein the subset of the configured set of resource reservation periods does not comprise 0ms and 5 ms.

5. The method of claim 1, wherein the sidelink signal comprises at least one of:
   a physical sidelink control channel (PSCCH) comprising first sidelink control information (SCI); or
   a physical sidelink shared channel (PSSCH) comprising second SCI.

6. The method of claim 1, wherein the at least one candidate slot is associated with Y slots for periodic-based partial sensing, and
   wherein each slot group of the plurality of partial sensing slot groups is associated with Y slots for periodic-based partial sensing.

7. The method of claim 1, wherein the at least one candidate slot is in a selection window that follows the sensing window, and
   wherein the plurality of partial sensing slot groups are at least partially non-contiguous in the sensing window.

8. The method of claim 1, further comprising:
   based on the partial sensing being a periodic-based partial sensing, skipping monitoring the second subset of slots in the sensing window.

9. A first wireless user device comprising:
   one or more processors; and
   memory storing instructions that, when executed by the one or more processors, cause the first wireless user device to:
   receive configuration information indicating:
   a resource pool for sidelink communication;
   a sensing window; and
   at least one parameter for a partial sensing;
   monitor a first subset of slots of a plurality of slots in the sensing window, wherein the plurality of slots comprises a second subset of slots that is not monitored by the first wireless user device;
   determine, based on monitoring the first subset of slots, at least one transmission resource in at least one candidate slot, wherein the at least one candidate slot is after the sensing window, wherein the first subset of slots comprises a plurality of partial sensing slot groups, wherein a time difference between the at least one candidate slot and each slot group of the plurality of partial sensing slot groups is a multiple of a resource reservation period, wherein the resource reservation period is selected from a subset of a configured set of resource reservation periods, and wherein the subset of the configured set of resource reservation periods is determined by excluding at least one resource reservation period from the configured set of resource reservation periods; and
   transmit, to a second wireless user device via the at least one transmission resource, a sidelink signal.

10. The first wireless user device of claim 9, wherein the configured set of resource reservation periods comprises at least 0ms, 5 ms, 10 ms, 20 ms, 50 ms, 100 ms, 200 ms, 300 ms, 400 ms, 500 ms, 600 ms, 700 ms, 800 ms, 900 ms, and 1000 ms.

11. The first wireless user device of claim 10, wherein the subset of the configured set of resource reservation periods does not comprise a resource reservation period less than a threshold value.

12. The first wireless user device of claim 10, wherein the subset of the configured set of resource reservation periods does not comprise 0ms and 5 ms.

13. The first wireless user device of claim 9, wherein the sidelink signal comprises at least one of:
   a physical sidelink control channel (PSCCH) comprising first sidelink control information (SCI); or
   a physical sidelink shared channel (PSSCH) comprising second SCI.

14. The first wireless user device of claim 9, wherein the at least one candidate slot is associated with Y slots for periodic-based partial sensing, and
   wherein each slot group of the plurality of partial sensing slot groups is associated with Y slots for periodic-based partial sensing.

15. The first wireless user device of claim 9, wherein the at least one candidate slot is in a selection window that follows the sensing window, and
   wherein the plurality of partial sensing slot groups are at least partially non-contiguous in the sensing window.

16. The first wireless user device of claim 9, wherein the instructions, when executed by the one or more processors, cause the first wireless user device to:
   based on the partial sensing being a periodic-based partial sensing, skip monitoring the second subset of slots in the sensing window.

* * * * *